United States Patent
Youn et al.

(10) Patent No.: US 11,963,134 B2
(45) Date of Patent: Apr. 16, 2024

(54) COMMUNICATION BASED ON PLURALITY OF SIMS

(71) Applicant: LG ELECTRONICS INC., Seoul (KR)

(72) Inventors: Myungjune Youn, Seoul (KR); Sungduck Chun, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 17/596,638

(22) PCT Filed: Jul. 27, 2020

(86) PCT No.: PCT/KR2020/009838
§ 371 (c)(1),
(2) Date: Dec. 15, 2021

(87) PCT Pub. No.: WO2021/015598
PCT Pub. Date: Jan. 28, 2021

(65) Prior Publication Data
US 2022/0240222 A1 Jul. 28, 2022

(30) Foreign Application Priority Data

Jul. 25, 2019 (KR) .................. 10-2019-0090512
Oct. 2, 2019 (KR) .................. 10-2019-0122039
Feb. 7, 2020 (KR) .................. 10-2020-0014968

(51) Int. Cl.
*H04W 68/12* (2009.01)
*H04W 60/00* (2009.01)
(Continued)

(52) U.S. Cl.
CPC .......... *H04W 68/12* (2013.01); *H04W 60/005* (2013.01); *H04W 68/02* (2013.01); *H04W 88/06* (2013.01)

(58) Field of Classification Search
CPC ... H04W 68/12; H04W 60/005; H04W 68/02; H04W 88/06
See application file for complete search history.

(56) References Cited

U.S. PATENT DOCUMENTS 11,224,041 B2 * 1/2022 Zhang ............... H04W 72/0446
11,412,430 B2 * 8/2022 Chong ............... H04L 65/1066
(Continued)

FOREIGN PATENT DOCUMENTS

CN 113574962 A * 10/2021 ............ H04W 60/00
KR 20180032633 3/2018
(Continued)

OTHER PUBLICATIONS

PCT International Application No. PCT/KR2020/009838, International Search Report dated Oct. 21, 2020, 4 pages.
(Continued)

*Primary Examiner* — Adam D Houston
(74) *Attorney, Agent, or Firm* — LEE, HONG, DEGERMAN, KANG & WAIMEY

(57) ABSTRACT

A disclosure of the present specification provides a method for a wireless communication device to perform communication based on a plurality of Sims. The method may include the steps of: transmitting a request message to a first network node of a second network, the request message including first information pertaining to the plurality of SIMs; and receiving an acceptance message for the request message from the first network node of the second network.

20 Claims, 37 Drawing Sheets

(51) Int. Cl.
 *H04W 68/02* (2009.01)
 *H04W 88/06* (2009.01)

(56) References Cited

U.S. PATENT DOCUMENTS

| | | | | |
|---|---|---|---|---|
| 11,838,973 | B2* | 12/2023 | Han | H04W 76/15 |
| 2020/0344606 | A1* | 10/2020 | Zaus | H04W 84/042 |
| 2021/0120524 | A1* | 4/2021 | Palle | H04W 68/005 |
| 2021/0345203 | A1* | 11/2021 | Balasubramanian | H04W 60/04 |
| 2022/0159763 | A1* | 5/2022 | Han | H04W 12/033 |
| 2022/0167448 | A1* | 5/2022 | Palle | H04W 36/0069 |
| 2022/0240222 | A1* | 7/2022 | Youn | H04W 68/02 |
| 2023/0189058 | A1* | 6/2023 | Yeh | H04W 28/0865 370/329 |
| 2023/0354152 | A1* | 11/2023 | Bangolae | H04W 40/22 |

FOREIGN PATENT DOCUMENTS

| | | | | |
|---|---|---|---|---|
| KR | 20230011294 | A * | 1/2023 | |
| WO | 2018155934 | | 8/2018 | |
| WO | WO-2019097498 | A1 * | 5/2019 | |
| WO | 2019136044 | | 7/2019 | |
| WO | WO-2019135581 | A1 * | 7/2019 | H04W 28/0289 |
| WO | WO-2019187486 | A1 * | 10/2019 | H04L 65/1016 |
| WO | WO-2020003886 | A1 * | 1/2020 | H04W 4/90 |
| WO | WO-2020208996 | A1 * | 10/2020 | H04L 63/123 |
| WO | WO-2020247043 | A1 * | 12/2020 | H04W 12/45 |
| WO | WO-2021015598 | A1 * | 1/2021 | H04W 60/005 |
| WO | WO-2020060890 | A9 * | 2/2021 | H04W 52/0216 |
| WO | WO-2022099230 | A1 * | 5/2022 | H04W 48/18 |
| WO | WO-2022228673 | A1 * | 11/2022 | |
| WO | WO-2023069653 | A1 * | 4/2023 | |

OTHER PUBLICATIONS

Samsung, "FS_MUSIM 22834 P-CR: Avoiding Paging Inefficiency," S1-191296, 3GPP TSG-SA WG1 Meeting #86, May 2019, 5 pages.

LG Electronics, "Support for paging reception for UE with Multiple SIMs," S1-191073, 3GPP TSG-SA WG Meeting #86, May 2019, 5 pages.

* cited by examiner

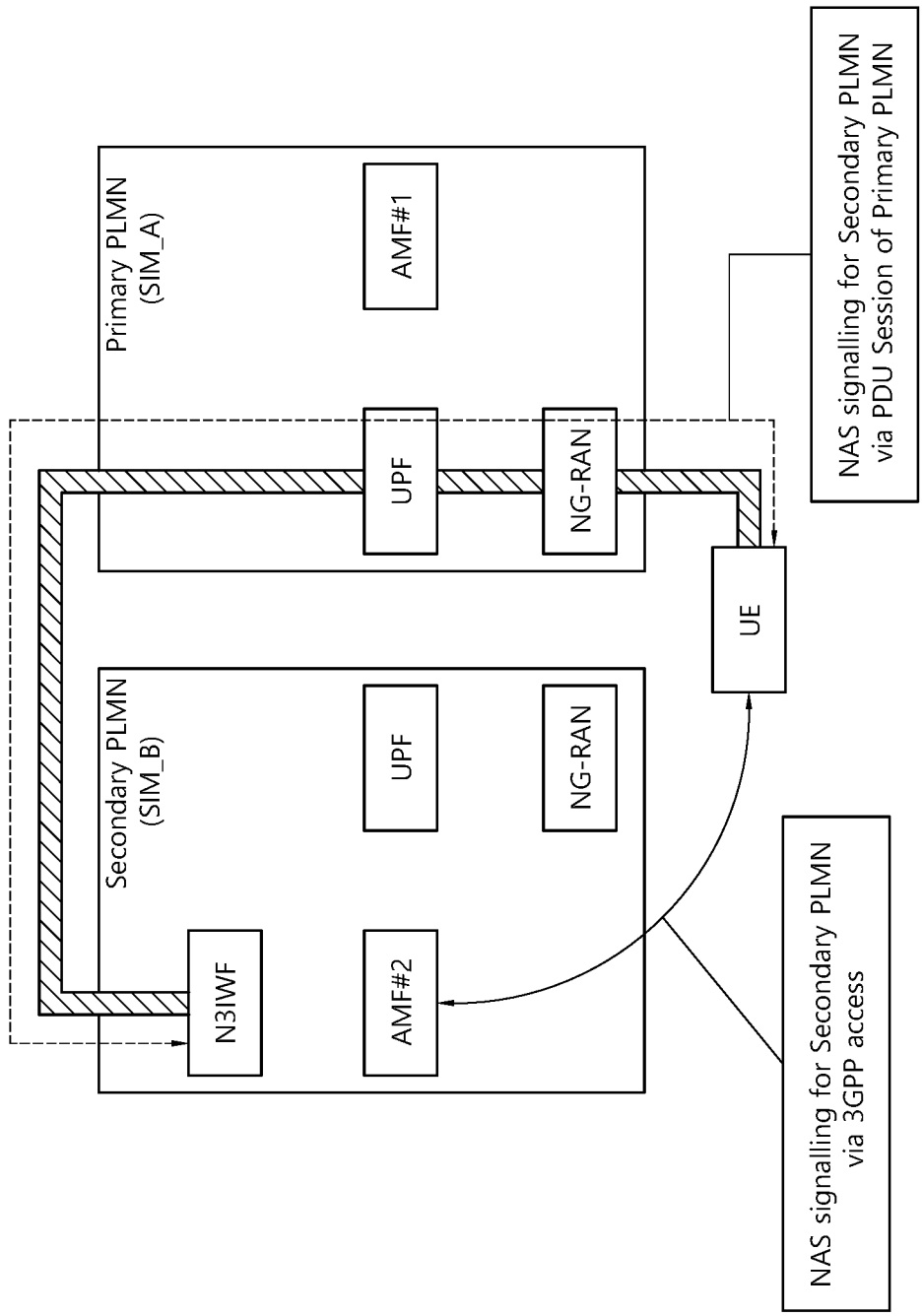

COMMUNICATION BASED ON PLURALITY OF SIMS

CROSS-REFERENCE TO RELATED APPLICATIONS

This application is the National Stage filing under 35 U.S.C. 371 of International Application No. PCT/KR2020/009838, filed on Jul. 27, 2020, which claims the benefit of earlier filing date and right of priority to Korean Application Nos. 10-2019-0090512, filed on Jul. 25, 2019, 10-2019-0122039, filed on Oct. 2, 2019, and 10-2020-0014968, filed on Feb. 7, 2020, the contents of which are all hereby incorporated by reference herein in their entireties.

TECHNICAL FIELD

The present disclosure generally relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

In a 3rd Generation Partnership Project (3GPP) system such as a 4G network and a 5G network, there are terminals supporting a plurality of Subscriber Identity Modules (SIMs). For example, in a situation in which the terminal includes two SIMs (e.g., a first SIM associated with PLMN 1 and a second SIM associated with PLMN 2), the terminal may register to PLMN 1 and PLMN 2 based on the respective SIMs.

In this case, the UE should monitor both paging for PLMN 1 and PLMN 2 in the idle state, but if the paging occasion of PLMN 1 and the paging occasion of PLMN 2 overlap (overlapping), there is a problem that the UE monitors one PLMN at a time. In addition, there is a problem that while the terminal is provided with the service from the PLMN 1, the terminal cannot perform monitoring for the PLMN 2. Accordingly, a method for efficiently performing communication between a terminal supporting a plurality of SIMs and a network needs to be discussed.

SUMMARY

Accordingly, a disclosure of the present specification has been made in an effort to solve the aforementioned problem.

In order to solve the above problems, one disclosure of the present specification provides a method for a wireless communication device to perform communication based on a plurality of SIMs. The method includes: transmitting a request message to a first network node of a second network, the request message including first information related to a plurality of SIMs; and receiving an accept message for the request message from the first network node of the second network.

In order to solve the above problems, one disclosure of the present specification provides a method for a wireless communication device to perform communication based on a plurality of SIMs. The method includes: transmitting a request message to a first network node of a second network, the request message including first information and second information related to a plurality of SIMs; and receiving an accept message for the request message from the first network node of the second network.

In order to solve the above problems, one disclosure of the present specification provides a method for a first network node of a second network to perform communication based on a plurality of SIMs. The method includes: receiving a request message from a wireless communication device, the request message including first information associated with a plurality of SIMs; and transmitting an acceptance message for the request message to the wireless communication device.

In order to solve the above problems, one disclosure of the present specification may provide a wireless communication device that performs communication based on a plurality of SIMs. The wireless communication device includes at least one processor; and at least one memory to store instructions and operably electrically connectable to the at least one processor. The operations performed based on the execution of the instructions by the at least one processor include: transmitting a request message to a first network node of a second network, the request message including first information related to a plurality of SIMs do; and receiving an accept message for the request message from the first network node of the second network.

In order to solve the above problems, one disclosure of the present specification may provide a first network node of a second network that performs communication based on a plurality of SIMs. The wireless communication device includes at least one processor; and at least one memory to store instructions and operably electrically connectable to the at least one processor. The operations performed based on the execution of the instructions by the at least one processor include: receiving a request message from a wireless communication device, the request message including first information related to a plurality of SIMs; and transmitting an acceptance message for the request message to the wireless communication device.

In order to solve the above problems, one disclosure of the present specification may provide an apparatus in mobile communication. The wireless communication device includes at least one processor; and at least one memory to store instructions and operably electrically connectable to the at least one processor. The operations performed based on the execution of the instructions by the at least one processor include: generating a request message to a first network node of a second network, the request message including first information related to a plurality of SIMs do; and identifying an accept message for the request message from the first network node of the second network.

In order to solve the above problems, one disclosure of the present specification may include a non-volatile computer-readable storage medium in which instructions are recorded. The instructions, when executed by one or more processors, cause the one or more processors to: generate a request message to a first network node of a second network, wherein the request message includes first information related to a plurality of SIMs; and identifying an accept message for the request message from the first network node of the second network.

Accordingly, a disclosure of the present specification has been made in an effort to solve the aforementioned problem.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 18 shows an example of a network structure for supporting Multi SIM-related operations.

DESCRIPTION OF EXEMPLARY EMBODIMENTS

Figure 1:
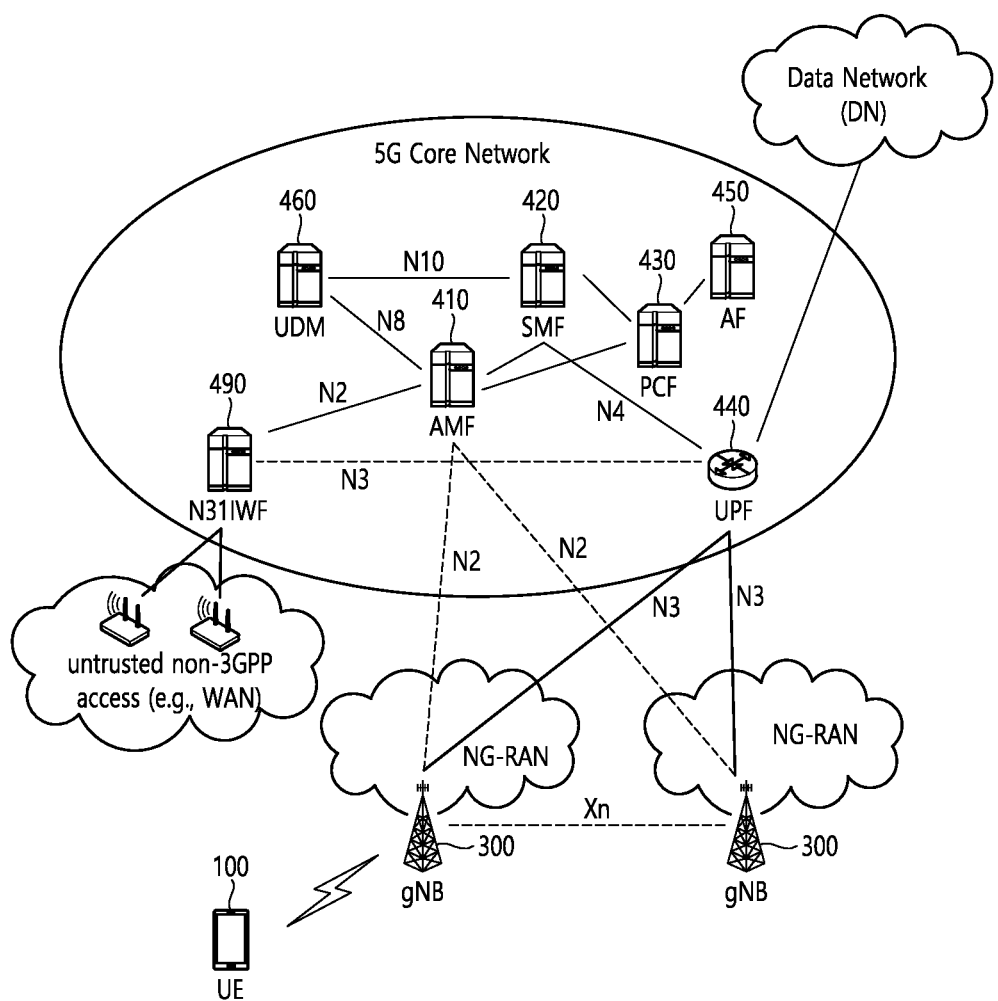
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point) and gNB (Next generation NodeB).

I. Techniques and Procedures Applicable to the Disclosure of the Present Specification FIG. 1 is a Structural Diagram of a Next-Generation Mobile Communication Network.

5GC (5G Core) may include various components, part of which are shown in FIG. 1, including an access and mobility management function (AMF) 410, a session management function (SMF) 420, a policy control function (PCF) 430, a User Plane Function (UPF) 44, an application function (AF) 450, a unified data management (UDM) data network 460, and a non-3GPP interworking function (N3IWF) 490.

A UE 100 is connected to a data network via the UPF 440 through a Next Generation Radio Access Network (NG-RAN) including the gNB 20.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing NAS security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 20 and the SMF 420. In addition, when the UE 100 moves over an area served by the gNB 20, the UPF 440 serves as a mobility anchor point. The UPF 440 may perform a function of handling a PDU. For mobility within the NG-RAN (which is defined after 3GPP Release-15), the UPF 440 may route packets. In addition, the UPF 540 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (100) may be omitted.

The 5th generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band is defined as two types of frequency ranges (FR1, FR2). FR1 is 410 MHz-7125 MHz, and FR2 is 24250 MHz-52600 MHz, which may mean millimeter wave (mmW). For convenience of explanation, among the frequency ranges used in the NR system, FR1 may mean "sub 6 GHz range" and FR2 may mean "above 6 GHz range" and may be called millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
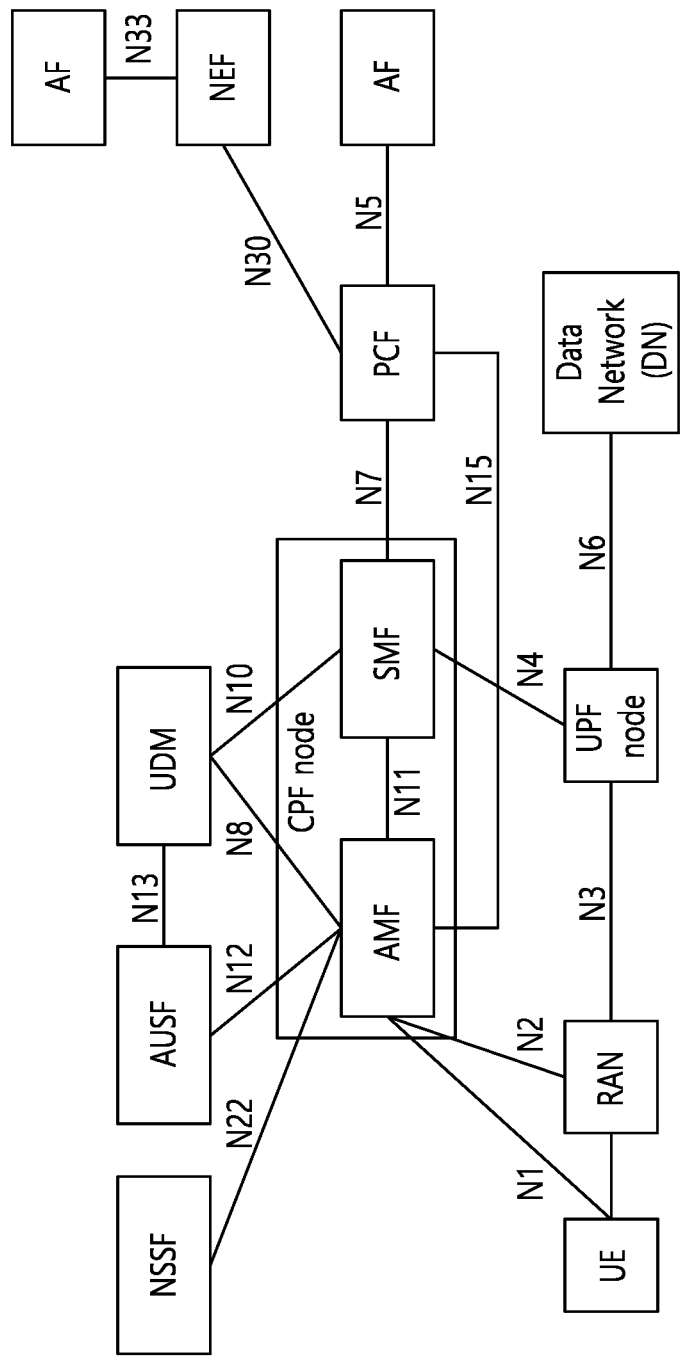
FIG. 2 is an exemplary diagram illustrating a predicted structure of a next generation mobile communication in terms of a node.

FIG. 2 is an Exemplary Diagram Illustrating a Predicted Structure of a Next Generation Mobile Communication in Terms of a Node.

Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
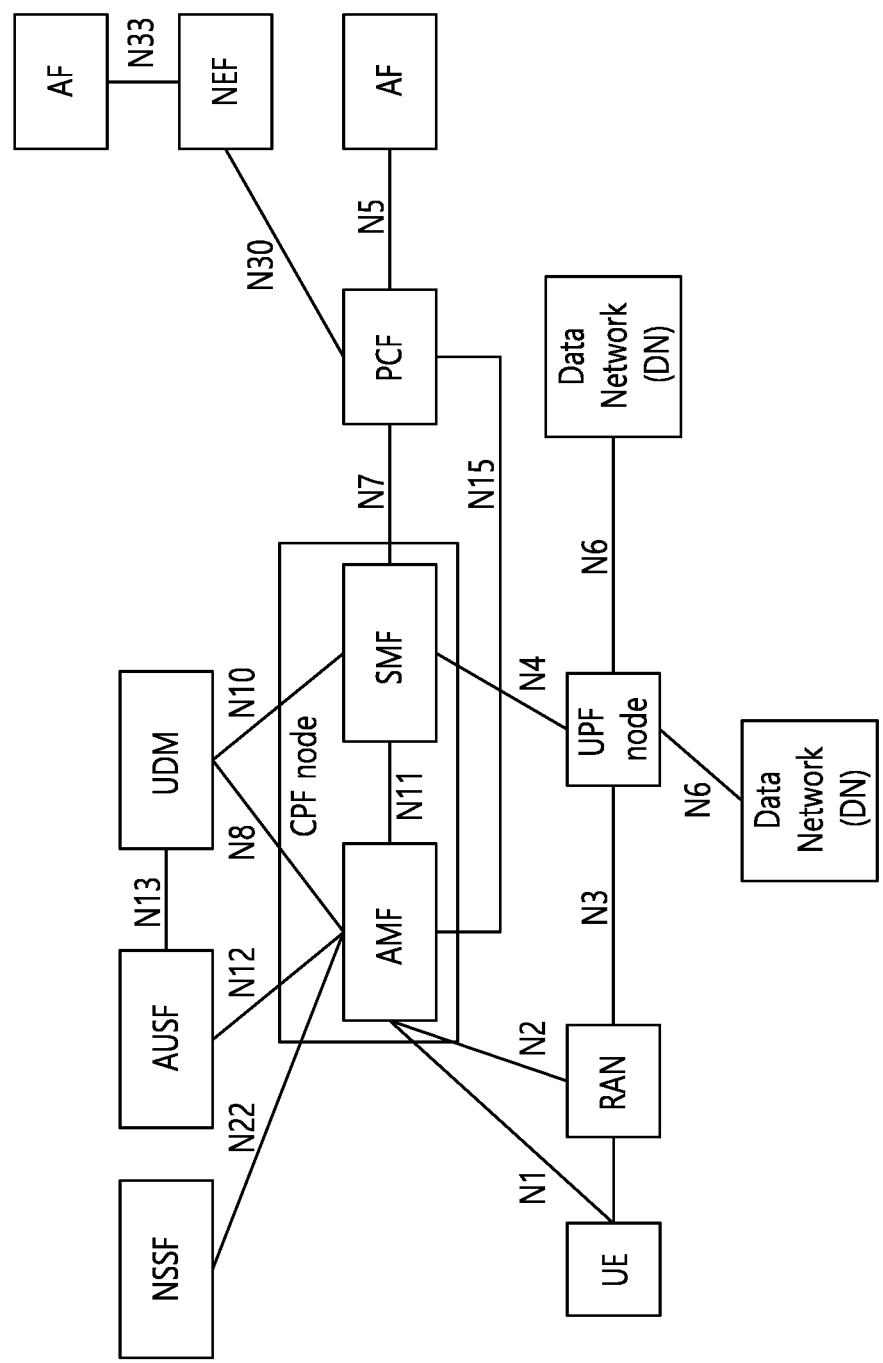
FIG. 3 illustrates an architecture that allows the UE to simultaneously access two data networks using one PDU session.

In FIG. 3, the UE may simultaneously access two data networks using multiple PDU sessions.

FIG. 3 Illustrates an Architecture that Allows the UE to Simultaneously Access Two Data Networks Using One PDU Session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 4:
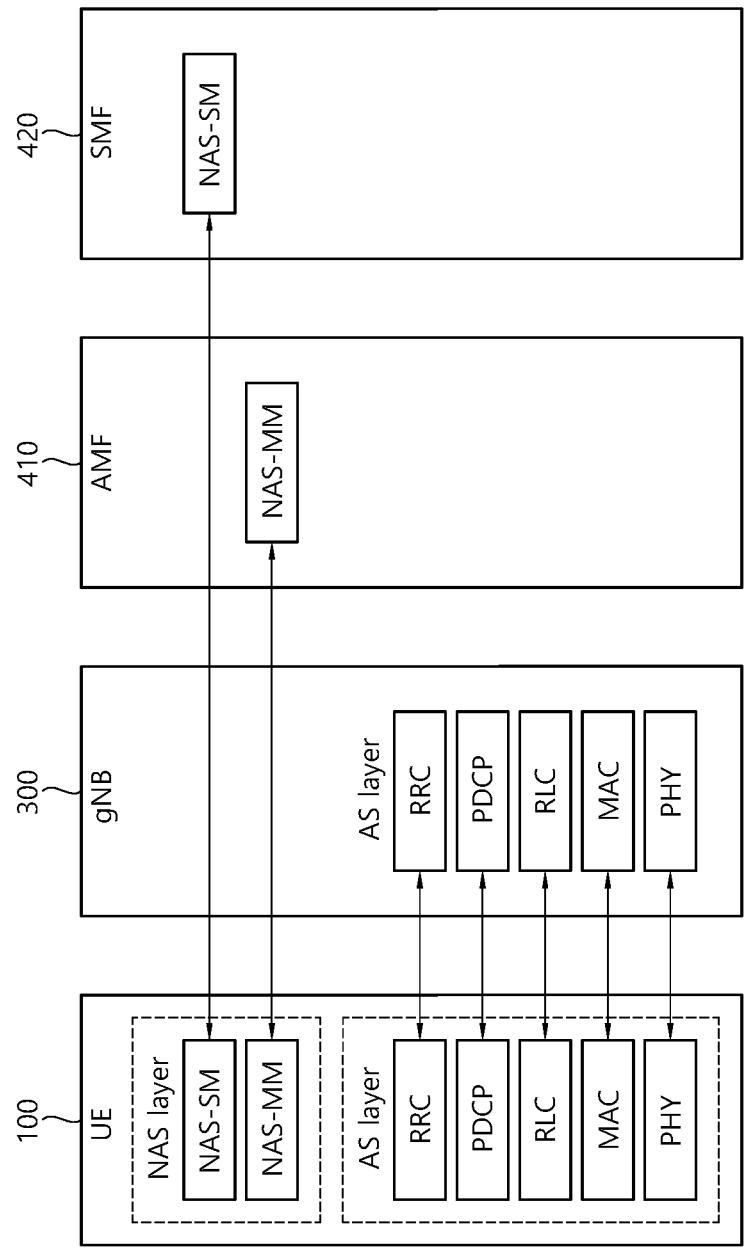
FIG. 4 is another exemplary diagram showing a structure of a radio interface protocol between a UE and a gNB.
Figure 5A:
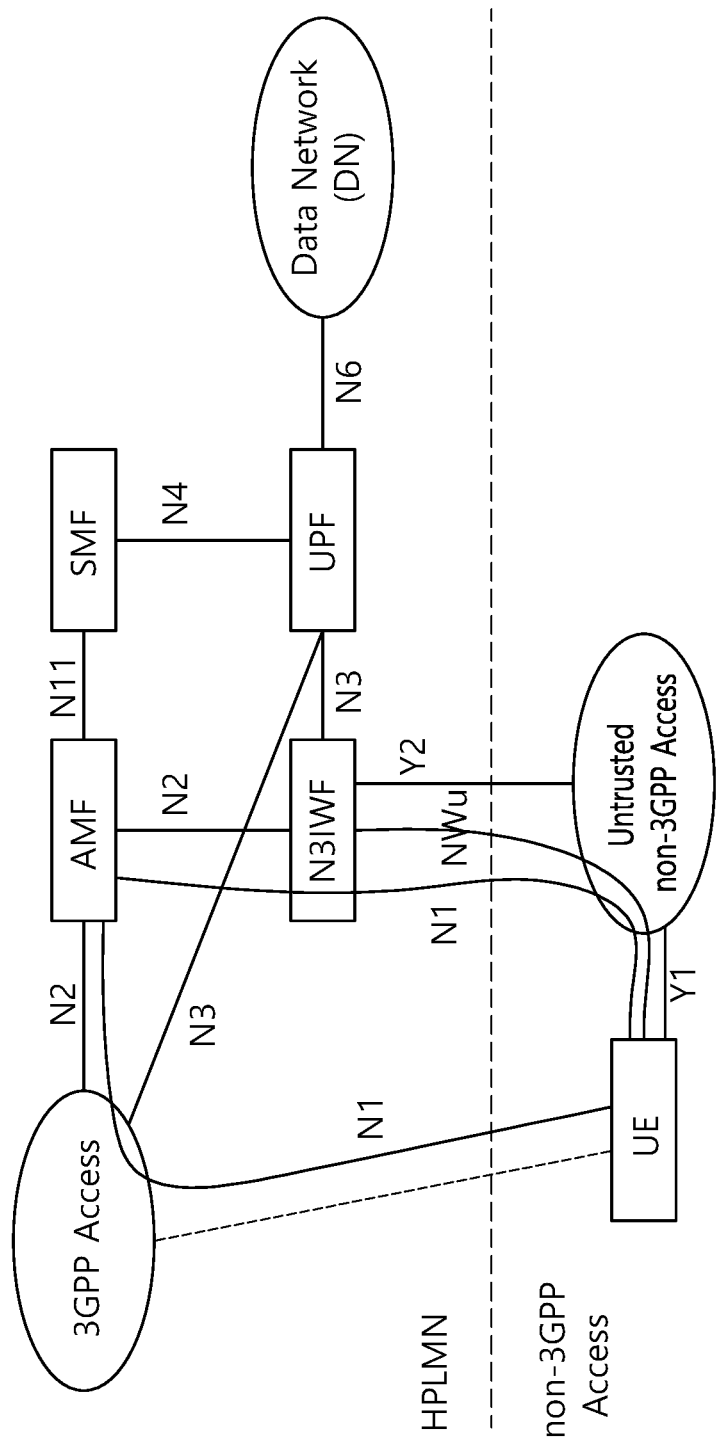
FIGS. 5*a* to 5*f* illustrate architectures for detouring data to a non-3GPP network.
Figure 5B:
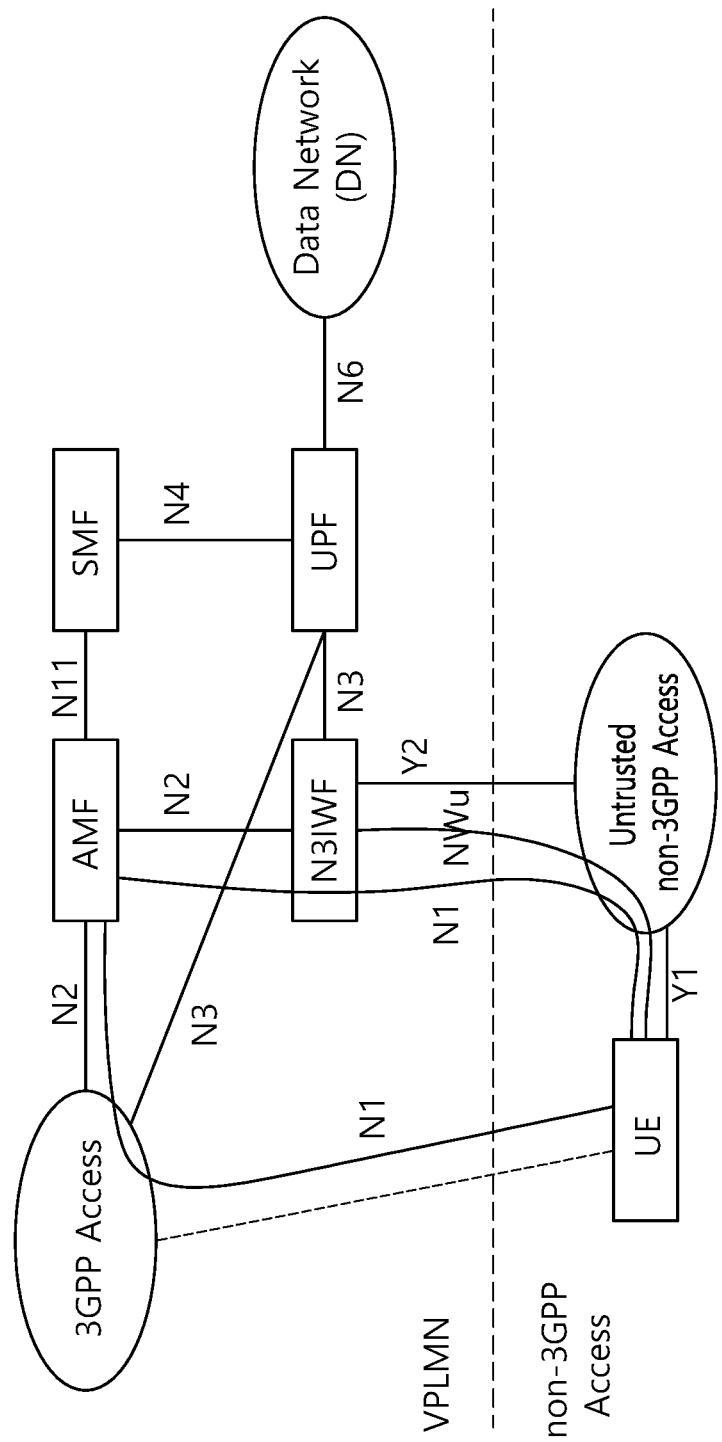
Figure 5C:
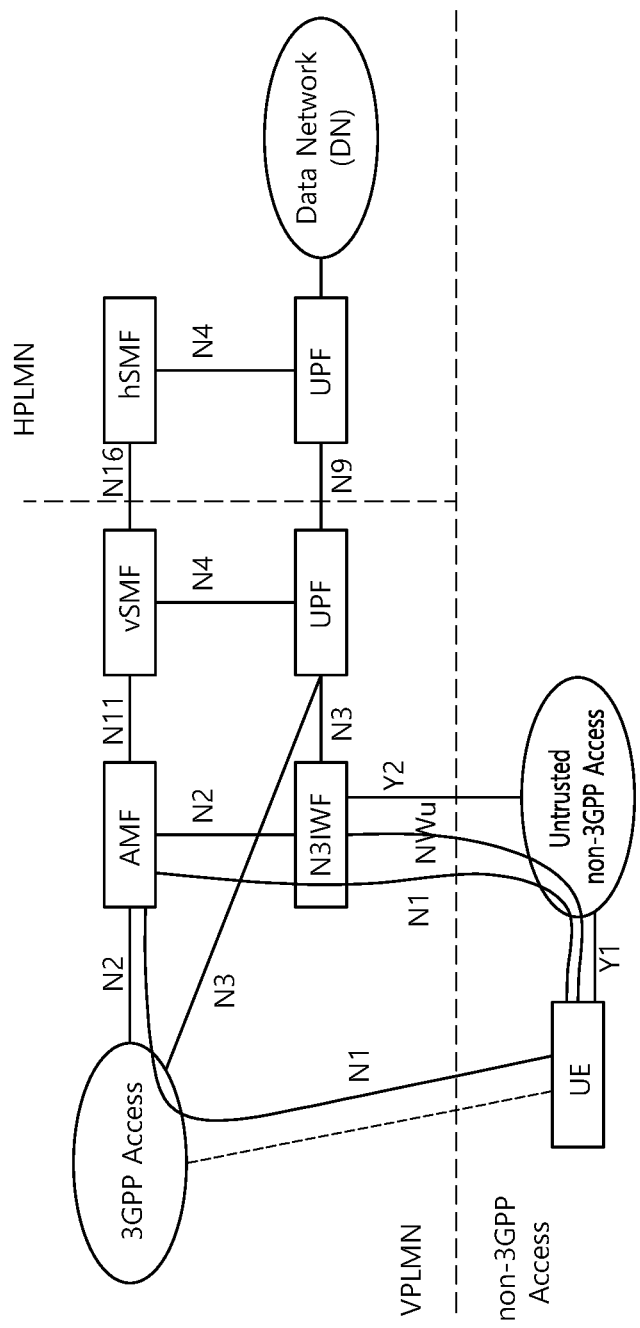
Figure 5D:
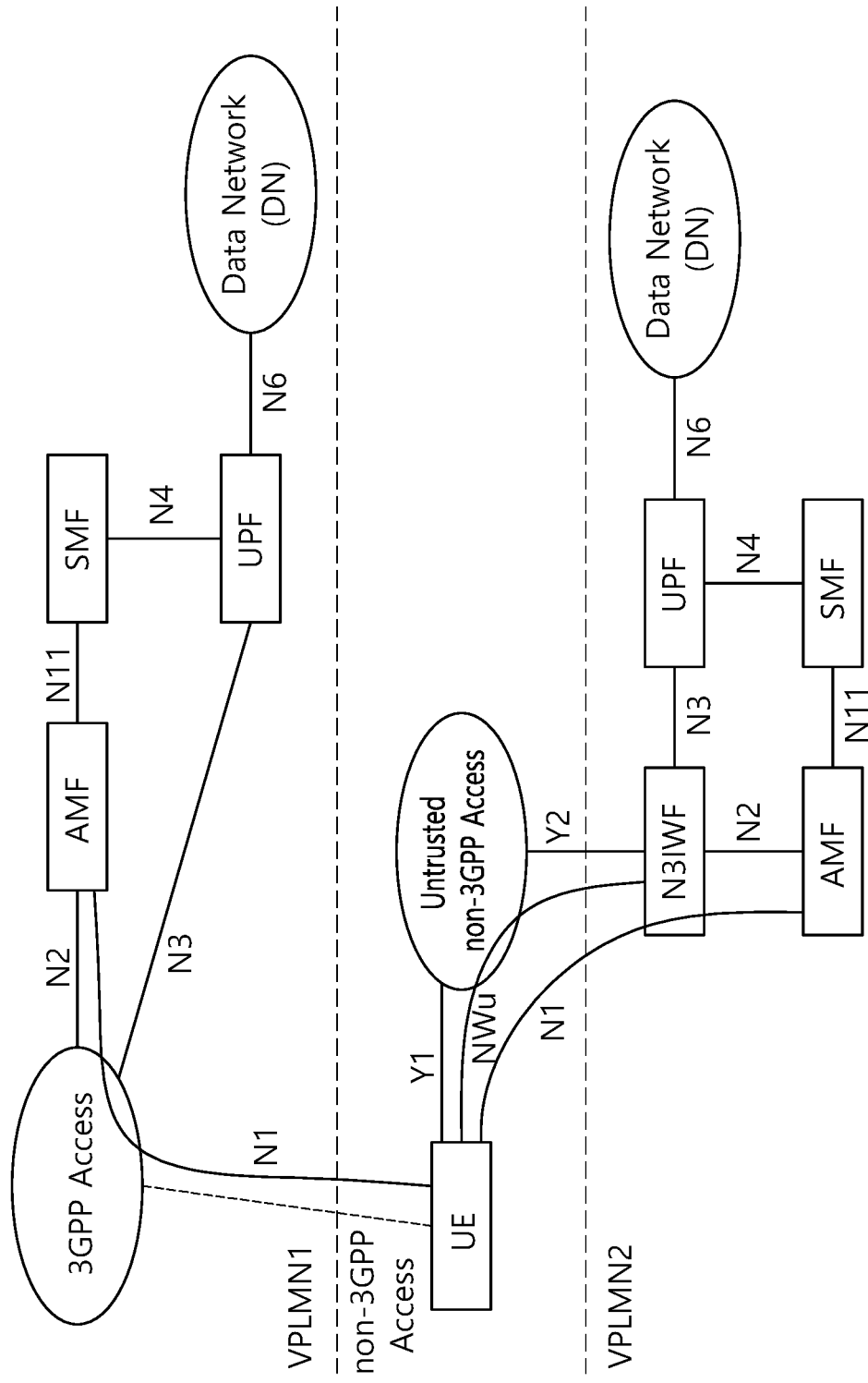
Figure 5E:
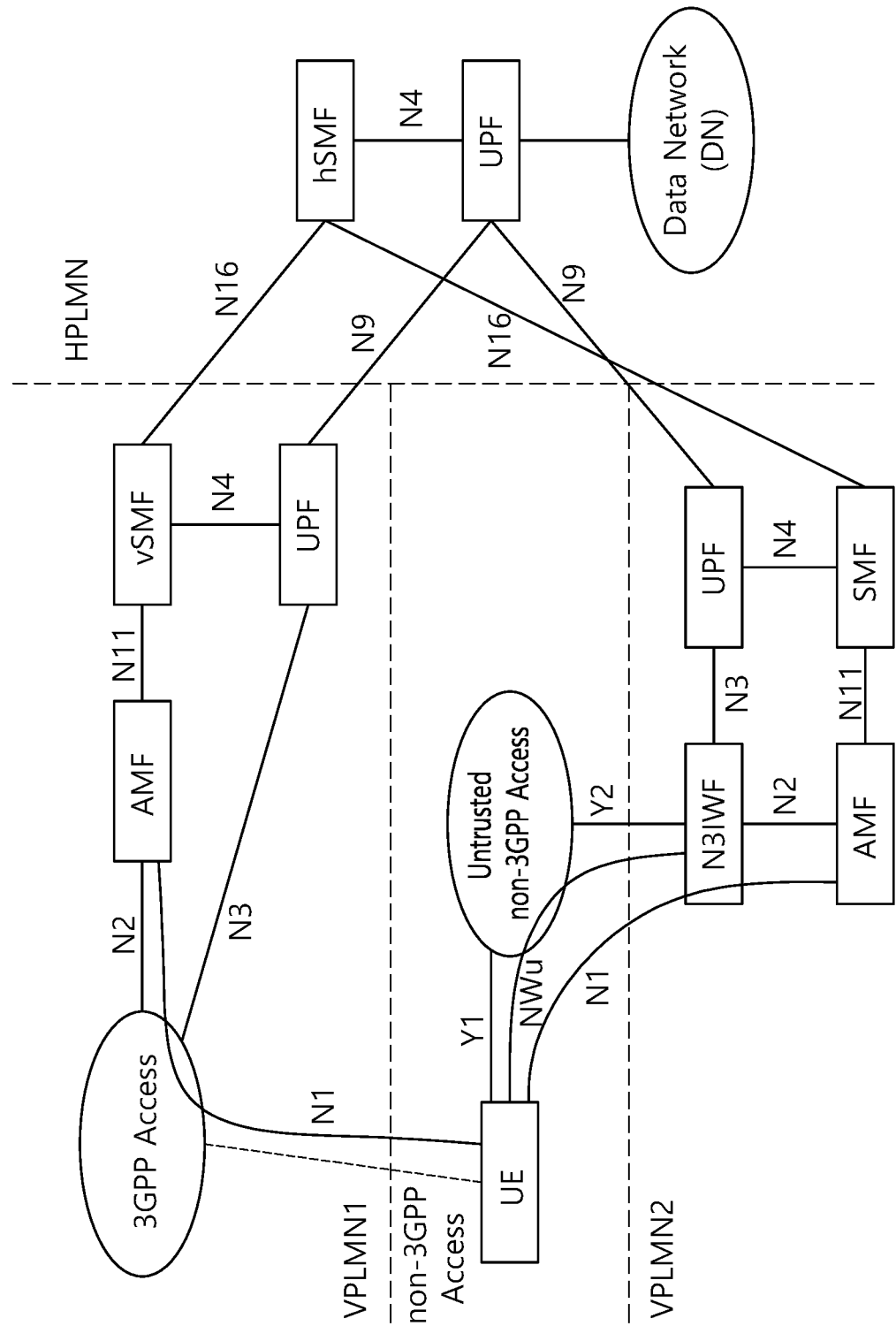
Figure 5F:
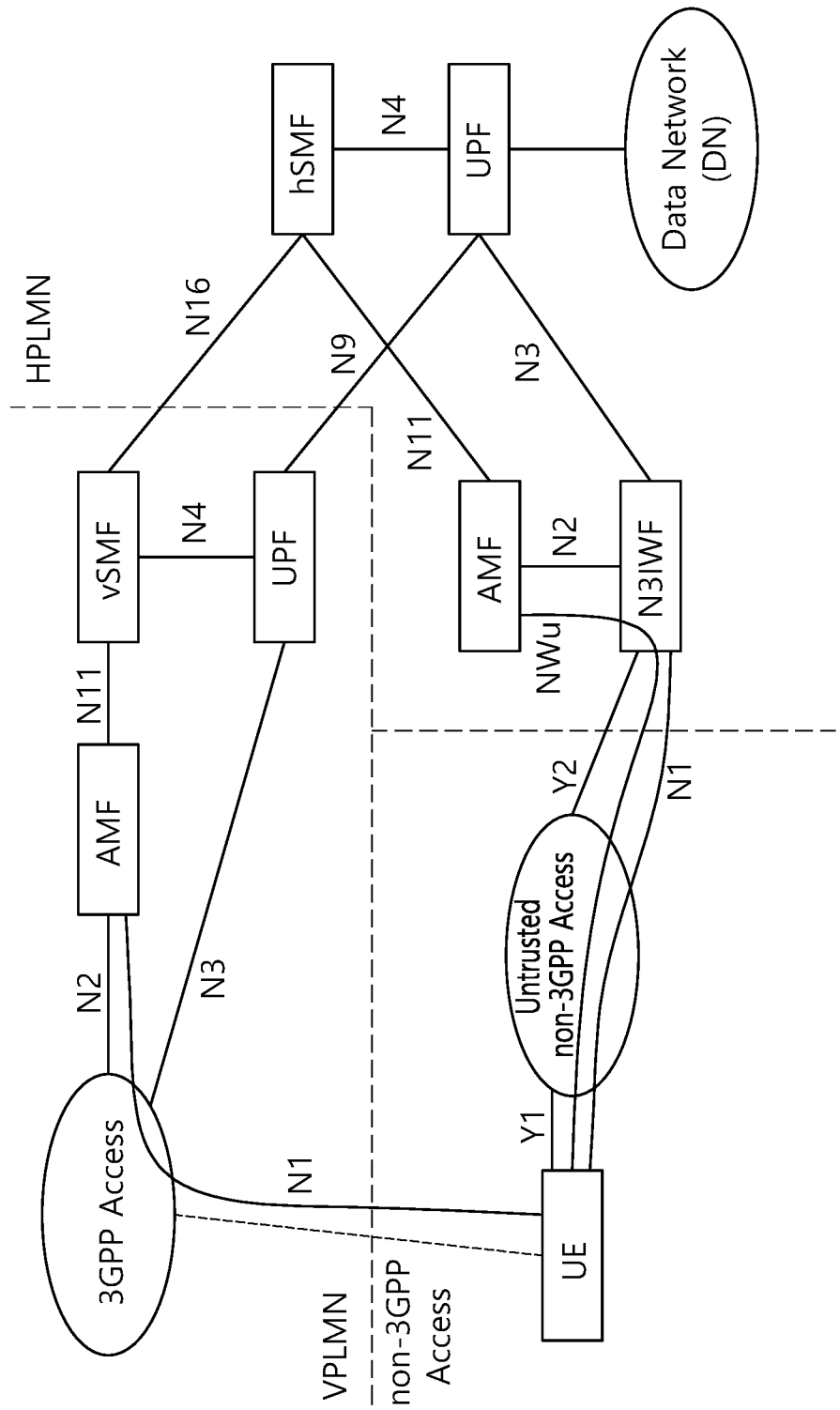

FIG. 4 is Another Exemplary Diagram Showing a Structure of a Radio Interface Protocol Between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.

NAS procedures related to AMF include the following.

Registration management and access management procedures. AMF supports the following functions.

Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,

The NAS entity for the MM creates a NAS-MM message that derives how and where to deliver an SM signaling message through a security header representing the NAS transmission of SM signaling and additional information on a received NAS-MM.

Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Data Detouring to Non-3GPP Network>

In the next generation mobile communication, the data of the UE may be detoured to a non-3GPP network, e.g., a Wireless Local Area Network (WLAN) or WiFi.

FIGS. 5a to 5f illustrate architectures for detouring data to a non-3GPP network.

The Wireless Local Area Network (WLAN) or Wi-Fi is considered as an untrusted non-GPP network. In order to connect the non-3GPP network to a core network, Non-3GPP InterWorking Function (N3IWF) may be added.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new tracking area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 6A:
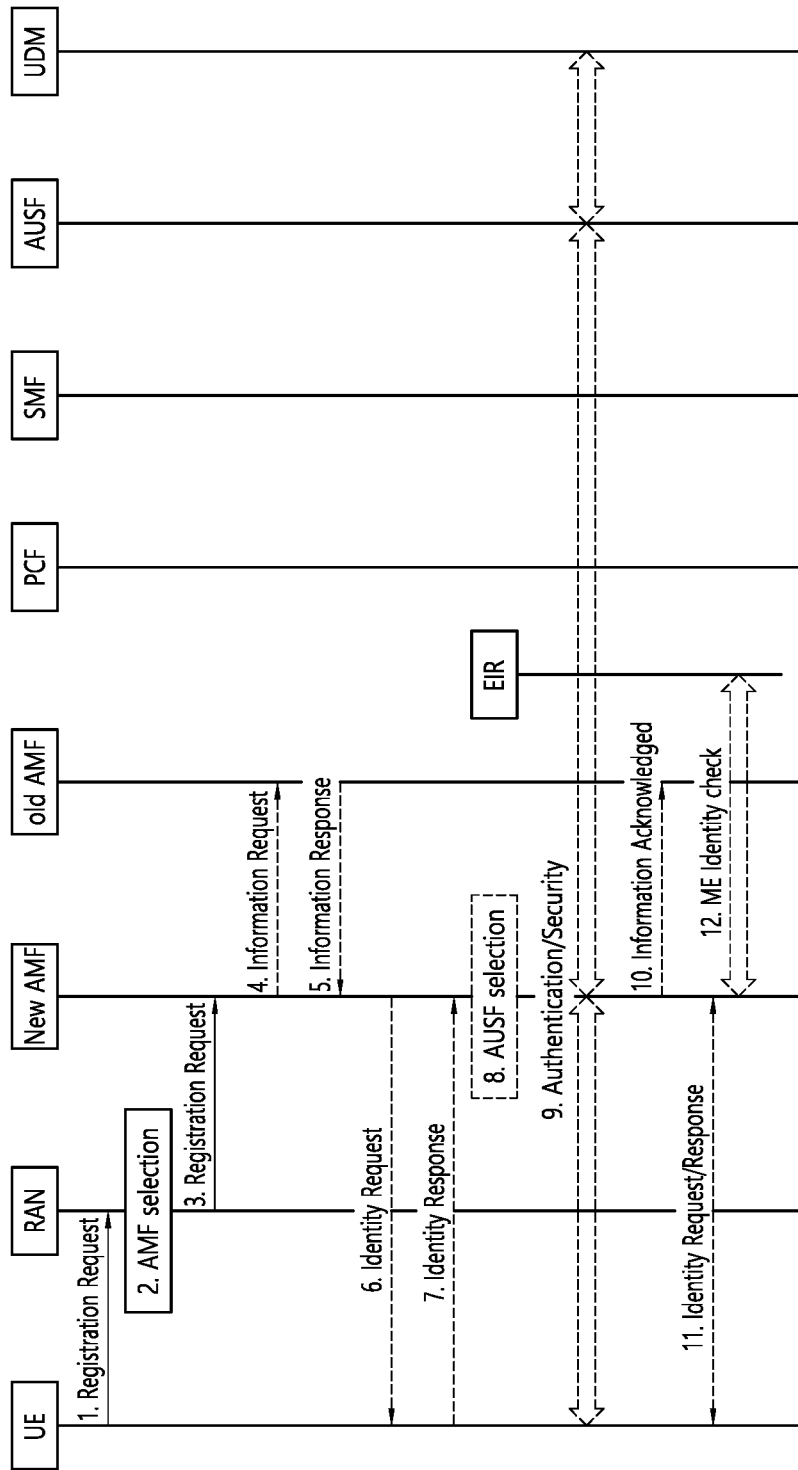
FIGS. 6*a* and 6*b* is a signal flow chart showing an exemplary registration procedure.
Figure 6B:
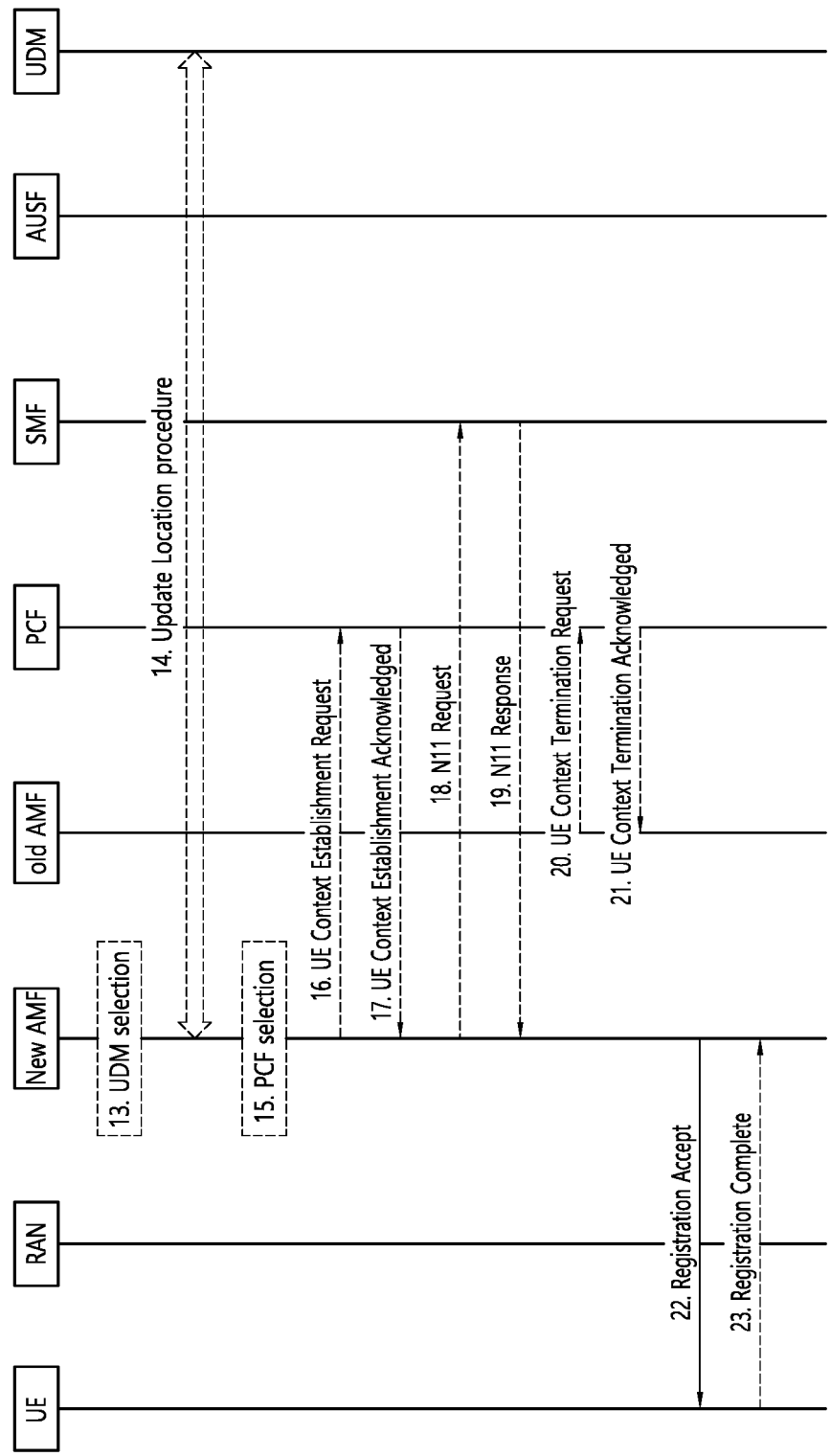

FIGS. 6a and 6b are Signal Flow Charts Showing an Exemplary Registration Procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<Service Request Procedures>

The service request procedure is used to request establishment of a secure connection to AMF by a UE or a 5G core network (5GC). The service request procedure is used to activate the user plane connection of the established PDU session even when the UE is in a CM-IDLE state and a CM-CONNECTED state. For reference, in order to reflect NAS signaling connection between the AMF and the UE, two CM states of the CM-IDLE state and the CM-CONNECTED state are used.

The UE does not initiate a service request procedure if there is an ongoing service request procedure.

The service request procedure includes a service request procedure initiated by the UE (i.e., a UE triggered service request) and a service request procedure initiated by the network (i.e., a network triggered service request).

Figure 9:
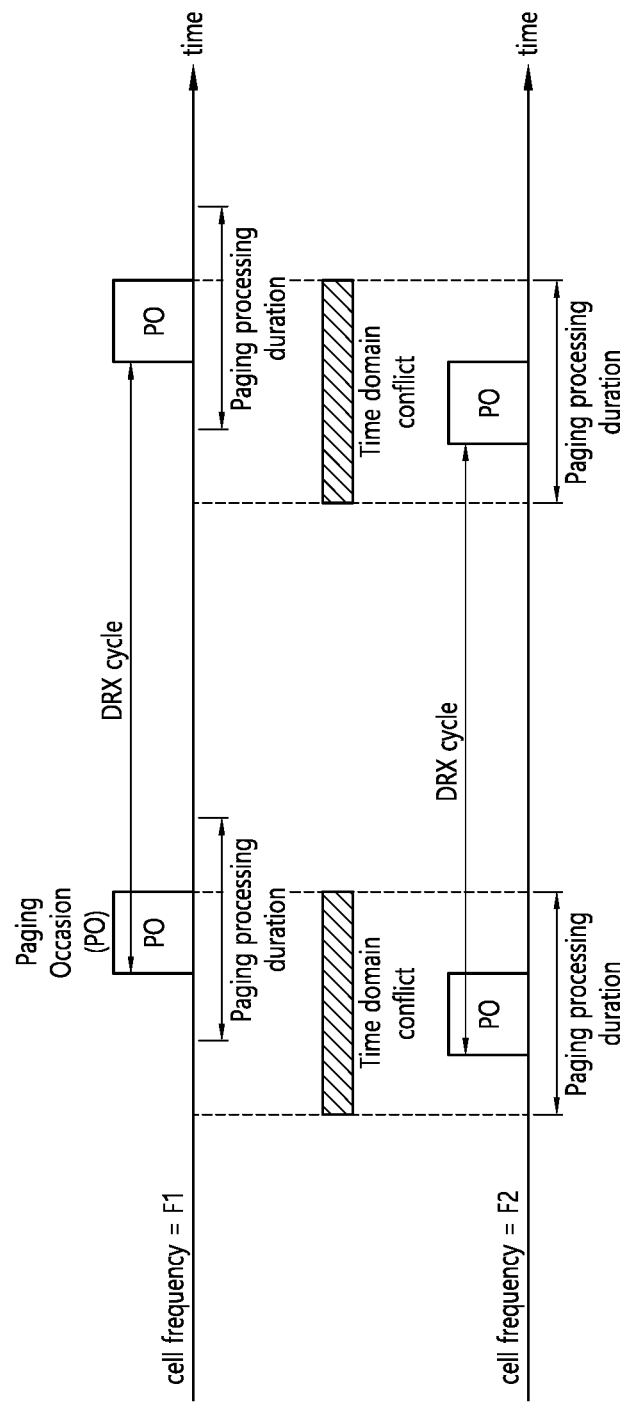
FIG. 9 is a diagram illustrating an example in which paging occasions overlap.

Hereinafter, an example of the UE triggered service request procedure will be described with reference to FIGS. 7A to 7C, and an example of the network triggered service request procedure will be described with reference to FIG. 9. The service request procedure described in FIGS. 7A to 7C and 9 is only an example, and the service request procedure in the present disclosure includes all the service request procedures triggered by the UE and all the service request procedures triggered by the network.

Figure 7A:
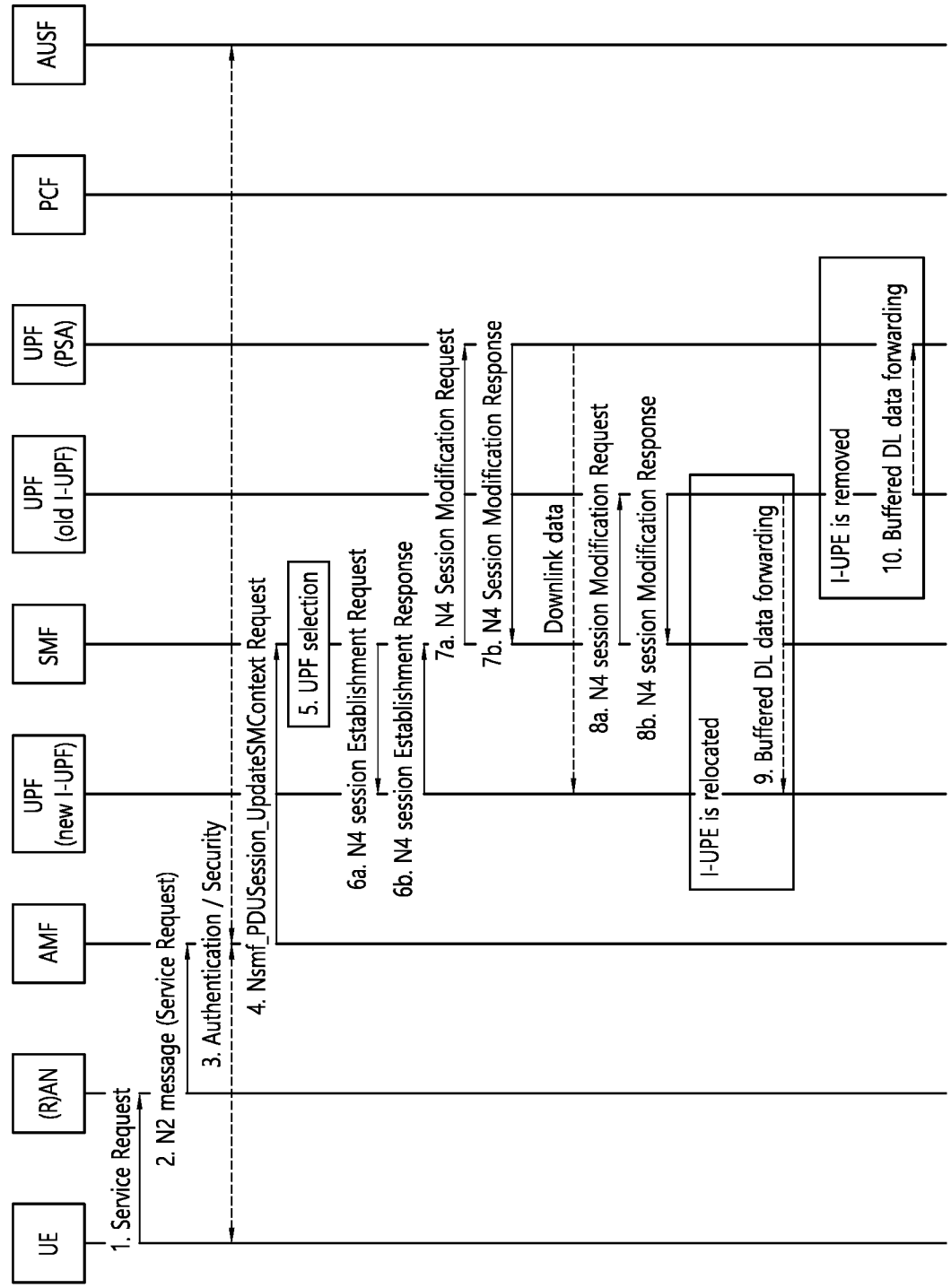
FIGS. 7A to 7C are signal flowcharts illustrating an exemplary UE initiated service request procedure.
Figure 7B:
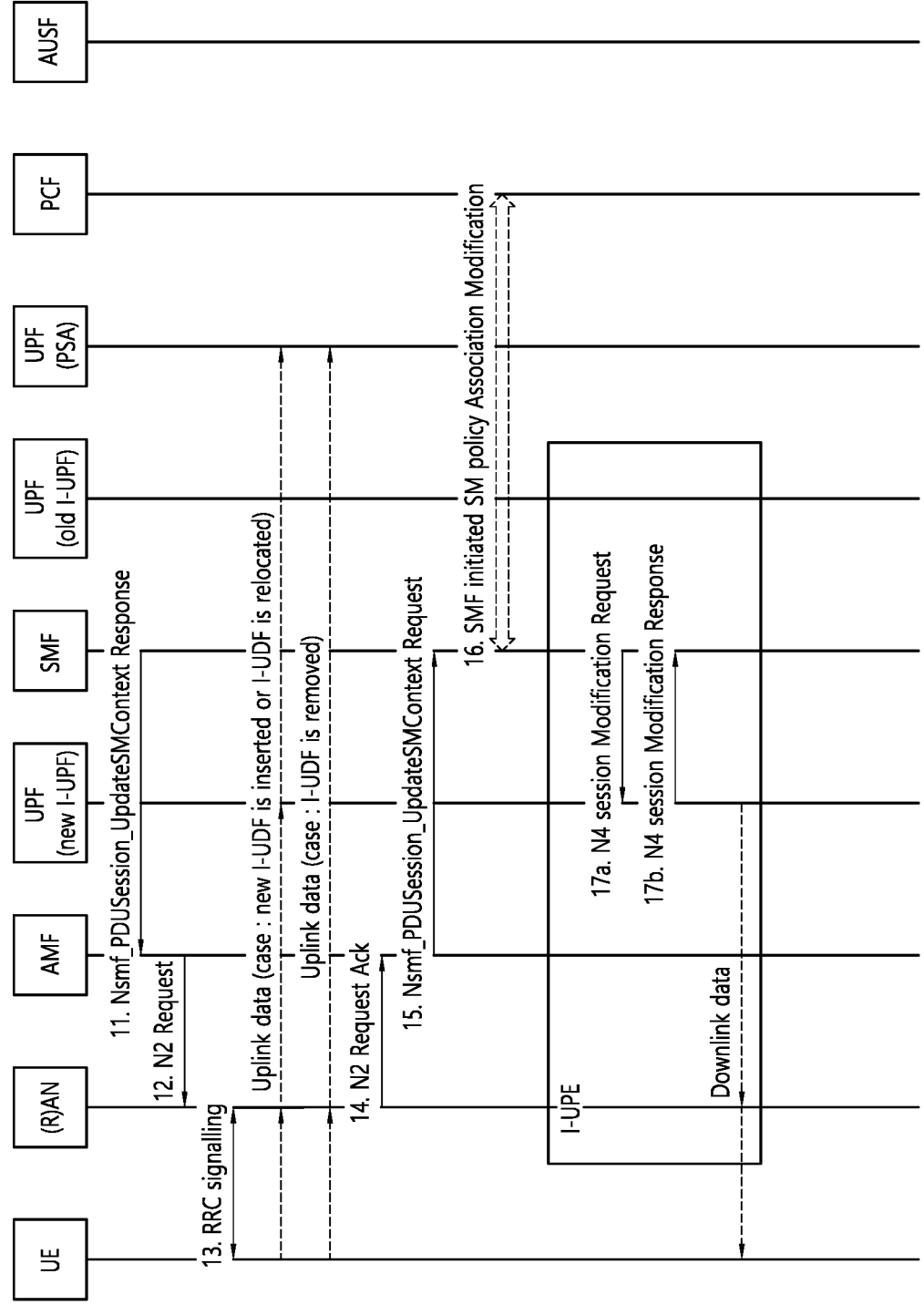
Figure 7C:
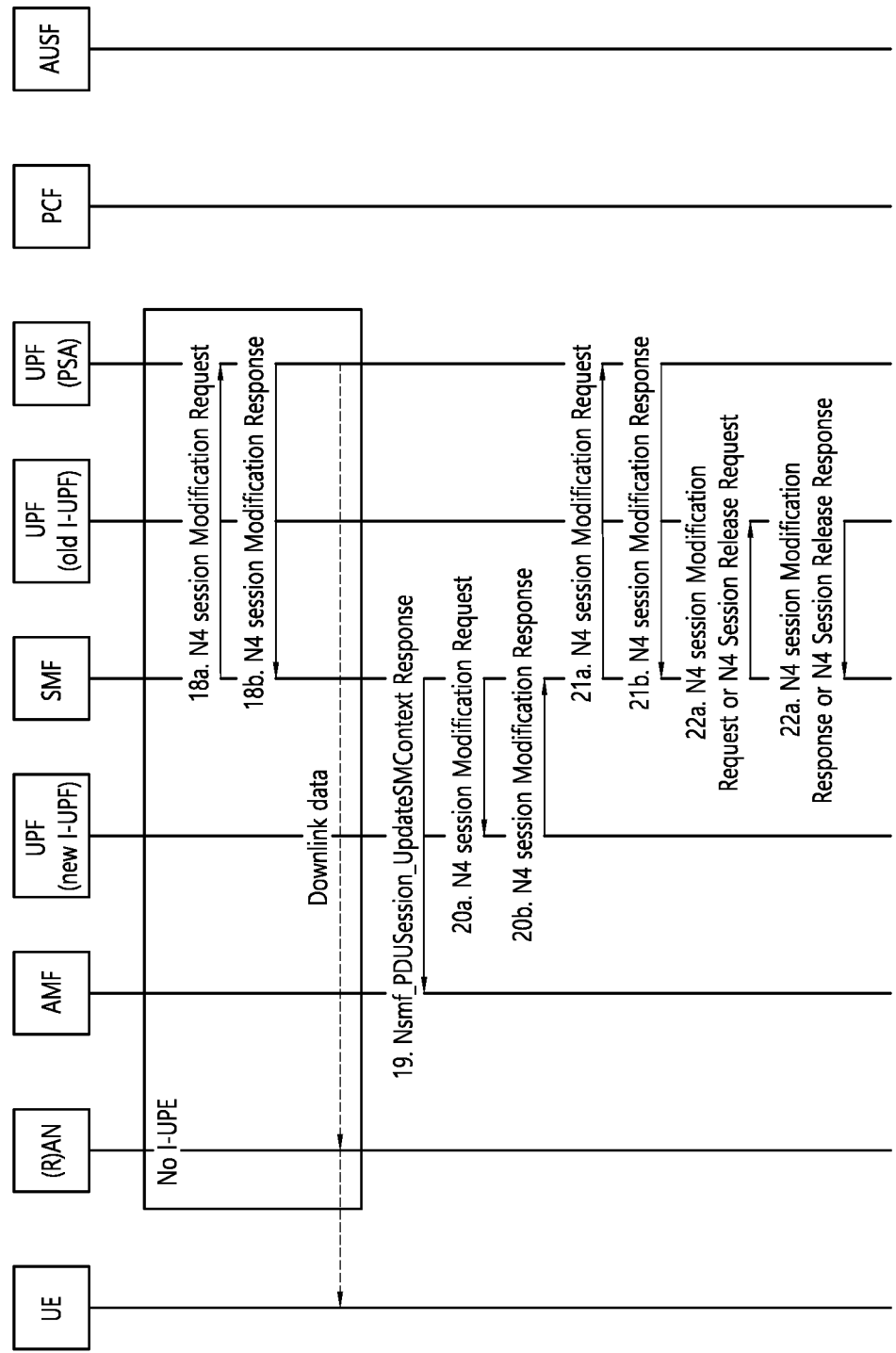

FIGS. 7A to 7C are Signal Flowcharts Illustrating an Exemplary UE Triggered Service Request Procedure.

The UE in the CM-ILDE state initiates a service request procedure to transmit a response on an uplink signaling message, user data, or network paging request. After receiving the service request message, the AMF may perform authentication. After establishing a signaling connection for AMF, the UE or the network may transmit a signaling message (e.g., establishment of a PDU session from the UE to the SMF through the AMF).

The service request procedure may be used by a UE in CM-CONNECTED state to request activation of a user plane connection for a PDU session and to respond to a NAS notification message received from the AMF.

For any service request procedure, if necessary, the AMF may include state information of the PDU session in a service accept message to synchronize a PDU session state between the UE and the network.

If the service request is not accepted by the network, the AMF responds to the UE with a service reject message. The service rejection message may include an indication or a cause code for requesting that the UE perform a registration update procedure.

In the UE triggered service request procedure, both SMF and UPF belong to a PLMN that serves the UE. For example, in a home routed roaming case, the SMF and UPF of the HPLMN are not affected by the service request procedure (that is, the SMF and UPF of the HPLMN are not involved in the service request procedure).

In response to a service request according to user data, the network may take additional action if the user plane connection activation is not successful.

The UE triggered service request procedure may be applied to a scenario with or without an intermediate UPF and a scenario with or without an intermediate UPF reselection.

1) Signaling from UE to (R)AN: the UE may transmit an access network (AN) message (including AN parameters, service request (list of PDU sessions to be activated, list of allowed PDU sessions), security parameters and PDU session status (status)) to the (R)AN.

The list of PDU sessions to be activated is provided by the UE when the UE attempts to re-activate the PDU session. The list of allowed PDU sessions is provided by the UE when the service request is a response to a NAS notification or paging of a PDU session related to non-3GPP access. And, the list of allowed PDU sessions identifies PDU sessions that may be moved to 3GPP access.

In case of NG-RAN:
AN parameters include the selected PLMN ID and establishment cause. The establishment cause provides a reason for requesting establishment of an RRC connection.

The UE transmits a service request message (message to AMF) encapsulated in an RRC message to the NG-RAN. The RRC message may be used to carry 5G system architecture evolution (SAE)-temporary mobile subscriber identity) (5G-S-TMSI).

When a service request is triggered for user data, the UE notifies a PDU session in which a user plane (UP) connection is to be activated in a service request message using a list of PDU sessions to be activated.

When the service request is triggered only for signaling, the UE does not include a list of PDU sessions to be activated.

When a service request procedure is triggered for a paging response and the UE has user data to be transmitted at the same time, the UE may inform about the PDU session with a UP connection to be activated in the service request message using the list of PDU sessions to be activated. Otherwise, the UE does not inform about any PDU session in the service request for paging response.

In a specific case, if there is no pending uplink data of PDU sessions, if a service request is triggered only for signaling, or if a service request is triggered for a paging response, the UE may include the PDU session to the list of PDU sessions to be activated.

When a service request through 3GPP access is triggered in response to a NAS notification indicating paging or non-3GPP access, the UE includes the non-3GPP PDU session that may be reactivated through 3GPp in the allowed PDU session list (See the example to be described in step 6 of FIG. 9).

The PDU session state indicates a PDU session available in the UE.

When the UE is located outside an available area of the LADN, the UE does not trigger a service request procedure for a PDU session corresponding to the LADN. Also, when the service request is triggered for other reasons, the UE does not include the PDU session in the list of PDU sessions to be activated.

When the UE is in the CM-CONNECTED state, only a list of PDU sessions to be activated and a list of allowed PDU sessions may be included in the service request.

2) (R)AN to AMF signaling: (R)AN may transmit an N2 message to AMF. The N2 message may include N2 parameters, a service request, and a UE context request.

If the AMF cannot handle the service request, the AMF will reject the service request.

When NG-RAN is used, N2 parameter may include 5G-S-TMSI, the selected PLMN ID, location information, and establishment cause.

When the UE is in the CM-IDLE state, the NG-RAN may acquire 5G-S-TMSI in the RRC procedure. The NG-RAN may select AMF based on 5G-S-TMSI. The location information is related to a cell on which the UE camps.

Based on the PDU session state, the AMF may perform a PDU session release procedure for PDU sessions indicated by the UE that the PDU session ID is not available in the network.

3a) Signaling from AMF to (R)AN: AMF may transmit an N2 request to (R)AN. Here, the N2 request may include a security context, a handover restriction list, and a list of recommended cells/TAs/NG-RAN node identifiers.

When the 5G-AN requests for the UE context or the AMF needs to provide the UE context (e.g., when the AMF needs to initiate a fallback procedure for an emergency service), the AMF may initiate an NG application protocol (NGAP) procedure. For a UE in a CM-IDLE state, the 5G-AN stores security context in the UE AN context. The handover restriction list is related to mobility restrictions.

The 5G-AN uses the security context to protect messages exchanged with the UE.

When the NG-RAN node provides a list of recommended cells/TAs/NG-RAN node identifiers during the AN release procedure, the AMF may include the list of recommended cells/TAs/NG-RAN node identifiers in the N2 request. When the RAN determines to enable the RRC inactive state for the UE, the RAN may use this information to allocate a RAN notification area.

3) If the service request is not transmitted as being integrity protected or integrity protection verification failed, the AMF may initiate a NAS authentication/security procedure.

When the UE in the CM-IDLE state initiates a service request only for signaling connection, the UE and the network may exchange NAS signaling after successful establishment of the signaling connection, and steps 4 to 11 and steps 15 to 22 of FIGS. 7A to 7C may be omitted.

4) [Conditional Operation] Signaling from AMF to SMF: The AMF may transmit an Nsmf_PDUSession_UpdateSMContext Request to the SMF. Here, the Nsmf_PDUSession_UpdateSMContext Request may include a PDU session ID, operation type, UE location information, access type, RAT type, and UE presence in LADN service area.

Nsmf_PDUSession_UpdateSMContext Request is invoked in the following cases:

When the UE includes a list of PDU sessions to be activated in the service request message;

When this procedure is triggered by the SMF but a PDU session identified by the UE is correlated with a PDU session ID different from the PDU session ID that triggers this procedure;

When this procedure is triggered by the SMF but a current UE location is outside the "area of validity for the N2 SM information" provided by the SMF (see step 3a in FIG. 9). In this case, the AMF does not transmit the N2 information provided by the SMF (see step 3a in FIG. 9). If the current UE location is outside the "available area of N2 SM information", steps 4 to 11 are omitted.

If the DNN corresponds to the LADN, "the presence of the UE in the LADN service area" indicates whether the UE is inside (IN) or outside (OUT) the LADN service area. If the AMF does not provide an indication of "the presence of a UE in the LADN service area" and the SMF determines that the DNN corresponds to the LADN, the SMF considers the UE to be outside the LADN service area.

The AMF determines whether the PDU session(s) will be activated. In addition, the AMF transmits the Nsmf_PDUSession_UpdateSMContext Request related to the PDU session to the SMF along with an operation type set to "UP active" to indicate establishment of the user plane resource for the PDU session. The AMF determines an access type and an RAT type based on a global RAN node ID related to an N2 interface.

If this procedure is triggered in response to a paging or NAS notification indicating non-3GPP access and the UE is not on the list (provided by the UE) of PDU sessions allowed in the paged or notified PDU session, the AMF may notify the SMF that the user plane for the PDU session cannot be reactivated. The service request procedure may be terminated without reactivation of the user plane for other PDU sessions in the list of allowed PDU sessions.

While the previous NAS signaling connection through the NG-RAN is maintained, the AMF may receive a service request through the NG-RAN to establish another NAS signaling connection. In this case, in order to release the previous NAS signaling connection, AMF may trigger an AN release procedure for the old NG-RAN according to the following logic:

For the PDU session indicated in the "list of PDU sessions to be activated", the AMF may request the SMF to immediately activate the PDU session by performing this step 4.

For a PDU session included in the "list of PDU session ID(s) with active N3 user plane" but not included in the "list of PDU sessions to be activated", the AMF may request the SMF to deactivate the PDU session.

5) If the PDU session ID corresponds to the LADN and the SMF determines that the UE is located outside the available area of the LADN based on the "UE presence in the LADN service area" provided by the AMF, the SMF may determine to perform the following actions (based on a local policy).

SMF may maintain the PDU session. However, the SMF may reject the activation of the user plane connection of the PDU session and notify the AMF accordingly. When the service request procedure is triggered by the network initiated service request of FIG. 9, the SMF may notify the UPF (UPF that has sent data notification) that the UPF should discard downlink data for the PDU session and/or should not provide an additional data notification message; or The SMF may release the PDU session: The SMF may release the PDU session and inform the AMF that the PDU session has been released.

In the above two cases, the SMF responds to the AMF with an appropriate reject cause, and user plane activation of the PDU session may be stopped.

When the SMF determines that the UE is located in the LADN available area, the SMF may check a UPF selection criterion based on the location information received from the AMF and determine to perform one of the following operations:

The SMF accepts the activation of the UP connection and may continue to use the current UPF;

When the UE moves outside the service area of the UPF (the UPF previously connected to the AN), the SMF, while maintaining the UPF acting as a PDU session anchor, may accept activation of the UP connection and select a new intermediate UPF (or may add/remove intermediate UPFs (I-UPF)). The steps to perform the addition/change/removal of the I-UPF are described below through conditional steps.

NOTE 1: When old and/or new I-UPF implements a UL uplink classifier (CL) or branching point (BP) function and a PDU session anchor for connectivity of local access to the data network, the signaling described in this figure is intended as signaling for adding, removing, or changing a PDU session anchor, and signaling for adding, releasing, or changing UL CL or BP, should be performed by a different procedure.

The SMF may reject activation of the UP connection of the PDU session in session and service continuity (SSC) mode 2. In addition, after the service request procedure, the SMF may trigger re-establishment of a PDU session in order to perform allocation of a new UPF (UPF acting as a PDU session anchor). (This operation may be performed, for example, when the UE is moved outside the service area of the anchor UPF connected to the NG-RAN)

6a) [Conditional operation] Signaling from SMF to new UPF (or new I-UPF): The SMF may transmit an N4 session establishment request to the UPF.

When the SMF selects a new UPF acting as an I-UPF for a PDU session or when the SMF chooses to insert an I-UPF for a PDU session (which did not have an I-UPF), the SMF may transmit a N4 session establishment request to the UPF. Here, the N4 establishment request provides packet detection to be installed in the I-UPF, data forwarding, enforcement, and reporting rules. PDU session anchor addressing information for a PDU session (PDU session anchor addressing information at an N9 reference point (a reference point between two UPFs)) is also provided to the I-UPF.

When a service request is triggered by the network, and the SMF selects a new UPF to replace the existing UPF (or the existing I-UPF), the SMF may include a data forwarding indication in the N4 session establishment request. The data forwarding indication may indicate to the UPF that second tunnel endpoint needs to be reserved for DL data buffered after being provided from the previous I-UPF.

6b) Signaling from new UPF (or I-UPF) to the SMF: The new UPF (or I-UPF) may transmit an N2 session establishment response (N4 Session establishment response) to the SMF.

The new I-UPF may transmit an N4 session establishment response to the SMF. When the UPF allocates CN tunnel information, the new I-UPF may transmit DL core network (CN) tunnel information for the UPF acting as a PDU session anchor and UL tunnel information of the new I-UPF to the SMF. When a data transfer indication is received, a new UPF (or I-UPF) operating as an N3 terminating point may transmit DL tunnel information of the new I-UPF to the SMF for data transmission from the existing UPF (or I-UPF) to the SMF. If the previous I-UPF resource exists, the SMF may drive a timer to be used in step 22a to release the corresponding resource.

7a) [Conditional operation] Signaling from SMF to UPF (PSA: PDU session anchor) signaling: SMF may transmit an N4 session modification request to the UPF.

When the SMF selects a new UPF to operate as an I-UPF for a PDU session, the SMF may transmit an N4 session modification request message to the PDU session anchor UPF to provide DL tunnel information received from the new I-UPF. When a new I-UPF is added for a PDU session, the UPF (PSA) may provide DL data to the new I-UPF as indicated in the DL tunnel information.

If a service request is triggered by the network and the SMF removes the existing I-UPF and does not replace the existing I-UPF with a new I-UPF, the SMF may include the data forwarding indication in the N4 session modification request. The data forwarding indication may indicate to the UPF (PSA) that the second tunnel endpoint needs to be reserved for buffered DL data received from the existing I-UPF. In this case, the UPF (PSA) may start buffering DL data that may be simultaneously received from the N6 interface.

7b) The UPF (PSA) may transmit an N4 session modification response message to the SMF.

When the UPF (PSA) receives the data forwarding indication, the UPF (PSA) becomes an N3 endpoint and the UPF (PSA) may transmit CN DL tunnel information for the previous UPF (or I-UPF) to the SMF. The SMF may start a timer. If the previous I-UPF resource exists, the SMF may drive a timer to be used in step 22a in order to release the corresponding resource.

When the UPF connected to the RAN is a UPF (PSA) and the SMF receives Nsmf_PDUSession_UpdateSMContext Request (including operation type set to "UP activate" to indicate establishment of user plane resource for the PDU session), if the SMF finds that the PDU session is active, the SMF may initiate an N4 session modification procedure to remove the AN tunnel information and remove the AN tunnel information from the UPF.

8a) [Conditional operation] Signaling from SMF to existing UPF (or I-UPF): The SMF may transmit N4 session modification (including new UPF address, new UPF DL tunnel ID) to the existing UPF (or I-UPF).

When a service request is triggered by the network and the SMF removes the existing UPF (or I-UPF), the SMF may transmit an N4 session modification request message to the existing UPF (or I-UPF) to provide DL tunnel information for buffered DL data. When the SMF allocates a new I-UPF, the DL tunnel information is received from a new UPF (or I-UPF) operating as an N3 endpoint. If the SMF does not allocate a new I-UPF, the DL tunnel information is transmitted from the UPF (PSA) operating as an N3 endpoint. The SMF may drive a timer for monitoring a forwarding tunnel as in step 6b or 7b.

When the SMF receives the Nsmf_PDUSession_UpdateSMContext Request of step 4 (including an operation type set to "UP activate" to instruct establishment of user plane resources for the PDU session), if the SMF knows that the PDU session has been activated, the SMF may remove the AN tunnel information to remove tunnel information of the AN in the UPF and may initiate an N4 session modification procedure.

8b) Signaling from the existing UPF (or I-UPF) to the SMF: The existing UPF (or I-UPF) may transmit an N4 session modification response message to the SMF.

9) [Conditional operation] Signaling from an existing UPF (or I-UPF) to a new UPF (or I-UPF): The existing UPF (or I-UPF) may deliver downlink data buffered with a new UPF (or I-UPF).

When the I-UPF is changed and a forwarding tunnel is established for a new I-UPF, the existing UPF (or I-UPF) transfers the buffered data to the new UPF (or I-UPF) operating as an N3 endpoint.

10) [Conditional operation] Signaling from the existing UPF (or I-UPF) to the UPF (PSA): The existing UPF (or I-UPF) may transfer buffered downlink data to the UPF (PSA).

When the existing I-UPF is removed, the new I-UPF is not allocated t the PDU session, and a forwarding tunnel is established for the UPF (PSA), the existing UPF (or I-UPF) may transfer the data buffered to the existing UPF (or I-UPF) to a new UPF (PSA) acting as an N3 endpoint.

11) [Conditional Operation] Signaling from SMF to AMF: SMF may transmit Nsmf_PDUSession_UpdateSMContext Response to AMF.

Nsmf_PDUSession_UpdateSMContext Response may include N2 SM information (PDU session ID, QFI(s) (QoS Flow ID), quality of service (QoS) profile, CN N3 tunnel information, S-NSSAI, user plane security enforcement, UE integrity protection maximum data rate, and a cause. When the UPF connected to the RAN is UPF (PSA), the CN N3 tunnel information is UL tunnel information of UPF (PSA). When the UPF connected to the RAN is a new I-UPF, the CN N3 tunnel information is UL tunnel information of the I-UPF.

For the PDU session in which the SMF determines to accept the activation of the UP connection in step 5, the SMF may generate only N2 SM information and transmit an Nsmf_PDUSession_UpdateSMContext Response to the AMF to establish a user plane. The N2 SM information may include information to be provided by AMF to the NG-RAN. When the SMF determines to change the PSA UPF for the SSC mode 3 PDU session, the SMF may trigger a change of the SSC mode 3 PDU session anchor as an independent procedure after accepting UP activation of the PDU session.

The SMF may reject the activation of the UP of the PDU session by including the cause in the Nsmf_PDUSession_UpdateSMContext Response. The SMF may reject activation of the UP of the PDU session in the following cases, for example:

When the PDU session corresponds to the LADN and the UE is located outside the available area of the LADN as in step 5;

When the AMF informs the SMF that the UE is reachable only for a regulatory prioritized service and the PDU session to be activated is not for the regulatory prioritized service; or When the SMF determines to change the PSA UPF for the requested PDU session as in step 5. In this case, after the SMF transmits the Nsmf_PDUSession_UpdateSMContext Response, the SMF may perform another procedure to instruct the UE to re-establish the PDU session for SSC mode 2.

If the SMF receives a negative response in step 6b due to UPF resource unavailability.

When an EPS bearer ID is assigned to a PDU session, the SMF maps the EPS bearer ID and QFI to N2 SM information and transmits the same to the NG-RAN.

User plane security enforcement information is determined by the SMF during a PDU session establishment procedure. When integrity protection indicates "preferred" or "required", the SMF may also include UE integrity protection maximum data rate in the user plane security enforcement information.

12) Signaling from AMF to (R)AN: The AMF may transmit an N2 request to (R)AN. N2 request may include N2 SM information received from the SMF, security context, handover restriction list, subscribed UE-aggregate maximum bit rate (AMBR), MM NAS service acceptance (a list of recommended cells/TAs/NG-RAN node identifiers, and UE radio capability. Allowed NSSAI for the access type of the UE may be included in the N2 message.

When the UE triggers a service request while in the CM-CONNECTED state, only N2 SM information received from the SMF and MM NAS service acceptance may be included in the N2 request.

While the UE is in the CM-CONNECTED state, when a service request procedure is triggered by the network, only N2 SM information received from the SMF may be included in the N2 request.

When the service request procedure is triggered, the NG-RAN may store the security context and the NAS signaling connection Id for the UE in the CM-IDLE state. When the service request is not triggered by the UE only for the signaling connection, the RAN may store QoS information for a QoS flow of the activated PDU session, an N3 tunnel ID of the UE RAN context, and a handover restriction list.

MM NAS service acceptance may include a PDU session state of the AMF. During the session request procedure, certain local PDU session release may be notified to the UE through the PDU session state. The service acceptance message includes a PDU session reactivation result. The PDU session reactivation result provides an activation result for the PDU session of the allowed PDU session list which has generated a PDU session in the list of allowed PDU sessions and paging or NAS notification. If the PDU session reactivation result of the PDU session is failure, a cause of the failure may also be provided.

When there are a plurality of PDU sessions related to a plurality of SMFs, the AMF does not need to wait for a response from all SMFs in step 11. However, the AMF must wait for all responses from the plurality of SMFs before transmitting an MM NAS service acceptance message to the UE.

When step 12 is triggered for PDU session user plane activation, the AMF may include at least one N2 SM information received from the SMF in the N2 request. When there is additional N2 SM information received from the SMF, the AMF may include the additional N2 SM information received from the SMF in a separate N2 message (e.g., N2 tunnel setup request) and transmit the same. Alternatively, when a plurality of SMFs are involved, after all Nsmf_PDUSession_UpdateSMContext response service operations related to the UE are received from the SMF, the AMF may transmit one N2 request message to the (R)AN.

When the NG-RAN node provides a list of recommended cells/TAs/NG-RAN node identifiers during the AN release procedure, the AMF may include a list of recommended cells/TAs/NG-RAN node identifiers in the N2 request. When the NG-RAN determines to enable the RRC inactive state for the UE, the NG-RAN may use this information to allocate the RAN notification area.

The AMF based on the network configuration may include "RRC inactive assistance information" of the UE in the N2 request.

If possible, the AMF may include UE radio capability information in the N2 request and transmit the same to the NG-RAN node.

13) Signaling from (R)AN to UE: The NG-RAN may perform RRC connection reconfiguration with the UE. Specifically, the NG-RAN may perform RRC connection reconfiguration with the UE according to QoS information on all QoS flows of a data radio bearer and a PDU session in which the UP connection is activated. For the UE that was in the CM-IDLE state, if the service request is not triggered by the UE only for a signaling connection, user plane security may be established in this step. For the UE in the CM-IDLE state, when a service request is triggered by the UE only for signaling connection, the AS security context may be established in this step.

When the N2 request includes a NAS message, the NG-RAN may deliver the NAS message to the UE. The UE deletes the context of the PDU session that is not available in 5GC locally.

NOTE 2: The reception of the service acceptance message may not mean that the user plane radio resource has been successfully activated.

After the user plane radio resource is set up, uplink data from the UE may now be delivered to the NG-RAN. The NG-RAN may transmit uplink data to the UPF address and tunnel ID provided in step 11.

14) [Conditional operation] Signaling from (R)AN to AMF: The (R)AN may transmit acknowledgement for N2 request to the AMF. For example, the (R)AN may transmit an N2 request Ack to the AMF. Here, the N2 request Ack may include N2 SM information (including AN tunnel information, list of accepted QoS flows for the PDU sessions whose UP connections are activated and a list of rejected QoS Flows for the PDU Sessions whose UP connections are activated) and a PDU session ID.

The message including the N2 request Ack may include N2 SM information (e.g., AN tunnel information). When the AMF transmits a separate N2 message in step 11, the NG-RAN may respond to N2 SM information with a separate N2 message.

When a plurality of N2 SM messages are included in the N2 request message of step 12, the N2 request Ack may include a plurality of N2 SM information and information enabling the AMF to associate a response with a related SMF.

15) [Conditional operation] Signaling from AMF to SMF: The AMF may transmit an Nsmf_PDUSession_UpdateSM-Context request (including N2 SM information, RAT type, and access type) per PDU session to the SMF. The AMF may determine the access type and the RAT type based on the global RAN node ID associated with the N2 interface.

When the AMF receives the N2 SM information (one or more) in step 14, the AMF may deliver the N2 SM information to the related SMF per PDU session ID. When a UE time zone is changed compared to a previously reported UE time zone, the AMF may include UE time zone information element (IE) in the Nsmf_PDUSession_UpdateSMContext request.

16) [Optional action] Signaling from SMF to PCF: When dynamic PCC is distributed, SMF performs SMF initiated SM policy modification procedure to initiate notification of new location information to the PCF (if subscribed). The PCF may provide updated policies.

17a) [Conditional operation] Signaling from the SMF to new I-UPF: The SMF may transmit an N4 session modification request to a new I-UPF. The N4 session modification request may include AN tunnel information and a list of accepted QFIs.

When the SMF selects a new SMF to operate as an I-UPF for the PDU session in step 5, the SMF may initiate an N4 session modification procedure for the new I-UPF and provide AN tunnel information. Downlink data from the new I-UPF may be delivered to the NG-RAN and UE.

17b) [Conditional Operation] Signaling from UPF to SMF: The UPF may transmit an N4 session modification response to the SMF.

18a) [Conditional operation] Signaling from SMF to UPF (PSA): The SMF may transmit an N4 session modification request to UPF (PSA). The N4 session modification request may include AN tunnel information and a list of rejected QoS flows.

If the user plane is set up or modified and if there is no I-UPF after modification, the SMF may initiate the N4 session modification procedure for the UPF (PSA) and provide AN tunnel information. Downlink data from the UPF (PSA) may now be delivered to the NG-RAN and UE.

For QoS flows in the list of rejected QoS flows, the SMF may instruct the UPF to remove rules related to the corresponding QoS flow (e.g., packet detection rules, etc.).

18b) [Conditional operation] Signaling from UPF to SMF: The UPF may transmit an N4 session modification response to the SMF.

19) [Conditional operation] Signaling from SMF to AMF: The SMF may transmit an Nsmf_PDUSession_UpdateSM-Context response to the AMF.

20a) [Conditional operation] Signaling from SMF to new UPF (or I-UPF): The SMF may transmit an N4 session modification request to a new UPF (or I-UPF).

When the forwarding tunnel is established for the new I-UPF and when the timer set by the SMF for the forwarding tunnel in step 8a expires, the SMF may transmit an N4 session modification request to the new UPF (or I-UPF) operating as an N3 endpoint to release the forwarding tunnel.

20b) [Conditional operation] Signaling from new UPF (or I-UPF) to SMF: The new UPF (or I-UPF) may transmit an N4 session modification response to the SMF.

The new UPF (or I-UPF) operating as the N3 endpoint may transmit an N4 session modification response to the SMF.

21a) [Conditional operation] Signaling from SMF to UPF (PSA): The SMF may transmit an N4 session modification request to the UPF (PSA).

When the forwarding tunnel is established for the UPF (PSA) and when the timer set by the SMF for the forwarding tunnel in step 7b expires, the SMF may transmit an N4 session modification request to the UPF (PSA) operating as the N3 endpoint to release the forwarding tunnel.

21b) [Conditional operation] Signaling from UPF (PSA) to SMF: UPF (PSA) may transmit an N4 session modification response to the SMF.

UPF (PSA) operating as an N3 endpoint may transmit an N4 session modification response to the SMF.

22a) [Conditional operation] Signaling from SMF to previous UPF: The SMF may transmit an N4 session modification request or an N4 session release request to the previous UPF.

When the SMF determines to continue to use the previous UPF in step 5, the SMF may transmit the N4 session modification request to the previous UPF and provide AN tunnel information.

When the SMF selects a new UPF operating as an I-UPF in step 5 and the previous UPF is not a PSA UPF, the SMF may initiate resource release by transmitting an N4 session release request (including release cause) to the previous I-UPF after the timer in step 6b or 7b expires.

22b) Signaling from previous I-UPF to the SMF: The previous I-UPF may transmit an N4 session modification response or an N4 session release response to the SMF.

The previous UPF checks the modification or release of resources through a N4 session modification response or a N4 session release response.

An example of the UE initiated service request procedure is the same as steps 1 to 22b described above.

For mobility-related events, the AMF may invoke an Namf_EventExposure_Notify service operation after step 4.

When Namf_EventExposure_Notify is received with an indication that the UE is reachable, if the SMF has pending DL data, the SMF may invoke the Namf_Communication_N1N2MessageTransfer service operation for the AMF to establish a user plane for the PDU session. In other cases, the SMF may resume transmitting the DL data notification to the AMF in the case of DL data.

<Multi-Access (MA) PDU Session>

The MA PDU session is a PDU session that can be serviced simultaneously with 3GPP access and non-3GPP access using one PDU session.

Figure 8:
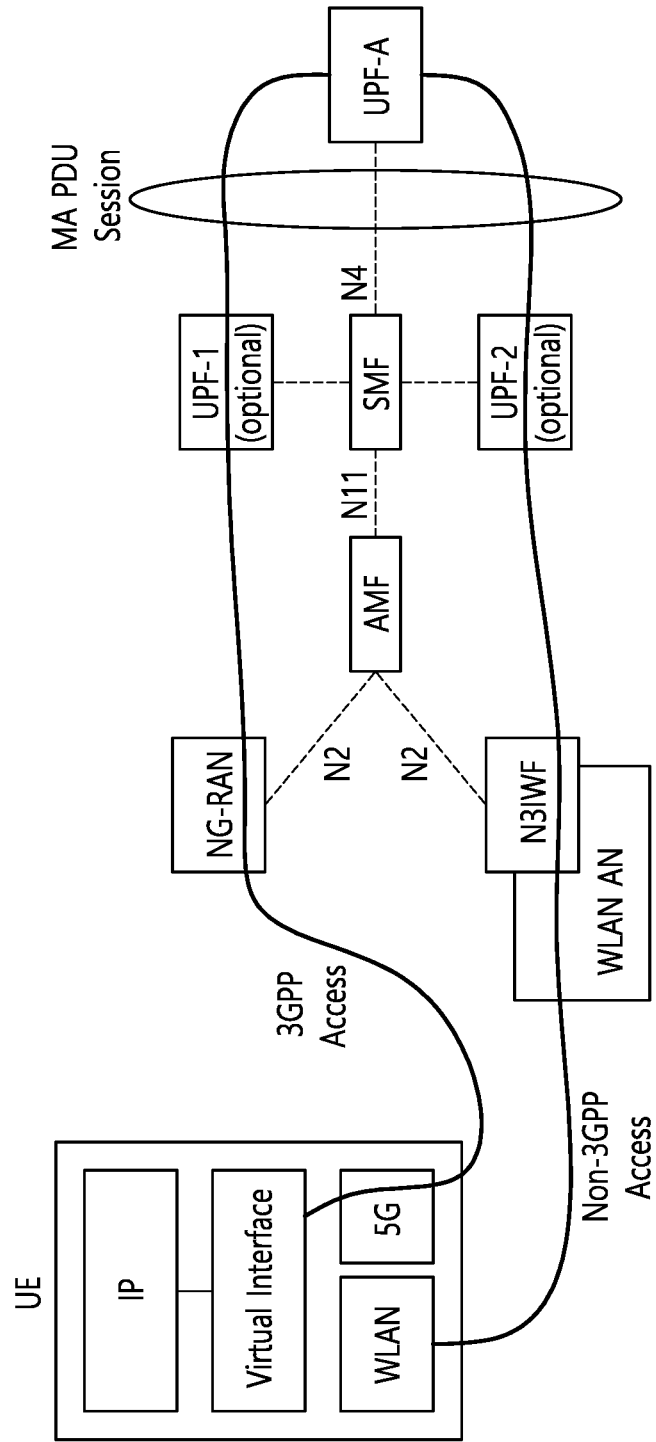
FIG. 8 shows an example of applying the ATSSS rule to the MA PDU session.

FIG. 8 Shows an Example in which an MA PDU Session is Generated.

The MA PDU session is one PDU session shown in the example of FIG. 8 and has a separate session tunnel for each access. One is established on 3GPP access, and the other PDU session is established on untrusted non-3GPP access (e.g., WLAN AN).

Since the MA PDU session is one session, the MA PDU session has the following characteristics.
(i) One DNN;
(ii) One UPF anchor (UPF-A);
(iii) One PDU type (e.g., IPv6);
(iv) One session IP address;
(v) One SSC mode;
(vi) One HPLMN S-NSSAI.

The MA PDU session enables a multipath data link between the UE and UPF-A. This can be implemented below the IP layer.

The MA PDU session may be established through one of the following procedures.

(i) MA PDU session may be established through two separate PDU session establishment procedures. This is called individual establishment.

(ii) MA PDU session may be established through one MA PDU session establishment procedure. That is, the MA PDU session is simultaneously established in two accesses with one session creation request. This is called binding establishment.

After the MA-PDU session is established, SM (Session Management) signaling related to the MA PDU session may be transmitted and received through any access.

A. Individual Establishment of MA PDU Session

MA PDU session may be established through two separate PDU session establishment procedures. For example, the UE may establish a MA PDU session on 3GPP access, and then perform a PDU session establishment procedure to add non-3GPP access to the MA PDU session established on 3GPP access. The request type in the establishment request message for adding the second access may be set to "MA PDU Request".

B. Combined Establishment of MA PDU Session

MA PDU session may be established for 3GPP access and non-3GPP access at the same time through one procedure. One such procedure may be referred to as a MA PDU session establishment procedure by UE request. The above procedure may be useful when the UE intends to establish a MA PDU session while the UE is already registered with 5GC through two accesses. Instead of performing two separate PDU session establishment procedures, the UE may establish a MA PDU session by performing one MA PDU session establishment procedure.

<Multiple USIMs>

The 3GPP system may support a terminal (e.g., ME) including a plurality of USIMs registered at the same time. For example, a plurality of Universal Subscriber Identity Modules (USIMs) may be included in the same Universal Integrated Circuit Card (UICC) or included in different UICCs.

An operation of a terminal related to simultaneous handling of a plurality of USIMs may vary according to the capability of the terminal. The function of the terminal may mean, for example, a terminal capable of single Rx (reception)/single Tx (transmission), a terminal capable of dual Rx/single Tx, and a terminal capable of dual Rx/dual Tx.

Hereinafter, a terminal using a plurality of USIMs may be referred to as a MUSIM UE. Dual Rx may enable Multiple USIM UE (MUSIM UE) to simultaneously receive traffic from two networks (e.g., networks corresponding to each of two USIMs included in the MISIM UE). Dual Tx may enable the MUSIM UE to transmit traffic to both networks simultaneously. A single Rx may allow a MUSIM UE to receive traffic from one network at a time. A single Tx may allow a MUSIM UE to send traffic to one network at a time.

The MUSIM UE may allow the user to set the user's preference for the same service or different services based on multiple USIMs. Multiple USIMs may be provided by the same MNO or different MNOs.

Based on the service preference set by the user, a MUSIM UE actively engaged in communication related to one USIM may determine i) whether to monitor a paging channel related to another registered USIM or ii) whether to present a mobile terminated service to the user triggered a paging request related to another registered USIM.

When USIMs of different operators are provided by different MNOs, the 3GPP system shall not restrict the use of USIMs of other operators by one operator. For reference, the 3GPP system may refer to a communication system supporting communication technologies such as LTE and 5G.

The 3GPP system must be able to securely support a MUSIM UE having a plurality of USIMs from the same MNO or different MNOs in the same UE.

In order to prevent interference between a user's service preference for one USIM and an operator's service preference for another USIM, the 3GPP system may provide an appropriate security mechanism.

Each USIM may appear as a separate device in the 3GPP system.

Mobile terminated services for a Multi-USIM device may be supported.

The 3GPP system may inform the UE of information on the type of traffic that triggered paging as part of the paging procedure. This information may be used by to determine whether a user or MUSIM should respond to a mobile terminated call while the UE is engaged in active communication based on another USIM. The granularity of paging information can distinguish the following service categories:

Internet Protocol (IP) Multimedia Subsystem (IMS) based voice service and non-IMS based voice service IMS-based Short Message Service (SMS) or Unstructured Supplementary Service Data (USSD) and non-IMS-based SMS or USSD IMS services other than voice or SMS Other services not listed above (e.g. data services including video)

The 3GPP system may postpone active communication. For example, when the UE needs to perform another USIM-related activity, the 3GPP system may postpone active communication.

The 3GPP system may resume the postponed communication. For example, if the UE completes another USIM-related activity, the 3GPP system may resume the postponed communication.

The 3GPP system should be able to minimize paging collisions for paging related to multiple USIMs in the UE.

Here, the paging collision may mean a situation in which paging occurrences related to a plurality of USIMs overlap in time. UEs operating with a single Rx must choose to monitor a single paging channel at a time, which may cause paging to other paging channels to fail.

The 3GPP system should provide a mechanism to minimize signaling overhead for services related to multiple USIMs of a MUSIM UE.

The 3GPP system should be able to minimize the influence of services related to one USIM on the services related to other USIMs of the MUSIM UE.

The 3GPP system provides a means for the MUSIM UE to receive an incoming call related to one USIM and switch over to the corresponding incoming call when MUSIM UE has a call related to another USIM is in progress. This requirement may not apply for passive mode MUSIM UEs.

The 3GPP system may enable a MUSIM UE to provide a voice service from one USIM and simultaneously provide a data service from another USIM. The 3GPP system can minimize the impact of a MUSIM UE on an ongoing data service related to one USIM while a user is simultaneously answering calls related to another USIM. This requirement may not applied to passive mode MUSIM UEs.

The 3GPP system can minimize unnecessary signaling and unnecessary use of resources for the MUSIM UE operating in the Dual SIM Dual Standby (DSDS) mode.

For each PLMN in which a MUSIM UE operating in DSDS mode is registered, postponement and resumption of a specific set of services may be possible.

<Paging Collision>

The paging collision may mean that two paging occasions to be monitored by the UE collide in the time domain. For example, when the UE uses a plurality of USIMs, when a paging occasion in a network related to one USIM collides with a paging occasion in a network related to another USIM, it can be said that a paging collision has occurred.

The UE may monitor paging frames and paging occasions. For example, in the case of E-UTRA, a paging frame and a paging occasions may be allocated based on IMSI.

A paging occasion may be defined, for example, as follows. A paging opportunity (Paging Occasion: PO) is a subframe in which a Paging Radio Network Temporary Identifier (P-RNTI) can be transmitted through the PDCCH.

One paging frame (PF) may be one radio frame (including one or multiple paging occasions). When Discontinuous Reception (DRX) is used, the UE only needs to monitor one PO per DRX cycle.

An example of overlapping paging opportunities will be described with reference to FIG. 9.

FIG. 9 is a Diagram Illustrating an Example in which Paging Occasions Overlap.

Referring to FIG. 9, the UE needs to receive services on two different frequencies (e.g., F1 and F2).

For example, at frequency F1, the UE may expect to receive a paging from a first network (e.g., PLMN 1). And, at frequency F2, the UE may expect to receive another communication service (e.g., LTE paging, 5G paging, etc.) from the second network (e.g., PLMN 2).

A UE with a single Rx chain may receive services on frequencies F1 and F2, alternating between frequencies F1 and F2.

The service at frequency F2 may be scheduled by the network for the same amount of time as the paging opportunity at frequency F1. The service at frequency F2 may have a period equal to the period of the DRX cycle at frequency F1, or may have a period that is a multiple of the period of the DRX cycle. For reference, in FIG. 9, the paging processing duration may mean a time used to process paging.

Repetitive scheduling collisions between two services may cause the UE to miss paging on frequency F1. Likewise, such a scheduling collisions may cause the UE to miss service reception (e.g., paging reception) on frequency F2.

Although there is a dual subscription, a device with a single Rx chain (eg a MUSIM UE such as a dual SIM device) can register with two different networks. In both networks, the paging occasions for each subscription may occur almost simultaneously, resulting in paging collisions between subscriptions.

II. Problems to be Solved by the Disclosure of the Present Specification

In a 3GPP system (e.g., 4G network, 5G network), it is basically assumed that one UE has one SIM. However, among the actually released UEs, there are UEs (e.g., MUSIM UEs) supporting dual SIM or multi SIM.

In particular, in some countries, a large number of such multi-SIM UEs are released, and in some cases, they form a mainstream among UEs of the country. Since the 3GPP standard does not clearly support the operation of multi SIM UEs, these UEs are implemented in a dual standby manner to support communication based on multiple SIMs.

For example, in the dual standby method, the UE uses all of a plurality of SIMs (e.g., two SIMs) to perform a registration procedure for networks related to each SIM, and then switches radios as necessary to provide networks and services.

In this method, in general, the UE is implemented so that the user sets which service to be provided through which SIM. For example, the user may set the SMS to be provided through the first SIM and the voice call to be provided through the second SIM. Therefore, the UE may switch the radio based on the user's setting.

In the case of mobile originating (MO) traffic, the UE may operate based on the user's settings as described above. However, in the case of Mobile Terminated (MT) traffic, a problem may occur.

For example, in a situation in which the UE includes two SIMs (e.g., a first SIM associated with PLMN 1 and a second SIM associated with PLMN 2), the UE may register with PLMN 1 and PLMN 2 based on the respective SIMs.

In this case, the UE needs to monitor both paging of PLMN 1 and PLMN 2 in the idle state, when the paging occasion of PLMN 1 and the paging occasion of PLMN 2 overlap (overlapping), the UE may monitor only one PLMN at a time.

For this reason, in a situation where the user needs to be provided with an important service (e.g., a phone call), a situation may occur in which the UE is not provided with an important service while monitoring another PLMN. For example, if data traffic for a mobile terminating service (e.g., voice call) occurs in PLMN 2 while the UE is monitoring the paging opportunity of PLMN 1, the UE cannot receive the mobile terminating service of PLMN 2 may occur.

In addition to these problems, while the UE is receiving the service from PLMN 1, since the UE cannot perform paging monitoring for PLMN 2, there is a problem that the UE does not respond to paging occurring in PLMN 2. In this case, since the network node of PLMN 2 repeatedly performs paging transmission, a problem in which paging resources are wasted may occur.

In addition, when the UE continuously communicates in a connected state in one PLMN (e.g., PLMN 1), the UE cannot perform a registration update in PLMN 2. Since the UE cannot perform registration update in PLMN 2, deregistration may occur or mobility registration may not be properly performed. Due to this, a problem may occur in that the location of the UE is not properly determined in the network (e.g., PLMN 2).

In order to solve the above problems, it is necessary to discuss a method for efficiently supporting a UE using a plurality of SIMs.

III. Disclosure of the Present Specification

The disclosures described below in this specification may be implemented in one or more combinations. Each of the drawings shows an embodiment of each disclosure, but the embodiments of the drawings may be implemented in combination with each other.

A UE having a plurality of Subscriber Identity Modules (SIMs) (e.g., a plurality of USIMs) may operate as described below. For reference, in the disclosure of this specification, the operation of the UE and the network node (e.g., UPF, N3IWF, AMF, SMF, etc.) is described by taking the case where the UE has two SIMs as an example, but this is only an example, and in the following the description can be applied even when the UE has three or more SIMs.

Hereinafter, the UE may include SIM 1 (or first SIM) related to PLMN 1 (or first PLMN) and SIM 2 (or second SIM) related to PLMN 2 (or second PLMN). That is, the UE may perform communication in PLMN 1 and/or PLMN 2 based on SIM 1 and SIM 2. For example, the UE may receive service from PLMN 1 using SIM 1, and the UE may receive service from PLMN 2 using SIM 2. Although it is assumed that SIM 1 and SIM 2 can connect to different PLMNs, this is only an example, and SIM 1 and SIM 2 may be SIMs related to the same PLMN.

Several methods of the disclosure of the present specification to be described below (e.g., methods described in Indices 1. to 7. below) may be implemented in combination of one or more.

1. Multi SIM Support Using NAS Notification

The UE may perform a registration procedure for each of PLMN 1 and PLMN 2 through 3GPP access. For example, the UE may perform a registration procedure for PLMN 1 through 3GPP access based on the first SIM. The UE may perform a registration procedure for PLMN 2 through 3GPP access based on the second SIM.

After the UE performs the registration procedure for PLMN 1 and PLMN 2, the UE may monitor paging for PLMN 1. In this case, the UE may perform a registration procedure for the N3IWF of PLMN 2 through PLMN 1. For example, the UE may perform a registration procedure for the N3IWF of the PLMN 2 through the UPF and the Internet (e.g., Data Network) of the PLMN 1.

Conversely, after the UE performs the registration procedure for PLMN 1 and PLMN 2, the UE may monitor paging for PLMN 2. In this case, the UE may perform a registration procedure for the N3IWF of PLMN 1 through PLMN 2. For example, the UE may perform a registration procedure for the N3IWF and the Internet (e.g., Data Network) of PLMN 1 through UPF of PLMN 2.

Figure 10:
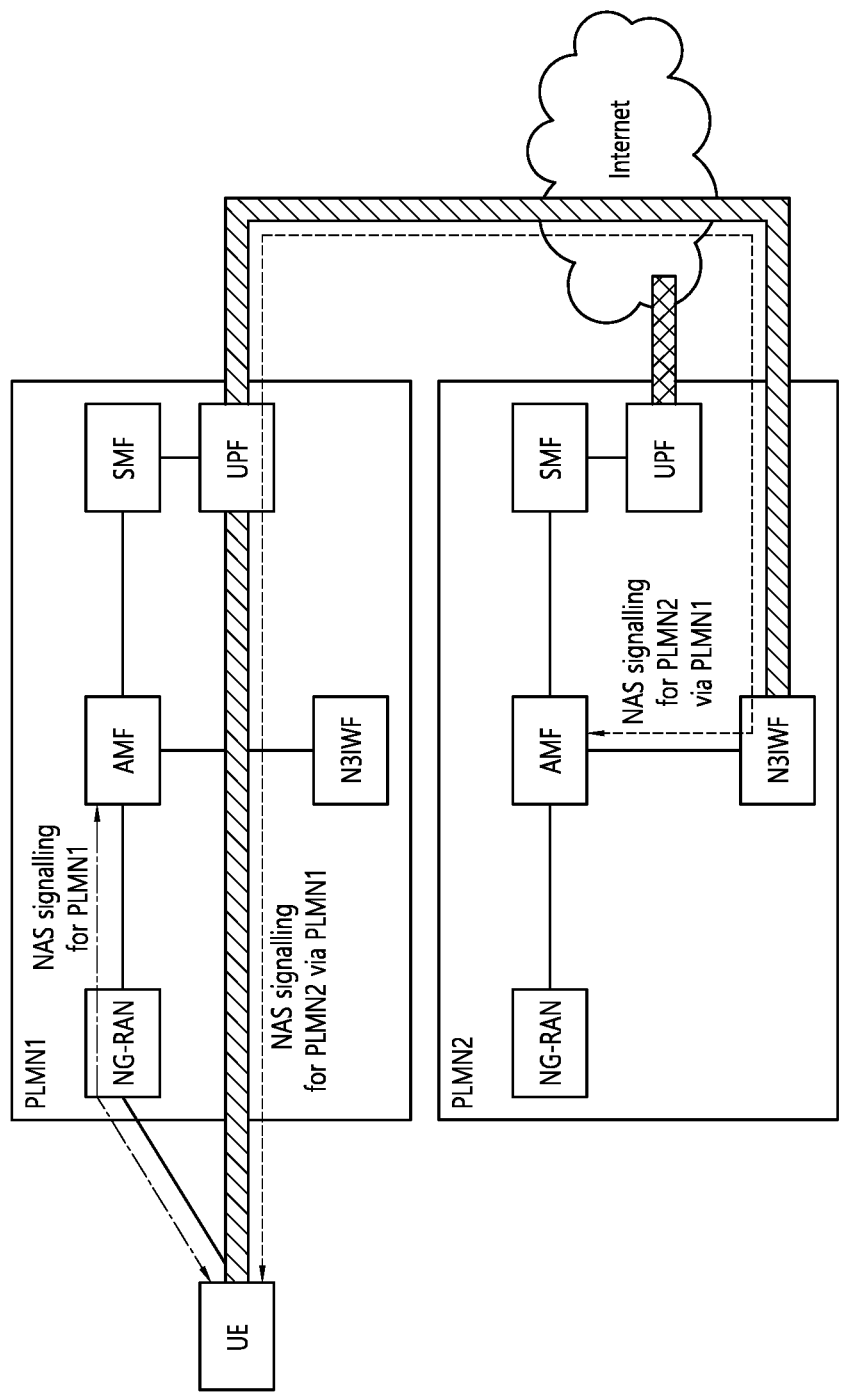
FIG. 10 is a diagram illustrating an example in which a terminal registers with PLMN 2 through PLMN 1 according to the disclosure of the present specification.

As in the example shown in FIG. 10, the UE may perform an operation of registering with PLMN 2 through PLMN 1. As shown in the example shown in FIG. 11, the UE may perform an operation of registering with PLMN 1 through PLMN 2.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 10 is a Diagram Illustrating an Example in which a UE Registers with PLMN 2 Through PLMN 1 According to the Disclosure of the Present Specification.

In the example of FIG. 10, a UE (e.g., UE) is registered in both PLMN 1 and PLMN 2 through 3GPP access. The UE may perform NAS signaling for PLMN 1 with NG-RAN and AMF of PLMN 1. The UE may perform NAS signaling for PLMN 2 with UPF and Internet of PLMN 1, N3IWF of PLMN 2, AMF of PLMN 2.

The UE may transmit specific information (or indication) while performing a registration procedure for the N3IWF of PLMN 2. As an example, the UE may transmit a registration request message (including specific information (or indication)) for registering with the N3IWF of PLMN 2. For example, the specific information (or indication) may be a multiple SIM registration indication (information) or a Multi SIM indication (information). The multiple SIM registration indication (information) may be information that a registration procedure relates to a plurality of SIMs. Multi SIM indication (information) may be information that the UE uses a plurality of SIMs.

The UE may transmit multiple SIM registration indication (information) or Multi SIM indication (information) to the UPF of PLMN 1. Then, the UPF of the PLMN 1 may transmit a multiple SIM registration indication (information) or a Multi SIM indication (information) to the N3IWF of the PLMN 2 via the Internet. The N3IWF of the PLMN 2 may transmit a multiple SIM registration indication (information) or a Multi SIM indication (information) to the AMF of the PLMN 2.

The AMF of PLMN 2 that has received multiple SIM registration indication (information) or Multi SIM indication (information), when paging is required through 3GPP access for the UE, does not perform paging, and transmits NAS notification message to N3IWF of PLMN 2. The N3IWF of PLMN 2 may transmit a NAS notification message to the UPF of PLMN 1 via the Internet. Then, the UPF of PLMN 1 may transmit a NAS notification message to the UE. Alternatively, the AMF of PLMN 2 may transmit a NAS notification message to the N3IWF of PLMN 2 when the AMF of PLMN 2 does not receive a response to paging from the UE after performing paging for the UE through 3GPP access. Then, the N3IWF of the PLMN 2 may transmit a NAS notification message to the UE via the Internet and the UPF of the PLMN 1.

When paging for the UE is required in PLMN 2, the AMF of PLMN 2 may perform NAS signaling for the UE through N3IWF of PLMN 2. Therefore, even in a situation in which the UE monitors paging in PLMN 1 or receives a service in PLMN 1, the UE may receive NAS signaling for PLMN 2 from the UPF of PLMN 1. Therefore, even in a situation in which the UE monitors paging in PLMN 1 or receives a service in PLMN 1, the UE may monitor MT traffic generated in PLMN 2.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 11:
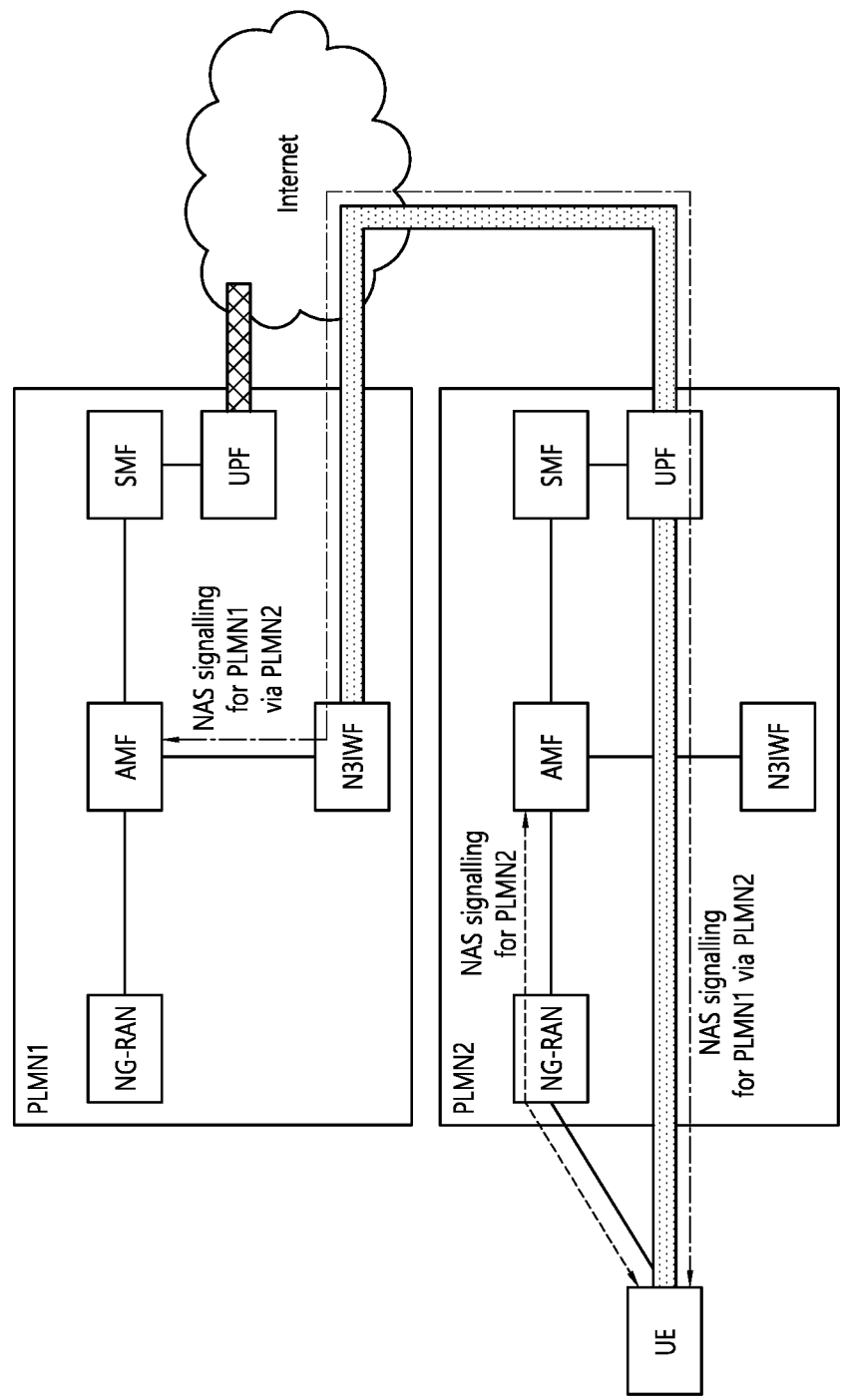
FIG. 11 is a diagram illustrating an example in which a terminal registers with PLMN 1 through PLMN 2 according to the disclosure of the present specification.

FIG. 11 is a Diagram Illustrating an Example in which a Terminal Registers with PLMN 1 Through PLMN 2 According to the Disclosure of the Present Specification.

In the example of FIG. 11, a terminal (e.g., UE) is registered in both PLMN 1 and PLMN 2 through 3GPP access. The UE may perform NAS signaling for PLMN 2 with NG-RAN and AMF of PLMN 2. The UE may perform NAS signaling for PLMN with UPF of PLMN 2, Internet, N3IWF of PLMN 1, AMF of PLMN 1.

In the example of FIG. 11, as in the example of FIG. 10, the UE may transmit specific information (or indication) while performing a registration procedure for the N3IWF of PLMN 1. As an example, the UE may transmit a registration request message (including specific information (or indication)) for registering with the N3IWF of PLMN 1. For example, the specific information (or indication) may be a multiple SIM registration indication (information) or a Multi SIM indication (information). The multiple SIM registration indication (information) may be information that a registration procedure relates to a plurality of SIMs. Multi SIM indication (information) may be information that the terminal uses a plurality of SIMs.

For reference, the terminal may transmit specific information (or indication) (e.g., multiple SIM registration indication (information) or Multi SIM indication (information)) to one PLMN at a time.

For example, when the terminal performs monitoring for PLMN 1 (e.g., when the terminal performs communication through PLMN 1 as main), the UE may transmit specific information (or indication) (e.g., multiple SIM registration indication (information) or Multi SIM indication (information)) while performing the registration procedure for the N3IWF of PLMN 2 of the UE through PLMN 1.

Thereafter, due to user setting or in order to receive a service from PLMN 2, the terminal may monitor PLMN 2 (e.g., when the terminal performs communication through PLMN 2 as main).

In this case, the terminal may be in a connected state in PLMN 2 through 3GPP access. As the UE enters the connected state in the PLMN 2, the UE may transmit a "new indication (or information) not to transmit a NAS notification message to the N3IWF" through the 3GPP access of the PLMN 2.

For example, the terminal may transmit the new indication (or information) to the AMF of PLMN 2. Then, even if paging occurs, the AMF of PLMN 2 may transmit NAS signaling to the UE through 3GPP access of PLMN 2 without transmitting a NAS notification message to N3IWF of PLMN 2.

After the UE transmits a "new indication (or information) not to transmit a NAS notification message to the N3IWF" through the 3GPP access of the PLMN 2, the UE may again perform communicate with the PLMN 1 as the main. In this case, the UE transmits specific information (or indication) (e.g., multiple SIM registration indication (information) or Multi SIM indication (information)) by using a registration procedure or other message, thereby NAS notification message can be transmitted through N3IWF in PLMN 2.

For example, the terminal may transmit specific information (or indication) (e.g., multiple SIM registration indication (information) or Multi SIM indication (information)) to the N3IWF of PLMN 2 while performing a registration procedure for N3IWF of PLMN 2 through PLMN 1. As such, when paging is required in PLMN 2, the AMF of PLMN 2 may transmit a NAS notification message to the terminal through N3IWF of PLMN 2.

Figure 12A:
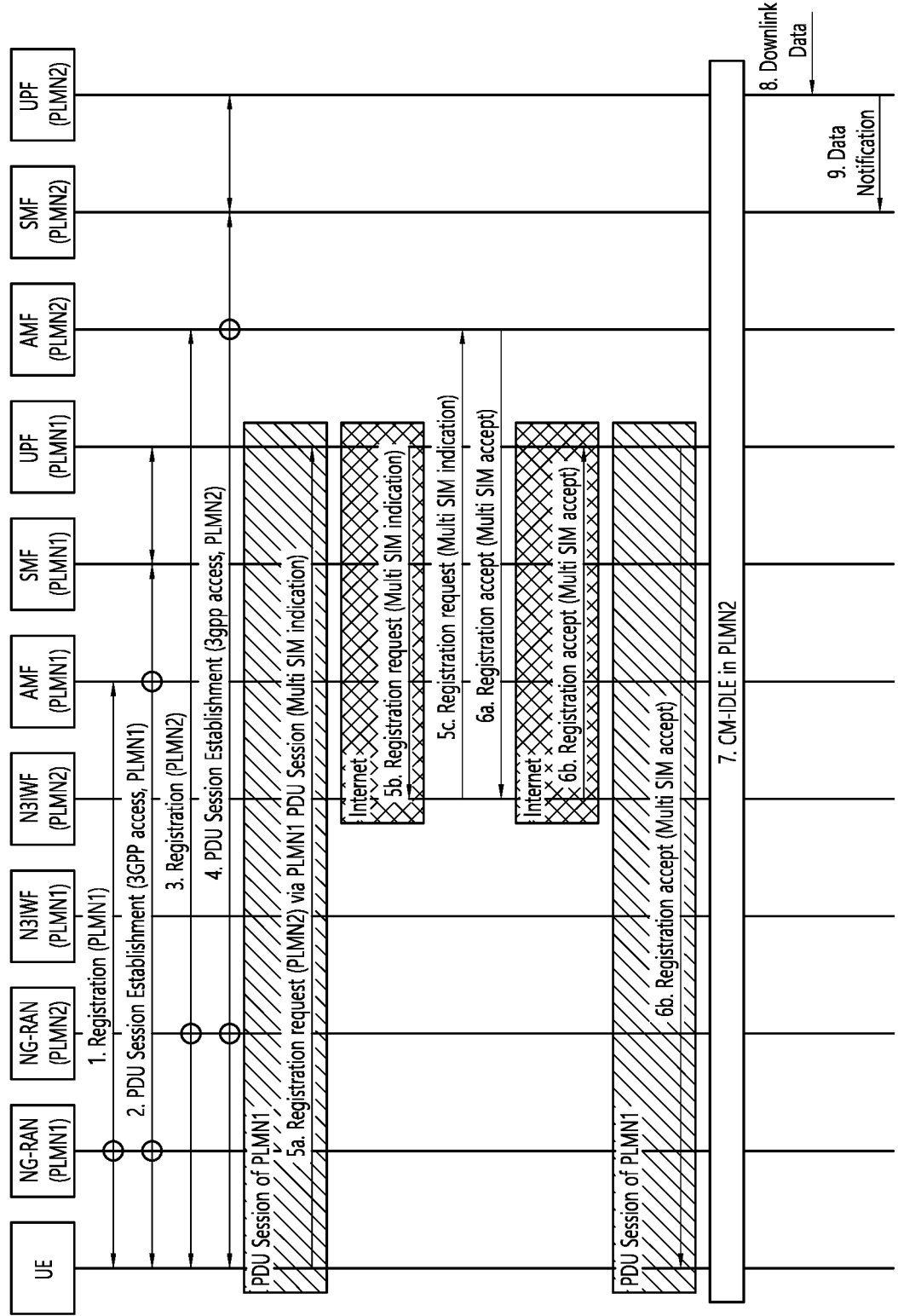
FIGS. 12A to 12C are diagrams illustrating an example of a procedure for the terminal and the network to perform communication based on a terminal and a plurality of SIMs according to the disclosure of the present specification.
Figure 12B:
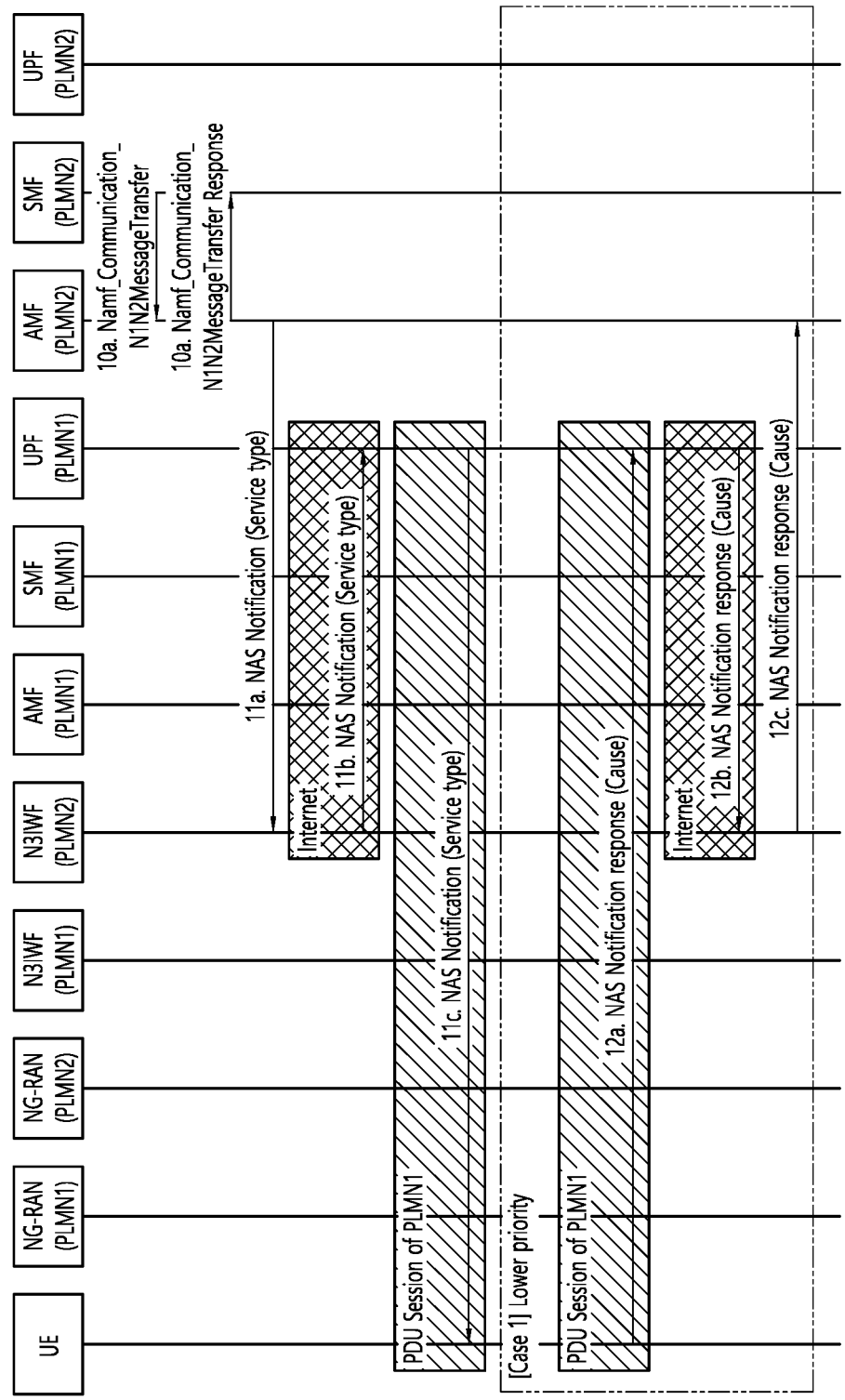
Figure 12C:
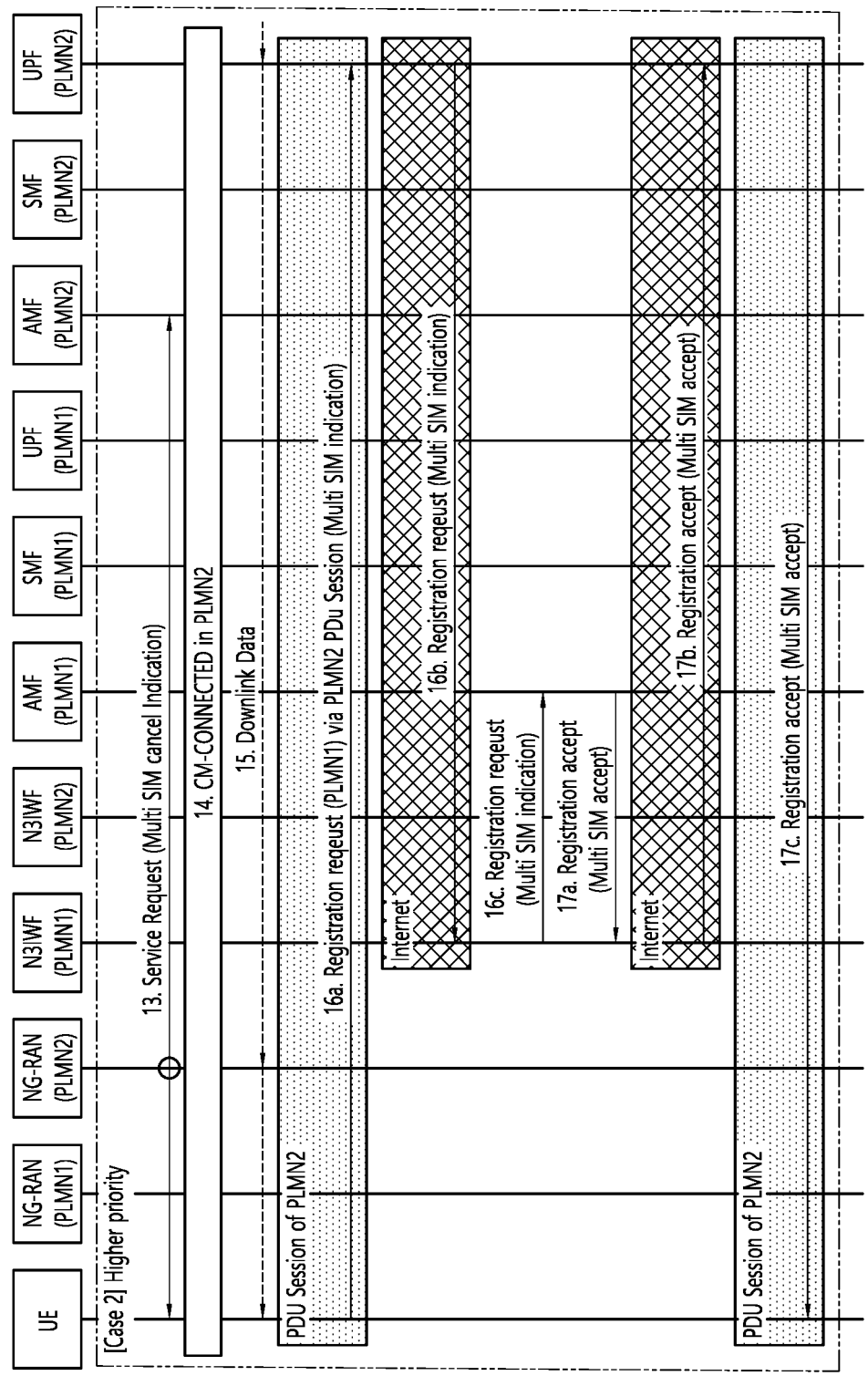

The terminal and the network may perform a service through a plurality of SIMs (e.g., dual SIMs) based on the same process as illustrated in FIGS. 12A to 12C below.

The following drawings were created to explain a specific example of the present specification. Since the names of specific devices described in the drawings or the names of specific signals/messages/fields are presented by way of example, the technical features of the present specification are not limited to the specific names used in the following drawings.

FIGS. 12A to 12C are Diagrams Illustrating an Example of a Procedure for the Terminal and the Network to Perform Communication Based on a Terminal and a Plurality of SIMs According to the Disclosure of the Present Specification.

In FIGS. 12a to 12c, a terminal (e.g., UE), a base station (e.g., NG-RAN) of PLMN 1 and network nodes (e.g., N3IWF, AMF, SMF, UPF), a base station of PLMN 2 (e.g., NG-RAN) and network nodes (eg N3IWF, AMF, SMF, UPF) are shown.

For reference, the operations shown in FIGS. 12A to 12C are only examples, and the operations shown in FIGS. 12A to 12C may be performed in an order different from that shown, and some operations are omitted or operations not shown are may be added.

The terminal includes SIM 1 (SIM related to PLMN 1) and SIM 2 (SIM related to PLMN 2). In addition, it is assumed that the terminal can perform a service in PLMN 1 and PLMN 2 using SIM 1 and SIM 2.

1) The UE may perform a registration procedure for PLMN 1 through 3GPP access based on SIM 1.

2) The UE may perform a PDU session establishment procedure for establishing a PDU session based on 3GPP access in PLMN 1.

3) The UE may perform a registration procedure for PLMN 2 through 3GPP access based on SIM 2.

4) The UE may perform a PDU session establishment procedure for establishing a PDU session based on 3GPP access in PLMN 2.

For reference, the UE may establish (or create) one or more PDU sessions in each PLMN. For example, the UE may establish (or create) a PDU session for a voice service and a PDU session for an Internet service in each PLMN.

5a-5c) It is assumed that the UE performs communication using PLMN 1 as a main and PLMN 2 as a sub. For example, it is assumed that the terminal uses PLMN 1 as a main and PLMN 2 as a sub according to a setting set by a user. The UE selects a PDU session (e.g., PDU session #A) that can be connected to the N3IWF of PLMN 2 from among the PDU sessions of PLMN 1, or, if necessary, the UE may additionally perform a procedure of establishing a PDU session (e.g., PDU session #A) that can be accessed with the N3IWF of PLMN 2. For example, the UE may select a PDU session capable of accessing the N3IWF of PLMN 2 from among the PDU sessions of PLMN 1 based on a UE Route Selection Policy (URSP) rule.

The UE may select the N3IWF of PLMN 2 by using the selected (or newly established) PDU session #A of PLMN 1. To this end, the UE must select the N3IWF of PLMN 2, unlike the conventional N3IWF procedure. For example, in the conventional N3IWF procedure, the N3IWF of the HPLMN can be selected in a roaming situation, but in the case of Multi Sim, the N3IWF of the serving PLMN must be selected.

Thereafter, the UE may perform a registration procedure for the PLMN 2 through the N3IWF of the selected PLMN 2. A process in which the UE performs a registration procedure for PLMN 2 may be performed according to the prior art. While the registration procedure for PLMN 2 is performed, a setup procedure for Internet Key Exchange Version 2 (IKEv2) tunneling may be performed, but a description thereof will be omitted herein.

In step 5a), the terminal may transmit a registration request message to register for PLMN 2. For example, the UE may transmit a registration request message to the UPF of PLMN 1. The registration request message may include multiple SIM registration indication (information) or Multi SIM indication (information).

In step 5b), the UPF of PLMN 1 may transmit a registration request message including multiple SIM registration indication (information) or Multi SIM indication (information) to the Internet. Then, the Internet may transmit a registration request message including multiple SIM registration indication (information) or Multi SIM indication (information) to N3IWF of PLMN 2.

In step 5c), the N3IWF of the PLMN 2 may transmit a registration request message including a multiple SIM registration indication (information) or a Multi SIM indication (information) to the AMF of the PLMN 2.

In step 6a to 6b) Upon receiving the registration request message, the AMF of PLMN 2 may determine whether to accept (or allow) the terminal's request based on information such as subscriber information and operator policy. When accepting (or allowing) the request of the terminal, the AMF of the PLMN 2 may transmit a registration accept message to the N3IWF of the PLMN 2. Here, the registration accept message may include "Multi SIM accept information". The Multi SIM accept information may mean information that accepts (or permits) a registration request related to the Multi SIM. The AMF transmits a registration accept message including Multi SIM accept information, thereby notify the terminal that multi SIM operation (e.g. an operation related to reception of multiple SIM registration indication (information) or Multi SIM indication (information), that is, if paging is needed to be performed, an operation of transmitting the NAS Notification through the N3IWF or the operation of transmitting the paging information through the SMS) is accepted (or allowed). Multi Sim operation can also be referred to as Multi Sim-related operation below.

When accepting (or allowing) the UE's request, in step 6a), the AMF of the PLMN 2 may transmit a registration accept message (including "Multi SIM accept information") to the N3IWF of the PLMN 2.

In step 6b), the N3IWF of the PLMN 2 may transmit a registration acceptance message (including "Multi SIM accept information") to the UPF of the PLMN 1 via the Internet.

In step 6c), the UPF of PLMN 1 may transmit a registration accept message (including "Multi SIM accept information") to the UE.

7) Assume that the terminal's is in Connection Management—IDLE (CM-IDLE) state for 3GPP access in PLMN 2. The CM-IDLE state may mean a state in which the terminal does not have a NAS signaling connection with the core network (e.g., AMF).

8) The UPF of PLMN 2 may receive downlink data for the terminal. The UPF of PLMN 2 may buffer downlink data.

9) The UPF of the PLMN 2 may transmit a data notification message to the SMF of the PLMN 2 in order to transmit downlink data. When the PDU session related to downlink data is an Internet Protocol (IP) type PDU session, the UPF of PLMN 2 may transmit a differentiated services code point (DSCP) value with data notification message (Data Notification) message based on a Paging Policy Differentiation (PPD).

10a and 10b) The SMF of PLMN 2 may request the AMF of PLMN 2 to set up a user plane. The SMF of PLMN 2 may request the AMF of PLMN 2 by using a service for communicating with the AMF (e.g., Namf_Communication_N1N2MessageTransfer service) to request the user plane setup (e.g., the user plane setup of the PDU session related to downlink data of step 8). For example, the SMF of PLMN 2 may transmit a Namf_Communication_N1N2MessageTransfer message to the AMF of PLMN 2. At this time, the SMF of PLMN 2 may provide information (e.g., information about service type) about the service related to the downlink data of step 8) to the AMF of PLMN 2 based on the PPD. A value preset between the terminal and the network may be used as the example described in the following (2. Service type classification for multi-SIM support) for such information about a service type.

11a to 11c) According to the prior art, since the AMF of PLMN 2 has received the user plane setup for the 3GPP PDU session from the SMF of PLMN 2, it should perform paging for the terminal through 3GPP access. However, in step 5), when the AMF of PLMN 2 receives multiple SIM registration indication (information) or Multi SIM indication (information), the AMF of PLMN 2 does not perform paging through 3GPP access, but the AMF of PLMN 2 may transmit NAS notification messages to the terminal through N3IWF. The NAS notification message may include information about a service type indicating whether there is downlink data (e.g., downlink data of step 8) for a certain service (For details, refer to the example described in the following (2. Service type classification for Multi SIM support)). Also, the NAS notification message may include access type information. The AMF of PLMN 2 may transmit a NAS notification message by setting the access type information to 3GPP access.

In step 11a), the AMF of the PLMN 2 may transmit a NAS notification message including information on the service type to the N3IWF of the PLMN 2.

In step 11b), the N3IWF of the PLMN 2 may transmit a NAS notification message including information on the service type to the UPF of the PLMN 1 via the Internet.

In step 11c), the UPF of PLMN 1 may transmit a NAS notification message including information on a service type to the terminal.

Upon receiving the NAS notification message, the terminal may determine which service is more important among the service being used by the terminal in PLMN 1 and the service in PLMN 2 (e.g., a service related to downlink data of step 8) based on the information on the service type. For example, based on the user's pre-configuration (priority setting of the service preset by the user), the terminal may select a service with high priority between the service being used by the terminal in PLMN 1 and the service in PLMN 2 (e.g., a service related to downlink data of step 8). For example, the user may set a high priority for a phone service (e.g., voice call or video call) and set a low priority for an Internet service (e.g., web surfing, Internet-based messenger, etc.). In this case, when the terminal receives a phone service from SIM2 while performing an Internet service through SIM1, the terminal may stop the Internet service of SIM1 and receive a phone service from SIM2. As another example, when the terminal receives NAS signaling from SIM2 while performing Internet service through SIM1, the terminal may temporarily stop the Internet service of SIM1 and process SIM2 signaling in order to preferentially process signaling regardless of the user's configuration. As another example, when the terminal receives the NAS notification message, the terminal asks the user) to select which service between the service used by the terminal in PLMN 1 and the service in PLMN 2 (e.g., a service related to downlink data of step 8) through a user interface (e.g., display). And the terminal may identify the service selected by the user.

When the UE determines that the service being used by the UE in PLMN 1 is more important than the service of PLMN 2 (e.g., a service related to downlink data of step 8), operations included in "Case 1" shown in FIGS. 12A to 12C may be performed.

When the UE determines that the service of PLMN 2 (e.g., service related to downlink data of step 8) is more important than the service that the UE is using in PLMN 1 (or if there is no service being used by the UE in PLMN 1), operations included in "Case 2" shown in FIGS. 12A to 12C may be performed.

First, operations included in "Case 1" will be described with reference to steps 12a) to 12b) of FIGS. 12A to 12C, and operations included in "Case 2" with reference to steps 13) to 17c) are described.

12a to 12c) (Performed in Case 1) The terminal receives the NAS notification message, and the terminal determines that the service being used by the terminal in PLMN is more important than the service of PLMN 2 (e.g., a service related to downlink data of step 8) based on information (e.g., information on service type) included in the NAS notification message.

In this case, in step 12a), the terminal may transmit a NAS notification response message to the UPF of PLMN 1 in response to the NAS notification message. The NAS notification response message transmitted by the terminal may include a cause value or an indication (or information). Here, the cause value or indication (or information) may be a value or indication (or information) indicating that the service request procedure for PLMN 2 cannot be performed because the service in PLMN 1 is being used. Additionally, the terminal may include information requesting to suspend the service that triggered the NAS notification in the NAS notification response message.

In step 12b), the UPF of the PLMN 1 may transmit a NAS notification response message (including a cause value or an indication (or information)) to the N3IWF of the PLMN 2 via the Internet.

In step 12c), the N3IWF of the PLMN 2 may transmit a NAS notification response message (including a cause value or an indication (or information)) to the AMF of the PLMN 2. When the AMF of PLMN 2 receives a cause value or indication (or information), the AMF of PLMN 2 may transmit information that the terminal is unreachable to the SMF of PLMN 2. That is, the AMF of PLMN 2 may inform the SMF of PLMN 2 that the terminal is unreachable. If the NAS notification response message includes information requesting to suspend the service that triggered the NAS notification, the AMF of PLMN 2 may not no longer transmit the NAS notification message for the corresponding service of PLMN 2 (e.g., a service related to downlink data of step 8).

Step 13) (Performed in Case 2) The terminal may receives the NAS notification message, and the terminal may determine that the service of PLMN 2 (e.g., a service related to downlink data of step 8) is more important than the service being used by the UE in PLMN 1 based on the information (e.g., information on the service type) included in the NAS notification message. In this case (or when there is no service being used by the UE in PLMN 1), the UE may perform a service request procedure through 3GPP access of PLMN 2. For example, the UE may transmit a service request message to the AMF of PLMN 2 via NG-RAN of PLMN 2.

Additionally, the terminal may transmit a service request message by including "Multi SIM cancel indication (or information)" in the service request message. Here, "Multi SIM cancel indication (or information)" may be an indication or information indicating cancelling of an operation related to the reception of a Multi SIM-related operation (e.g. an operation related to reception of multiple SIM registration indication (information) or Multi SIM indication (information), that is, if paging is needed to be performed, an operation of transmitting the NAS Notification through the N3IWF or the operation of transmitting the paging information through the SMS) to the AMF of PLMN 2. For example, when the AMF of PLMN 2 that has received "Multi SIM cancel indication (or information)", if 3GPP paging is required, the AMF of PLMN 2 no longer transmits a NAS notification message to the N3IWF of PLMN 2, and may perform normal operations (e.g., transmission of a paging message to the UE via NG-RAN through 3GPP access of PLMN 2).

For reference, when the terminal performs communication in PLMN 2 only for a short time, the terminal may not include "Multi SIM cancel indication (or information)" in the service request message. For example, when the terminal performs communication in PLMN 2 only for a short time may mean a case when the terminal receives an SMS from PLMN 2, a case when it receives NAS signaling, or a case when a periodic registration procedure is performed, etc.

Alternatively, the terminal may not transmit "Multi SIM cancel indication (or information)" to the AMF of PLMN 2, and the terminal may switch to the CM-CONNECTED state. In this case, the AMF of the PLMN 2 may automatically cancel a Multi SIM-related operation (e.g., an operation related to reception of multiple SIM registration indication (information) or Multi SIM indication (information)).

The UE may wish to perform a Multi SIM-related operation (e.g., an operation related to the reception of multiple SIM registration indication (information) or Multi SIM indication (information)) in the corresponding PLMN (e.g., PLMN 2). In this case, the terminal may transmit a multiple SIM registration indication (information) or a Multi SIM indication (information) to the AMF of the corresponding PLMN (e.g., PLMN 2) by using a registration request message or another message. For example, when the terminal receives only SMS from PLMN 2 for a while, the terminal may wish to perform a Multi SIM-related operation. In this case, the terminal may transmit multiple SIM registration indication (information) or Multi SIM indication to AMF of PLMN 2 (information) again.

14) By the service request procedure performed by the UE in step 13), the UE may be switched to the CM-CONNECTED state in PLMN 2.

15) The UPF of PLMN 2 may transmit data buffered in the PDU session (data buffered by the UPF in step 8) to the UE via the NG-RAN.

For reference, the following steps 16a to 17c may be selectively performed. For example, steps 16a to 17c may be omitted.

16a to 16c) The UE may perform communication using PLMN 2 as a main and PLMN 1 as a sub. In this case, the terminal may perform operations similar to steps 5a) to 5c) in order to receive a notification message for a service in PLMN 1 (e.g., a service related to downlink data received by the UPF of PLMN 1). The UE may select a PDU session (e.g., PDU session #B) that can be connected to the N3IWF of PLMN 1 from among the PDU sessions of PLMN 2, or, if necessary, may perform a procedure for additionally establishing a PDU session (e.g., PDU session #B) that can be connected to the N3IWF of PLMN 1. For example, the UE may select a PDU session (e.g., PDU session #B) that can be connected to the N3IWF of PLMN 1 from among the PDU sessions of PLMN 2 based on the URSP rule.

The UE may select the N3IWF of PLMN 1 by using the selected (or newly established) PDU session #B of PLMN 2. To this end, the UE must select the N3IWF of the PLMN 1, unlike the conventional N3IWF procedure (the N3IWF of the PLMN 2 is selected in the conventional N3IWF procedure).

Thereafter, the UE may perform a registration procedure for the PLMN 1 through the N3IWF of the selected PLMN 1. A process in which the UE performs a registration procedure for PLMN 1 may be performed according to the prior art. While the registration procedure for PLMN 1 is performed, a setup procedure for IKEv2 tunneling may be performed, but a description thereof will be omitted herein.

In step 16a), the terminal may transmit a registration request message to register for PLMN 1. For example, the UE may transmit a registration request message to the UPF of PLMN 2. The registration request message may include multiple SIM registration indication (information) or Multi SIM indication (information).

In step 16b), the UPF of the PLMN 2 may transmit a registration request message including multiple SIM registration indication (information) or Multi SIM indication (information) to the Internet. Then, the Internet may transmit a registration request message including multiple SIM registration indication (information) or Multi SIM indication (information) to the N3IWF of PLMN 1.

In step 16c), the N3IWF of PLMN 1 may transmit a registration request message including multiple SIM registration indication (information) or Multi SIM indication (information) to the AMF of PLMN 1.

17a to 17c) Upon receiving the registration request message, the AMF of PLMN 1 may determine whether to accept (or allow) the terminal's request based on information such as subscriber information and operator policy.

When accepting (or allowing) the request of the terminal, the AMF of the PLMN 1 may transmit a registration accept message to the N3IWF of the PLMN 1. Here, the registration accept message may include "Multi SIM accept information". The Multi SIM accept information may mean information that accepts (or permits) a registration request related to the Multi SIM. The AMF of PLMN 1 transmits a registration accept message including the Multi SIM accept information, notify the terminal that multi SIM operation (e.g. an operation related to reception of multiple SIM registration indication (information) or Multi SIM indication (information), that is, if paging is needed to be performed, an operation of transmitting the NAS Notification through the N3IWF or the operation of transmitting the paging information through the SMS) is accepted (or allowed).

When accepting (or allowing) the request of the terminal, in step 17a), the AMF of the PLMN 1 may transmit a registration accept message (including "Multi SIM accept information") to the N3IWF of the PLMN 1.

In step 17b), the N3IWF of the PLMN 1 may transmit a registration acceptance message (including "Multi SIM accept information") to the UPF of the PLMN 2 via the Internet.

In step 17c), the UPF of PLMN 2 may transmit a registration acceptance message (including "Multi SIM accept information") to the UE.

As in the example of FIGS. 12A to 12C, based on the PDU session of the PLMN (e.g., PLMN 1) used as the main, the UE may perform registration procedure for the sub PLMN (e.g., PLMN2) through the N3IWF of the sub PLMN (e.g., PLMN2). As such, the UE may receive a notification related to the service of the sub PLMN (e.g., a NAS notification message) even if the UE only perform paging monitoring for the main PLMN. Also, by changing the main PLMN and the sub PLMN, the terminal may selectively perform a service between the two PLMNs as needed.

Although downlink data has been described in the examples of FIGS. 12A to 12C, the same scheme may be applied even when SMF, AMF, or PCF transmits downlink signaling.

In the example of FIGS. 12A to 12C, in order to reduce the burden on the mobility registration procedure and periodic registration procedure performed in the sub-network, the UE may request the AMF of the sub-network. (e.g., PLMN 2) to operate in the Mobile Initiated Connection Only (MICO) mode (e.g., the terminal requests the AMF in step 3), while performing registration procedure with 3GPP access. In this case, the terminal may include a multiple SIM registration indication (information) or a Multi SIM indication (information) in the registration request message transmitted to the AMF.

The AMF that has received multiple SIM registration indication (information) or Multi SIM indication (information) may not perform a mobility registration procedure for the terminal, a periodic registration procedure, or may perform a procedure for hardly performing the mobility registration procedure or the periodic registration procedure. For example, the AMF may configure a registration area to all PLMNs and assign a large value (e.g., 30 minutes, etc.) to the value of the periodic registration timer. Then, since the AMF does not perform a mobility registration procedure or performs a periodic registration procedure based on a period having a large value, the AMF may hardly perform a periodic registration procedure.

In addition, when the terminal transmits multiple SIM registration indication (information) or Multi SIM indication (information) while performing the registration procedure through N3IWF, N3IWF transmits multiple SIM registration indication (information) or Multi SIM indication (information) to AMF. Upon receiving the multiple SIM registration indication (information) or the Multi SIM indication (information), the AMF may reset the periodic registration timer of 3GPP access.

2. Classification of Service Types for Multi SIM Support

The network may inform Mobile Terminated (MT) data (e.g., downlink data of step 8 of FIGS. 12A to 12C), which is for what service, exists to the terminal through a NAS notification message. To this end, the network may inform the terminal of information related to a service type of MT data in a step related to the registration procedure. For example, when the terminal transmits multiple SIM registration indication (information) or Multi SIM indication (information) in step 5a) of FIGS. 12*a* to 12*c*, the UPF of PLMN 1 is in step 6c) of FIGS. 12*a* to 12*c* The registration acceptance message may include information on what kind of service is included in the registration accept message and transmit the registration accept message to the terminal.

Figure 13:
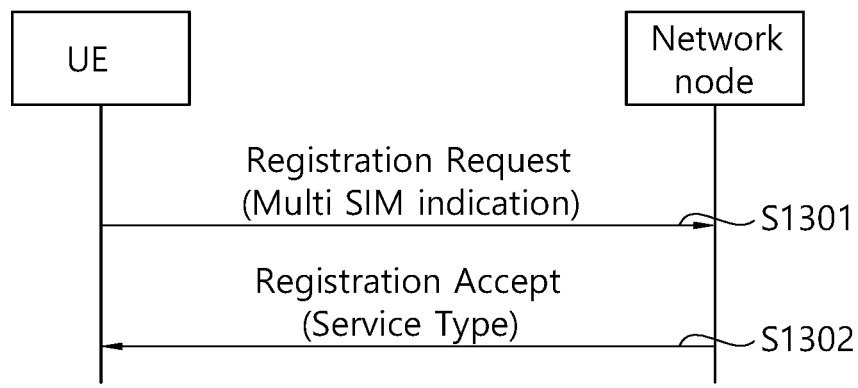
FIG. 13 is a diagram illustrating an example in which a network node transmits information on a service type.

An example in which the network node transmits information on a service type is shown in FIG. 13.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 13 is a Diagram Illustrating an Example in which a Network Node Transmits Information on a Service Type.

In step A501, the terminal may transmit a registration request message to the network node. The registration request message may include multiple SIM registration indication (information) or Multi SIM indication (information). For reference, step A501 may be performed in the same manner as step 5a) or step 16a) of FIGS. 12A to 12C. Here, the network node may be, for example, the AMF of PLMN 1 or the AMF of PLMN 2 that receives the registration message in step 5a) or step 16a) of FIGS. 12A to 12C.

In step A502, the network node may transmit a registration accept message to the terminal. The registration accept message may include information related to a service type. The information related to the service type may include, for example, the types of MT data services that the terminal can receive and values corresponding to the types of services.

The information related to the service type may be, for example, information such as an example table of Table 3 below.

TABLE 3

| IE(Information Element) value | service type |
|---|---|
| 1 | Network control signaling |
| 2 | Voice |
| 3 | SMS |
| 4 | Etc. |

Referring to Table 3, the service type includes network control signaling, voice, SMS, and others, but this is only an example, and the service type may include 3 or less or 5 or more service types. Referring to Table 3, the IE value corresponding to network control signaling is 1, the IE value corresponding to voice is 2, the IE value corresponding to SMS is 3, and the IE value corresponding to others is 4, but this is an example, and the IE value may be different from the value shown in Table 3.

All PLMNs may use information related to a service type having a standardized value. Alternatively, information related to a service type having a different value for each PLMN may be used.

Alternatively, a standardized value may be used for some of the information related to the service type, and a different value for each PLMN may be used for some of the information related to the service type. For example, standardized values are used for service classification such as controlling signaling and voice, and different values may be set for each PLMN for other service types.

Upon receiving the information related to the service type, the terminal may be set a priority value according to each service type through interaction with the user. Alternatively, the information related to the service type may include a default value of a priority value according to each service type.

When the terminal receives the priority according to the type of service through interaction with the user, the terminal may always set the priority value for network control signaling higher than the user's input for other service types.

The Application Function (AF) may exchange service type-related information with the network or update service type-related information through an N5 interface or an N33 interface with the network. Information related to the exchanged or updated service type may be updated to the terminal through a Configuration Update procedure_ or a registration procedure.

Service type-related information (e.g., service type setting information) may be exchanged or updated between PLMN operators through the same method and/or operation as in the above-described examples. For this information, an IE value may be used as a priority (priority). Alternatively, for such information, separate priority information may be used together. Based on this priority, the terminal and the network can know which service has a higher priority between the terminal and the network.

When the AMF receives multiple SIM registration indication (information) or Multi SIM indication (information) from the terminal, as illustrated in FIGS. 12A to 12C, the AMF may transmit a NAS notification message to the terminal through the N3IWF. The AMF may transmit the NAS notification message by including information related to the service type in the NAS notification message.

For services, such as NAS signaling or SMS, which do not have a problem even when transmitted to the terminal through N3IWF, the AMF may directly transmit data related to these services to the terminal without transmitting a NAS notification message. For example, in the case of SMS, if both the terminal and the network support transmission through non-3GPP access (e.g., transmission of SMS-related data through non-3GPP access), AMF may transmit SMS related data to the terminal through N3IWF. Whether the terminal and the network support transmission through non-3GPP access may be determined in the process of the terminal performing a registration procedure through N3IWF. Similarly, signaling transmitted by SMF, AMF, PCF, etc. may also be directly transmitted to the UE through the N3IWF.

3. Simultaneous Support of Operations Related to Non-3GPP Access and Operations of Multi SIM When the UE uses non-3GPP access (e.g., WLAN), the UE registers with the AMF through the N3IWF. For example, when the terminal intends to perform communication through non-3GPP access, the terminal may perform a registration procedure by transmitting a registration request message to the AMF through the N3IWF.

Therefore, when N3IWF is used to support Multi SIM-related operations, a problem may occur if the terminal receives a service through non-3GPP at the same time. For example, there may be problems in that a Multi SIM-related operation is not effectively performed or a service through non-3GPP cannot be effectively provided.

To solve this, the methods described in the examples of 3-1 to 3-3 below may be used. For reference, the methods described in the examples of 3-1 to 3-3 below may be used in combination with each other, or may be used separately.

3-1. Define a New Access Type

Currently, 5GS manages the registration of terminals by dividing them into 3GPP access and non-3GPP access. For example, the access type used in the registration procedure of the terminal is divided into 3GPP access and non-3GPP access.

Therefore, the UE must perform a registration procedure for each 3GPP access and non-3GPP access, respectively. AMF also separates and stores the context for each access. Accordingly, the AMF determines whether to transmit the NAS signaling to the terminal through which access of 3GPP access and non-3GPP access as needed.

When N3IWF is used to support multi-SIM-related operations, a method for defining and managing a new access type is proposed so that the terminal can be supported for simultaneously receiving non-3GPP service. That is, a method of defining and managing a new access type (e.g., non-3GPP access via 3GPP access) separately from 3GPP access and non-3GPP access will be described below.

That is, when the UE performs a registration procedure through non-3GPP and N3IWF of a sub-network (e.g., PLMN 2) through 3GPP access of the main network (e.g., PLMN 1) for Multi SIM-related operation, it is suggested to use a separate access type (e.g., non-3GPP access via 3GPP access). And, we propose a method to manage context using this access type.

To this end, AMF (e.g., AMF of PLMN 2) should be able to distinguish whether the UE has transmitted a registration request message through N3IWF in non-3GPP access (e.g., WLAN), or whether the UE is connected to N3IWF through 3GPP access (e.g., PLMN) for Multi SIM-related operations.

To this end, in the step of the UE performing the registration procedure, while setting up an IKE tunnel and the N3IWF, the UE may directly inform whether 3GPP access is used or non-3GPP access is used. For example, the UE may include access information (e.g., information on whether to use 3GPP access or non-3GPP access) in a registration message transmitted to the N3IWF. In addition, the N3IWF may inform the AMF of information provided by the terminal.

Alternatively, without the need for the terminal to inform the N3IWF of access information, the AMF (e.g., AMF of PLMN 2) may determine that the terminal has registered through 3GPP access (e.g., 3GPP access of PLMN 1), based on "multiple SIM registration indication (information) or Multi SIM indication (information)" included in the registration request message received from the terminal.

Thereafter, the AMF may inform that the registration is through 3GPP access while performing an initial context setup procedure with the N3IWF. Alternatively, the AMF may inform that the access type of the corresponding registration is non-3GPP access via 3GPP access while performing an initial context setup procedure with the N3IWF.

For Multi SIM-related operations, when the AMF transmitting a NAS notification message to the N3IWF, the AMF may inform the N3IWF of information on which access (e.g., non-3GPP access via 3GPP access or non-3GPP access) to transmit the NAS notification message.

Through this, even the UE uses both non-3GPP access via 3GPP access (e.g., when the UE performs Multi SIM-related operation) and non-3GPP access (e.g., when the UE communicates using WLAN) through N3IWF, the terminal and the network can communicate without any problem.

When the terminal receives a service through non-3GPP access, if the AMF needs to transmit signaling through non-3GPP access, the AMF may simply transmit the signaling to the N3IWF without providing special routing information. Then, the N3IWF may transmit signaling to the UE through non-3GPP access.

In a situation in which the terminal performs the registration procedure through non-3GPP access, when the terminal registers with N3IWF for Multi SIM operation, or in a situation where the terminal performs the registration procedure for N3IWF for Multi SIM operation, when the terminal performs the registration process through non-3GPP access, the authentication process can be shortened. For example, in these cases, through Internet Key Exchange (IKE) Security Association Cloning in RFC (Request For Comments) 7791, the authentication process can be reduced without repeating the process of establishing an IKE security association (SA) from the beginning.

3-2. Separately Manage IKE Tunnel for NAS Signaling in AMF and N3IWF

The method described below is similar to the method described in 3-1, but does not define a new access type as in 3-1, and the method described below includes method for managing non-3GPP registration through 3GPP access (e.g., registration procedures for Multi SIM operation in FIGS. 12A to 12c) separately. Alternatively, the method described below may be used together with the access type defined in 3-1.

When a new access type is defined, since a procedure for registering a UDM for each access type must be performed, the impact on the procedure performed in the network increases. Therefore, we propose a method in which the N3IWF manages IKE tunnel information through 3GPP access without defining an access type.

As described in 3-1, operations that the terminal transmits access type information (e.g., information on whether to use 3GPP access or non-3GPP access) to the N3IWF and/or operations that AMF notifies the access type information to the N3IWF indicates based on "multiple SIM registration indication (information) or Multi SIM indication (information)" may be performed in the same way.

However, the AMF may not separately manage the access type. Instead, the N3IWF may separately store information on the IKE tunnel through 3GPP access based on the access type information received from the terminal or the AMF. For example, the N3IWF may separately store information on the IKE tunnel through 3GPP access used for multi SIM-related operation based on the access type information received from the terminal or the AMF.

When the AMF needs to transmit a NAS notification message to the N3IWF, the AMF may transmit NAS signaling (e.g., a NAS notification message) and information indicating that the signaling is a Multi SIM-related operation (e.g., "multiple SIM registration indication (information) or Multi SIM indication (information)") to the N3IWF. The AMF may perform this operation to notify the N3IWF that the NAS notification message should be transmitted by the N3IWF to the IKE tunnel (the IKE tunnel separately managed and/or stored by the N3IWF). Then, the N3IWF may transmit the NAS signaling (e.g., NAS notification message) received from the AMF through the IKE tunnel connected through 3GPP access.

3-3. Use a Separate N3IWF

This method is a method of using a separate N3IWF different from the N3IWF used for non-3GPP access for Multi SIM-related operations. In this case, the terminal should perform an operation of selecting a separate N3IWF for the multi SIM-related operation. In addition, information on the N3IWF used for the multi SIM operation may be pre-configured in the AMF. That is, information on the N3IWF used for the multi SIM-related operation may be stored in the AMF. Then, when the AMF receives the registration request message from the N3IWF used for the Multi SIM-related operation, the AMF may know that the registration message is for the Multi SIM-related operation.

In this case, the terminal may not transmit "multiple SIM registration indication (information) or Multi SIM indication (information)". This is because even if the terminal does not transmit "multiple SIM registration indication (information) or Multi SIM indication (information)", the AMF may know that the registration message is for Multi SIM related operation.

Alternatively, the N3IWF may inform the AMF that the N3IWF itself is a separate N3IWF used for a Multi SIM-related operation while the N3IWF transmits the UE's registration request message to the AMF.

When the AMF needs to transmit a NAS notification message, since the AMF requests transmission of the NAS notification message to a separate N3IWF, the AMF may transmit the NAS notification message without affecting the N3IWF for non-3GPP access. In addition, since a separate N3IWF is used, routing information (e.g., information including whether to transmit through non-3GPP access or non-3GPP access via 3GPP access) that AMF must transmit when one N3IWF is used is not required to be transmitted.

4. Support for Suspend Based on MA PDU Session

While the terminal receives a service through PLMN 1, the terminal may receive a paging message or a NAS notification message from PLMN 2. When the terminal decides to receive the service from PLMN 2 based on the paging message or the NAS notification message, the service of PLMN 1 should be temporarily stopped. If the service of PLMN 1 is not interrupted and the terminal moves to PLMN 2, a situation in which PLMN 1 unnecessarily transmits a paging message or NAS notification message to the terminal may occur.

Therefore, in order to prevent such a situation, a method of suspending the PDU session is required. For this, the MA PDU session may be utilized. The MA PDU session is basically a PDU session using both 3GPP access and non-3GPP access. For example, when the terminal transmits data based on the MA PDU session, if a problem occurs in 3GPP access while the terminal transmits data through 3GPP access, the terminal may transmit data through non-3GPP access.

To this end, the UE may transmit an access availability report or an access unavailability report in relation to the MA PDU session. For example, when a problem occurs in 3GPP access related to the MA PDU session, the UE may transmit an access unavailability report for 3GPP access.

By using the access availability report or the access unavailability report, the UE may suspend the MA PDU session for a specific PLMN. For example, when the UE establishes (or creates) a PDU session in PLMN 1, the UE may establish (or create) a MA PDU session. When the UE moves to PLMN 2, the UE reports that 3GPP access is unavailable to the network node (e.g., UPF, AMF, etc.) of PLMN 1 based on the MA PDU session before moving to PLMN 2 (eg: access unavailability report).

Alternatively, a new report type (e.g., suspend request report) may be defined. When a new report type is defined, the UE may transmit a suspend request report to a network node (e.g., UPF, AMF, etc.) of PLMN1 instead of a report indicating that it is unavailable.

For 3GPP access or non-3GPP access, the UPF receiving the access unavailability report or suspend request report from the terminal may no longer transmit data to the terminal through 3GPP access or non-3GPP access.

If data transmission is possible through non-3GPP access (e.g., WLAN), the UPF may transmit data through non-3GPP access as in the prior art.

If data transmission is impossible through non-3GPP access, UPF may drop or buffer traffic to be transmitted through non-3GPP access. In this case, the UPF does not transmit data to the terminal through non-3GPP access for a certain period of time (e.g., a time value transmitted by the terminal through an unavailability report or a suspend request report, or a time value set by the SMF or operator in advance), the UPF does not transmit the data notification message to the SMF.

Thereafter, when the terminal moves from PLMN 2 to PLMN 1 again, the terminal transmits an access availability report or resume request report to the UPF (UPF of PLMN 1), and the UPF (UPF of PLMN 1) transmits data again to the terminal.

When the UE transmits an access unavailability report or a suspend request report, the UE does not transmit an access unavailability report or a suspend request report for all PDU sessions of the UE, and may selectively transmit an access unavailability report or a suspend request report for some PDU sessions.

For example, while the UE is receiving a service having priority 3 in PLMN 1, the UE may receive a NAS notification message for a service having priority 2 from PLMN 2. In this case, before the UE moving to PLMN 2, the UE may transmit an access unavailability report or a suspend request report only for PDU sessions related to a service having a priority lower than priority 2 (e.g., priority 3, priority 4, etc.). Through this, while the terminal moves to PLMN 2 and receives the service having priority 2, a NAS notification message for a service having a priority higher than or equal to priority 2 (e.g., priority 2, priority 1, priority 0, etc.) may be received from the PLMN. Then, based on the NAS notification message received from PLMN 1, the UE may suspend the PDU session in PLMN 2 again and move on to PLMN 1.

In addition, instead of using the MA PDU session, a measurement report function used for the MA PDU session may be applied to the general PDU session. For example, the UE may transmit an access availability report or an access unavailability report for a normal PDU session. In this case, the terminal may transmit "multiple SIM registration indication (information) or Multi SIM indication (information)" to the SMF while establishing (or generating) the PDU session. When the SMF allows a measurement report function (e.g., using an access availability report or an access unavailability report) for a normal PDU session, the SMF the SMF may create a PDU session by selecting a UPF supporting information necessary for measurement (e.g., measurement assistance information) and Performance Measurement Functionality (PMF).

5. Method Using AF

The UE may register with the main network (e.g., PLMN 1). Thereafter, the UE may transmit a registration request message including "multiple SIM registration indication (information) or Multi SIM indication (information)" while registering with the sub-network (e.g., PLMN 2). Then, the PLMN of the sub-network (e.g., PLMN 2) may include information related to "Paging AF" in the registration accept message and transmit it to the UE. Here, "Paging AF" may be an AF that transmits a notification message to the terminal according to the paging request of the AMF of the sub-network (e.g., PLMN 2).

Thereafter, the UE may request a Multi SIM-related operation with "Paging AF" based on information related to "Paging AF" received from a PLMN (e.g., PLMN 2) used as a sub. For example, the UE may access "Paging AF" by using the PDU session of PLMN 1, and the UE may request Multi SIM related operation from "Paging AF". The UE may inform "Paging AF" of UE information (e.g., Generic Public Subscription Identifier (GPSI)) used by the UE in PLMN 2. "Paging AF" may store terminal information of the terminal and IP information of the terminal.

Thereafter, "Paging AF" may notify the AMF of PLMN2 through NEF or directly notify the AMF of PLMN2 that the UE has requested a Multi SIM-related operation. Then, when paging for the terminal is required, the AMF of PLMN2 may request "Paging AF" to transmit a notification message to the terminal without performing paging. Then, "Paging AF" may transmit a notification message to the terminal using the registered IP information of PLMN 1 (e.g., IP information of the terminal in PLMN 1). The terminal may determine whether to move to PLMN 2 based on the service information in the notification message.

5-1. A First Example of a Method Using AF

When the terminal uses Multi SIM, the user can subscribe to a supplementary service that supports Multi SIM through the operator. The supplementary service supporting Multi SIM may be referred to as, for example, a Multi SIM service (or supplementary service). When the user subscribes to the supplementary service, the AF of the operator's PLMN may perform an event subscription operation for transmitting a notification message when a Multi SIM-related operation is required to the Mobility Management Entity (MME) (or Access and Mobility Management Function (AMF)) through the service capability exposure function (SCEF) (or network exposure functions (NEF)), etc.)

For example, when the UE uses SIMs (e.g., SIM 1 and SIM 2), for PLMN 1 and PLMN 2 the user may subscribe to the Multi SIM service of the PLMN 1 operator. The user may provide (or register) the phone number of SIM 2 used in PLMN 2 to the PLMN 1 operator while subscribing to the Multi SIM service of the PLMN 1 operator.

Conversely, when the UE uses SIMs (e.g., SIM 1 and SIM 2) for PLMN 1 and PLMN 2, the user may subscribe to the Multi SIM service of the PLMN 2 operator. The user may provide (or register) the phone number of SIM 1 used in PLMN 1 to the PLMN 2 operator while subscribing to the Multi SIM service of the PLMN 2 operator.

The terminal may determine which SIM to use as the main based on information set by the user. When the UE registers with the PLMN (e.g., PLMN 1) using the SIM (e.g., SIM 1) to be used as the main, the UE may perform a registration procedure for the PLMN (e.g., PLMN 1).

When the UE registers with the PLMN (e.g., PLMN 2) using the SIM (e.g., SIM 2) to be used as a sub, the UE may transmit a registration request message a "multi SIM registration indication (information) or Multi SIM indication (information)" indicating that Multi SIM-related operations are required in the registration procedure. In this case, the network (e.g., PLMN 2) may check whether the terminal is subscribed to the Multi SIM supplementary service by performing a subscriber information check. When the terminal is subscribed to the Multi SIM supplementary service, the network (e.g., PLMN 2) may inform the terminal that the SIM operation is supported by including "Multi SIM indication (information) or Multi SIM accept information" in the registration accept (or allow) message transmitted to the terminal. For example, the AMF of the network (e.g., PLMN 2) may transmit a registration acceptance (or allow) message including "Multi SIM indication (information) or Multi SIM accept information" to the terminal.

After the registration procedure is completed, when the terminal is in the IDLE state, the terminal needs to monitor paging in a network (e.g., PLMN 1) related to the configured main SIM (e.g., SIM 1). However, the UE does not need to monitor paging from a network (e.g., PLMN 2) related to the configured sub-SIM (e.g., SIM 2).

The UE performs a registration procedure for a network (e.g., PLMN 2) related to a sub-SIM (e.g., SIM 2) by sending a registration request message including "multiple SIM registration indication (information) or Multi SIM indication (information)". Then, when paging for the terminal is required in the corresponding network (a network using the sub-SIM) (e.g., PLMN 2), the AMF (e.g., AMF of PLMN 2) does not perform paging and transmits an event notification message notifying the AF that paging is required. The operation of the AMF to transmit the event notification message is performed based on "an event subscription operation, by the AMF, for transmitting a notification message when a Multi SIM-related operation is required to the MME (or AMF) through the SCEF (or NEF, etc.)" according to the supplementary service subscribed by the user in advance.

AF (e.g., AF of PLMN 2) receives a notification message that paging is required, AF (e.g., AF of PLMN 2) may transmit SMS to the terminal based on the phone number of a SIM (e.g., SIM 1) of another PLMN (e.g., PLMN 1) registered (or provided) when a user subscribes to a supplementary service. That is, the AF of the PLMN using the sub SIM may transmit an SMS to the terminal based on the phone number of the main SIM.

This SMS may include information about paging. The information about paging may include, for example, paging priority, service type information, and the like.

Since the SMS is set to be sent through the phone number using the main SIM, the terminal can receive the SMS. Upon receiving the SMS, the terminal may determine whether to perform a response to the paging by moving to another PLMN (e.g., PLMN 2) based on the paging information included in the SMS.

The terminal may determine to perform a response to the paging received through the SMS. In this case, the terminal may transmit a "Multi SIM indication (information)" to the PLMN currently used as the main (e.g., PLMN 1) to inform that the terminal itself is moving to another PLMN (e.g., PLMN 2). Thereafter, the main PLMN (e.g., PLMN 2) may operate as a sub-network related to the sub-SIM.

The terminal may perform a service request procedure for responding to the paging received through the SMS in the PLMN (e.g., PLMN 2). The terminal may include "Multi SIM release indication (information)" in the service request message while transmitting the service request message. "Multi SIM release indication (information)" may be an indication or information to stop Multi SIM related operations (e.g., sending paging information through SMS). A network (e.g., PLMN 2) that has received the "Multi SIM release indication (information)" may operate as a network related to the main SIM.

When it is decided not to respond to the paging received through the SMS, the terminal may transmit a response message (e.g., including information not to respond to the paging) to the AF using the SMS. After receiving the response message, the AF (e.g., AF of PLMN2) may transmit a response message of the terminal to the AMF/MME (e.g., AMF/MME of PLMN2).

If the terminal uses 3 or more SIMs instead of 2 SIMs, the network may not know which SIM to send the SMS to. To solve this, when the terminal transmits a registration request message including "multiple SIM registration indication (information) or Multi SIM indication (information)" to a network (e.g., a network related to a sub-SIM), the terminal transmits information on the PLMN used as the main, among the networks related to the three or more SIMs, and/or information on the phone number of the PLMN used as the main, among the networks related to the three or more SIMs together. Based on this, the MME (or AMF) of the network (e.g., a network related to the sub-SIM) and may transmit information on the PLMN used as the main and/or information on the phone number of the PLMN used as the main together, while transmitting a notification message to the AF.

Hereinafter, a specific example of the first example of a method using AF will be described with reference to FIGS. 14A and 14B.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 14A:
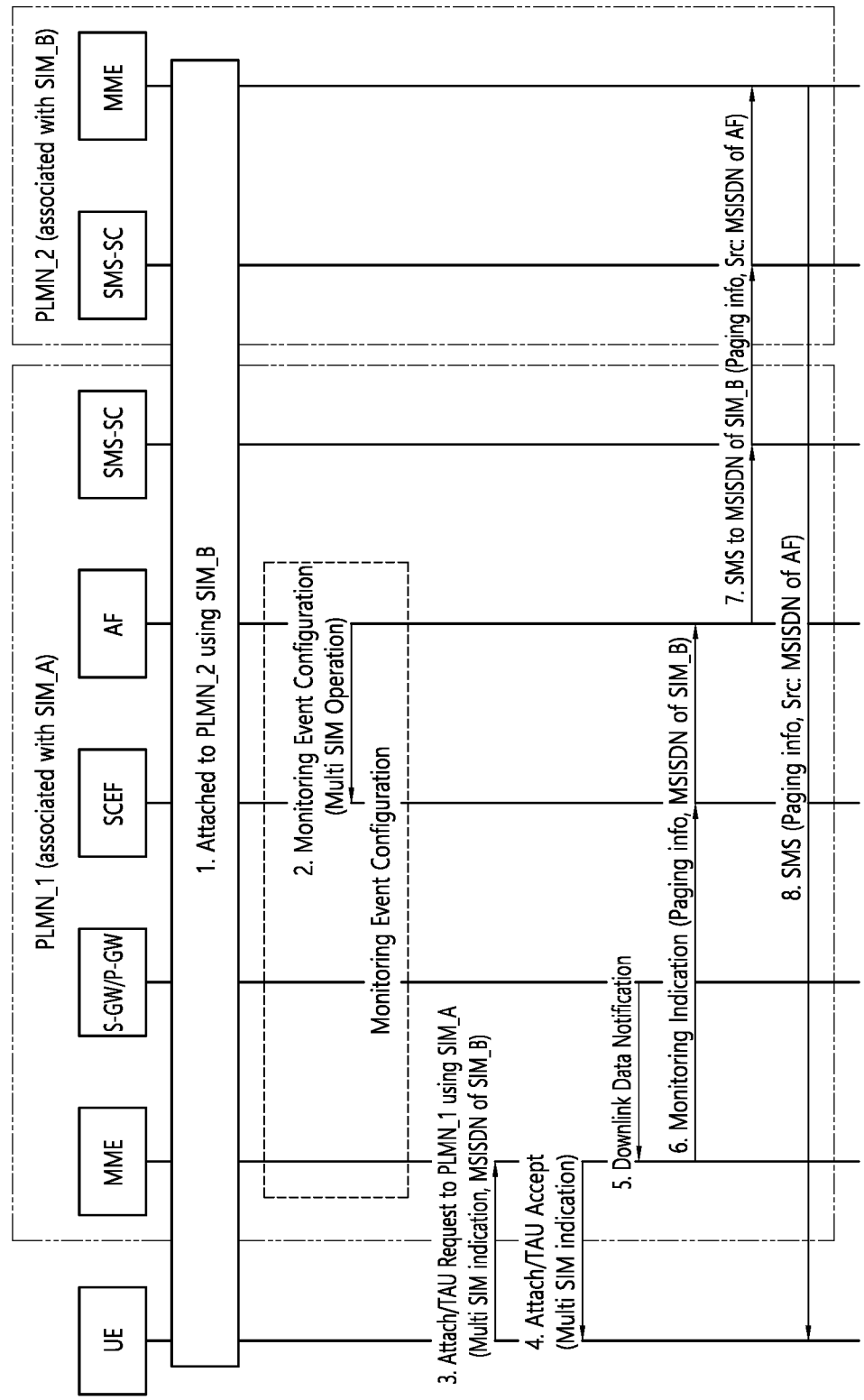
FIGS. 14A and 14B are diagrams illustrating an example of an operation according to the first example of a method using AF.
Figure 14B:
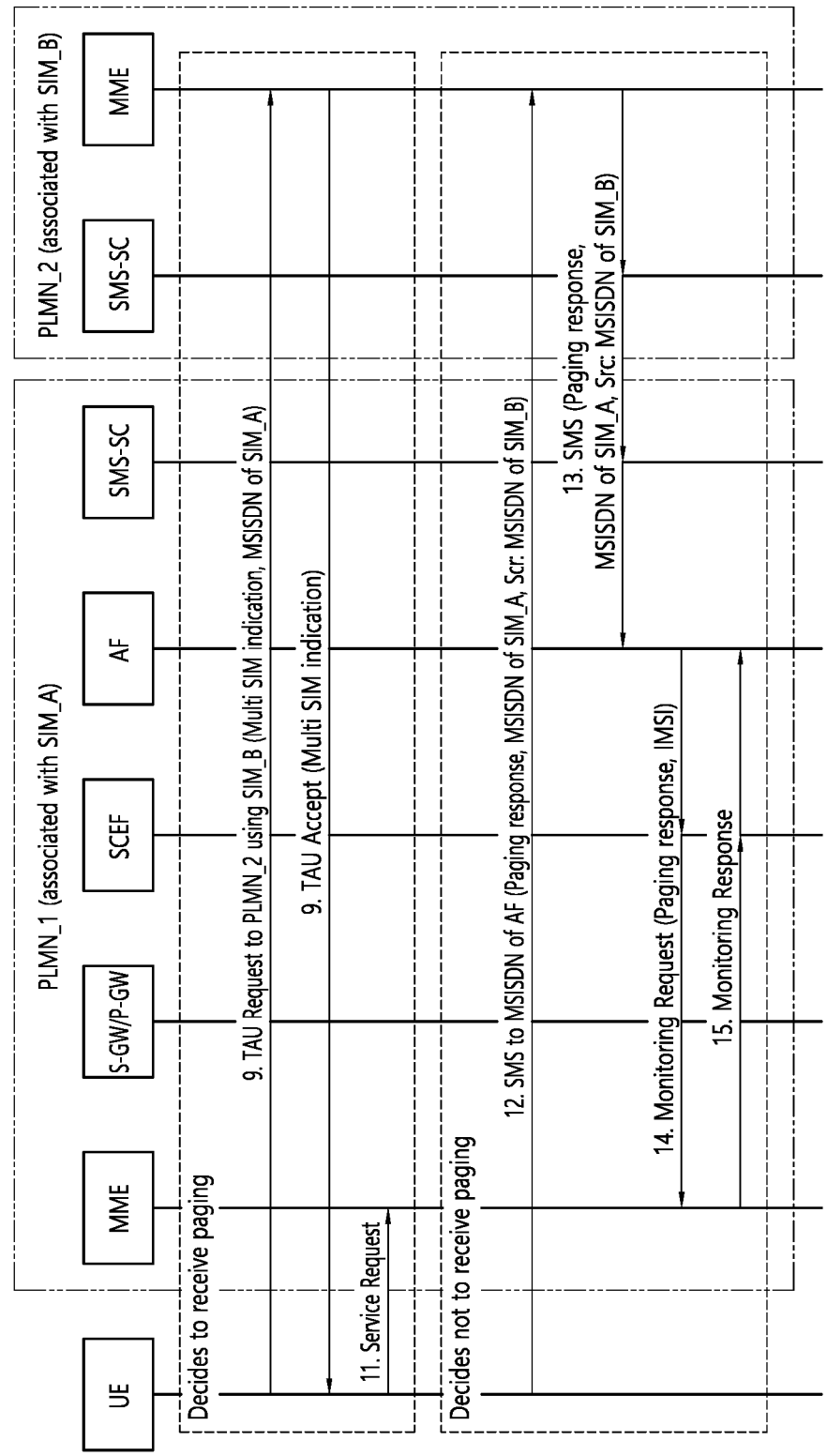

FIGS. 14A and 14B are Diagrams Illustrating an Example of an Operation According to the First Example of a Method Using AF.

The examples shown in FIGS. 14A and 14B are examples of operations based on EPS. For reference, the exemplary operations shown in FIGS. 14A and 14B may be similarly operated in 5GS. For example, MME may be replaced with AMF. SCEF may be replaced by NEF. In addition, the Tracking Area Update (TAU) procedure and/or the attach procedure may be replaced with a registration procedure.

1) The UE may perform registration for PLMN_2 using SIM_B (or SIM 2). For example, the UE may be in a state in which the attach procedure for PLMN_2 is performed using SIM_B (or SIM 2). Here, PLMN_2 may be a network used as the main by the terminal.

2) According to a preset network setting (e.g., when a user subscribes to a supplementary service for MUSIM, etc.), AF may perform an operation of configuring a monitoring event through SCEF. Here, the monitoring event may be a monitoring event requesting a notification message when a specific terminal requires a Multi SIM-related operation. The operation of setting the monitoring event may be performed by AF, SCEF and MME. For reference, USIM and SIM may be used with similar meanings. MUSIM and Multi SIM may also be used with similar meanings.

3) The UE may transmit the attach request message or the TAU request message to the MME of the PLMN (e.g., PLMN_1) used as the sub. The UE does not directly receive the paging from the PLMN (e.g., PLMN_1) used as the sub, but may want to receive the paging through another PLMN (e.g., PLMN_2). The attach request message or TAU request message may include "multiple SIM registration indication (information) or Multi SIM indication (information)" and phone number information from which the terminal wants to receive paging (e.g., SIM_B phone number information). Mobile Station Integrated System Digital Network (MSISDN) may mean phone number information. For example, the MSISDN of SIM_B may be an example of SIM_B's phone number information.

4) The MME may determine whether to allow the Multi SIM-related operation based on subscriber information of the terminal and the capability of the terminal/network. When the MME allows the Multi SIM-related operation, the MME may transmit a TAU accept message or an attach accept message including "Multi SIM indication (information)" to inform the UE that the Multi SIM operation is allowed.

5) When data for the UE is received in PLMN_1, the S-GW of PLMN_1 may transmit a Downlink Data Notification (DDN) message to the MME. The MME may receive the DDN message through the S-GW.

6) In step 4), when the MME permits the multi-SIM-related operation to the UE, the MME transmits a monitoring indication (or information) to the AF through the SCEF instead of requesting paging to the RAN. Based on the monitoring event set in step 2), the MME may transmit a monitoring indication (or information) to the AF through the SCEF to request a notification message from the AF. The monitoring indication (or information) may include information on paging to be transmitted to the terminal (e.g., service type information, priority information, etc.) and phone number information from which the terminal wants to receive paging (e.g., SIM_B's phone number information). In other words, the MME may transmit a monitoring indication (or information) to the SCEF. Then, the SCEF may transmit a monitoring indication (or information) to the AF.

7) AF may transmit an SMS to the terminal through the phone number of PLMN_2 (e.g., phone number information of SIM_B) based on the information received through the SCEF. The SMS may include information on paging (e.g., service type information, priority information, etc.). A phone number of AF may be set as the calling number of the SMS, and the SMS may be transmitted. Src: MSISDN of AF of the drawing may mean that the phone number (MSISDN) of the caller (Src) is the phone number (MSISDN) of the caller (Src). At this time, the AF indicates that the SMS transmitted to the terminal is not a general SMS but information about paging (or to inform that it is an SMS related to paging), AF may transmit SMS by using a specific value (e.g. an ID value indicating paging) for the TP (Transfer Protocol) Protocol Identifier (TP PID) of the SMS. Alternatively, the AF may transmit the SMS to the terminal by using a specific value (e.g., an ID value indicating paging) for the TPUD (Transfer Protocol User Data) of the SMS. The AF may store PLMN_2's phone number (e.g., SIM_B's phone number information) information received in step 6) to process the terminal's response to the transmitted SMS. AF may transmit SMS to SMS-SC (Short Message Service—Service Center) of PLMN_1. Then, the SMS-SC of PLMN_1 may transmit the SMS to the SMS-SC of PLMN_2. The SMS-SC of PLMN_2 may transmit an SMS to the MME of PLMN_2.

8) The MME of PLMN_2 may transmit an SMS to the terminal. The terminal may receive paging information (e.g., service type information, priority information, etc.) through the SMS of PLMN_2.

The UE may determine whether to respond to the paging transmitted by the AF of PLMN_1 based on the information on the paging. For example, the terminal may determine whether to respond to the paging based on information set in the terminal or interaction with the user.

When the terminal decides to respond to the paging (when the terminal decides to receive a service from PLMN_1), steps 9) to 11) may be performed. When the terminal decides not to respond to the paging (when the terminal decides to continue receiving the service in PLMN_2), steps 12) to 15) may be performed.

9) When the terminal decides to receive a service by moving to PLMN_1 based on the paging information received through the SMS (the terminal can determine this through information set in the terminal or interaction with the user), the terminal may transmit a TAU request message to the MME of PLMN_2 currently performing the service. The UE may request a Multi SIM-related operation from PLMN_2 by transmitting a TAU request message. The operation for requesting a multi SIM-related operation in step 9) may be performed in the same manner as in step 3). The TAU request message may include "multiple SIM registration indication (information) or Multi SIM indication (information)" and phone number information from which the terminal desires to receive paging (e.g., SIM_A phone number information). The phone number information of SIM_A may be, for example, MSISDN of SIM_A.

10) The MME of PLMN_2 may determine whether to allow the Multi SIM-related operation based on subscriber information of the terminal and the capability of the terminal/network. When the MME allows the Multi SIM-related operation, the MME may transmit a TAU accept message including a "Multi SIM indication (information)" to inform the UE that the Multi SIM operation is allowed.

11) The UE may move to PLMN_1 and perform a service request procedure or a TAU procedure in response to paging. For example, the UE may transmit a service request message to the MME of PLMN_1.

When the terminal decides not to respond to the paging (when the terminal decides to continue receiving the service in PLMN_2), steps 12) to 15) may be performed.

12 and 13) The terminal may decide to continue receiving the service from PLMN_2 based on the paging information received through the SMS. In this case, the terminal may transmit an SMS (including a paging response message and SIM_A phone number information) to the AF of PLMN_1 to the AF phone number included in the received SMS information. Src: MSISDN of SIM_B in the drawing may mean that the phone number (MSISDN) of the caller (Src) is the phone number (MSISDN) of SIM_B. AF may know from which terminal the response was received based on the phone number information of SIM_A. The paging response message may indicate that the terminal will not perform a service request procedure or a TAU procedure in response to paging. In order to indicate that the SMS transmitted to the AF is not a general SMS but information about paging (or to inform that it is an SMS related to paging), the terminal may transmit SMS by using a specific value (eg. an ID value indicating paging) for the TP (Transfer Protocol) Protocol Identifier (TP PID) of the SMS. Alternatively, the terminal may transmit the SMS to the AMF by using a specific value (e.g., an ID value indicating paging) for the TPUD (Transfer Protocol User Data) of the SMS. In this case, the terminal may include information requesting to suspend the service triggering paging in PLMN_1 in the SMS transmitted to the AF. In this case, the MME of PLMN_1 may no longer perform paging for the service for which deferment is requested, and may not request SMS transmission through AF.

When the UE transmits the SMS to the AF of PLMN_1, the UE may transmit the SMS to the AF through the MME of PLMN_2, the SMS-SC of PLMN_2, and the SMS-SC of PLMN_1. The UE may transmit the SMS to the MME of PLMN_2 in step 12). The MME of PLMN_2 may transmit an SMS to the SMS-SC of PLMN_2. The SMS-SC of PLMN_2 may transmit an SMS to the SMS-SC of PLMN_1. The SMS-SC of PLMN_1 may transmit an SMS to AF of PLMN_1.

14) AF may receive the SMS transmitted from the terminal. The AF may recognize that the terminal is a terminal using SIM_A based on sender information of the SMS transmitted by the terminal (e.g., including phone number information (MSISDN of SIM_A) of SIM_A). The AMF may transmit a monitoring request message to the MME through the SCEF. The monitoring request message may include a paging response message included in the SMS and an ID (e.g., International Mobile Subscriber Identity (IMSI)) indicating that the terminal that transmitted the SMS is a corresponding terminal using SIM_A. Upon receiving the monitoring request message, the MME may inform the S-GW that transmitted the data notification message (DDN) that the UE is unreachable. Based on this, the S-GW may drop the data that triggered the DDN.

15) The MME may transmit a response message (e.g., a monitoring response message) to the monitoring request message received in step 14) to the AF through the SCEF.

In step 12) described above, instead of the terminal transmitting an SMS (e.g., MO SMS), the terminal may transmit a paging response message while transmitting a delivery report for the SMS received in step 8). According to the prior art, the terminal receiving the SMS may transmit an SMS-DELIVER-REPORT (i.e., a month report for the SMS) in order to notify that the SMS has been received. Using this, the terminal may transmit the SMS-DELIVER-REPORT, but to indicate that this delivery report is a paging response rather than a general SMS (or to inform that it is a response to an SMS related to paging), the terminal may configure a value indicating a paging response in TP User Data (TP UD) included in DELIVER-REPORT and transmit SMS-DELIVER-REPORT. For example, one of the reserved values of the TP-UD may be defined and used as a paging response. Alternatively, the terminal may transmit the SMS-DELIVER-REPORT by setting a specific value (e.g., a value indicating a paging response) in the TP-Protocol Identifier (TP-PID). In this case, the terminal may not transmit the MO SMS, such as the SMS transmission in step 12).

For reference, in step 7), the AF may not directly generate and transmit the SMS. For example, the AF may request the SMS-SC of PLMN_1 to generate an SMS through Machine Type Communication-Interworking Function (MTC-IWF).

6. Example of how to Use SMS

A method of using Push Notification (i.e., information about paging) through SMS will be described. Push Notification was transmitted to the terminal through the user plane using IP packets. Hereinafter, a method in which a Push Notification is transmitted to a terminal using an SMS message instead of an IP packet will be described.

A description of Push Notification (i.e., information on paging) through SMS may be related to "Handling of MT service" and "Enabling Paging Reception". The contents described below may be applied to both 5GS and EPS. Hereinafter, a method in which Push Notification is delivered through SMS will be described. The following description may be applied to a case in which a Multi USIM device (e.g., a device using a plurality of SIMs) is a single Rx device.

Hereinafter, with reference to FIG. 15, an example of the architecture of a situation in which a dual-USIM device (e.g., a device using two SIMs) is simultaneously registered in 5GS (or EPS) A (System A) and 5GS (or EPS) B (System B).

The following drawings were created to explain a specific example of the present specification. Since the names of specific devices described in the drawings or the names of specific signals/messages/fields are presented by way of example, the technical features of the present specification are not limited to the specific names used in the following drawings.

Figure 15:
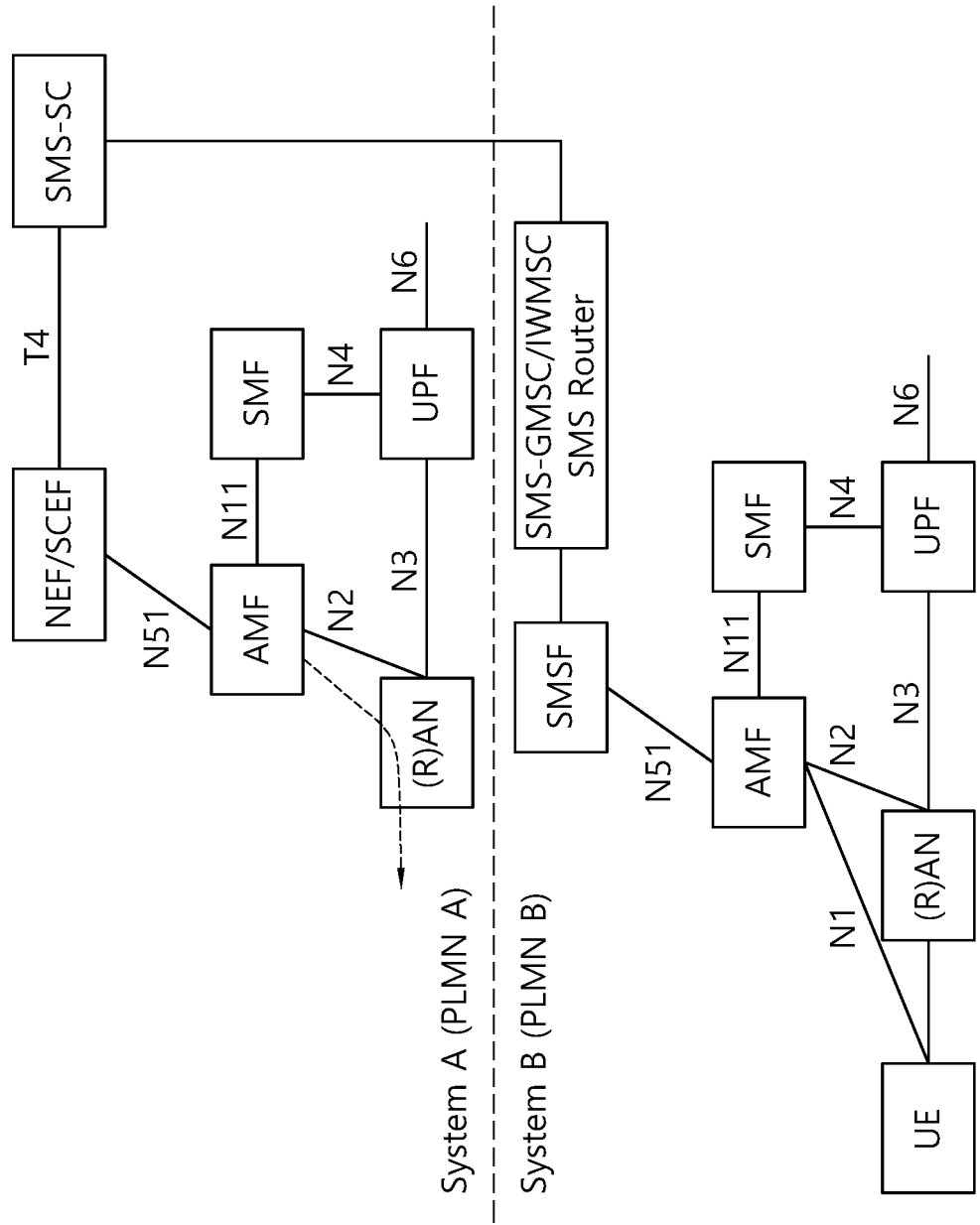
FIG. 15 is a diagram illustrating an example in which a terminal is simultaneously registered in system A and system B.

FIG. 15 is a Diagram Illustrating an Example in which a Terminal is Simultaneously Registered in System A and System B.

For reference, system A shown in FIG. 15 means a system related to USIM A (or USIM 1) used by a terminal (e.g., UE). System A may be referred to as PLMN A. System B shown in FIG. 15 means a system related to USIM B (or USIM 2) used by a terminal (e.g., UE). System B may be referred to as PLMN B. SMS-GMSC may mean a Gateway Mobile switching center (MSC) For Short Message Service. IWMSC may mean Inter Working Mobile Switching Center.

In the example of FIG. 15, the terminal may be in a state of using system B or PLMN B as main, and performing communication in system B or PLMN B.

The UE may perform a registration procedure for a network (e.g., system A or PLMN A) associated with USIM A. While the terminal performs the registration procedure, the terminal may inform the AMF of the system A that it wants to register for the paging event. Because, for example, while the terminal is performing active communication through a network (e.g., system B or PLMN B) associated with USIM B, the terminal cannot monitor the paging channel in a network associated with USIM A (e.g., system A or PLMN A). Or, this is because the UE is trying to prevent the creation of a reception gap for monitoring a paging channel in a network (e.g., system A or PLMN A) associated with USIM A. The UE may provide the MSISDN of USIM B to the network (e.g., AMF of System A) while performing a registration procedure for a network (e.g., system A or PLMN A) associated with USIM A. Thereby, the network (e.g., AMF of system A) may provide a paging event to the terminal through the provided MSISDN (e.g., MSISDN of USIM B).

For reference, the MSISDN of another system may be preset as a part of subscriber data through pre-configuration. For example, when a user subscribes to a multi-sim plan (e.g., a supplementary service related to Multi SIM), the MSISDN of another system may be preset as a part of subscriber data through pre-configuration.

When the network (e.g., AMF of system A) acknowledges the request of the terminal, the AMF (e.g., AMF of system A) may provide credentials for the UE. Credentials for the UE may enable security verification of the paging information contained in the SMS. Note that the USIM credential may be reused to verify the SMS.

For reference, although FIG. 15 shows an example where System A and System B are systems based on 5GS, the description may be applied as the same for a case even when one or both of the systems (System A and System B) are based on EPS.

Similarly, when the terminal accesses a network associated with USIM B (e.g., system B or PLMN B), the terminal may provide the MSISDN of USIM A to system B or PLMN B. Then, the terminal may receive a credential for security verification of the paging information.

Note that there may be no business relationship between System A and System B here.

When the UE needs to be paged for MT service in system A (or PLMN A), the SMF (or MME) in system A may initiate paging directly in system A. After some delay, System A's SMF (or MME) may transmit USIM B's MSISDN and SMS payload (including Push Notification) to SMS-SC via NEF (or SCEF). Here, the value applied to the slight delay may be a value according to a paging strategy set in the AMF.

The following may occur:

case 1: The UE may perform active communication through the system B. In this case, the UE cannot hear (or monitor) the Uu paging in System A. Here, Uu may mean a wireless interface of LTE. However, the terminal may receive a push notification from the system A via SMS. When the terminal receives the Push Notification, the terminal may postpone communication in system B and respond to Uu paging in system A.

Case 2: The UE may be in the idle state in both system A and system B. The UE may be paged sequentially. For example, the terminal may be paged only in system A first, and after a slight delay, may be paged via SMS including Push Notification. In system B, a DL packet for the terminal may be received. The DL packet for the UE may trigger "normal" paging. Normal paging triggered in system B may succeed or fail, independent of the fact that the UE responded in system A or not.

The Push Notification in the SMS content may be the same as the content of the Uu paging message. Push Notification in the SMS content may include at least information (or indication) on the service type that triggered the paging and an identifier that clearly pointing USIM included in the Multi-USIM device, which to receive paging, (an identifier that non-ambiguously points to the USIM in the Multi-USIM device).

Hereinafter, an example of a specific procedure performed in 5GS and EPS, an example of a method using SMS, will be described with reference to FIG. 16.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 16:
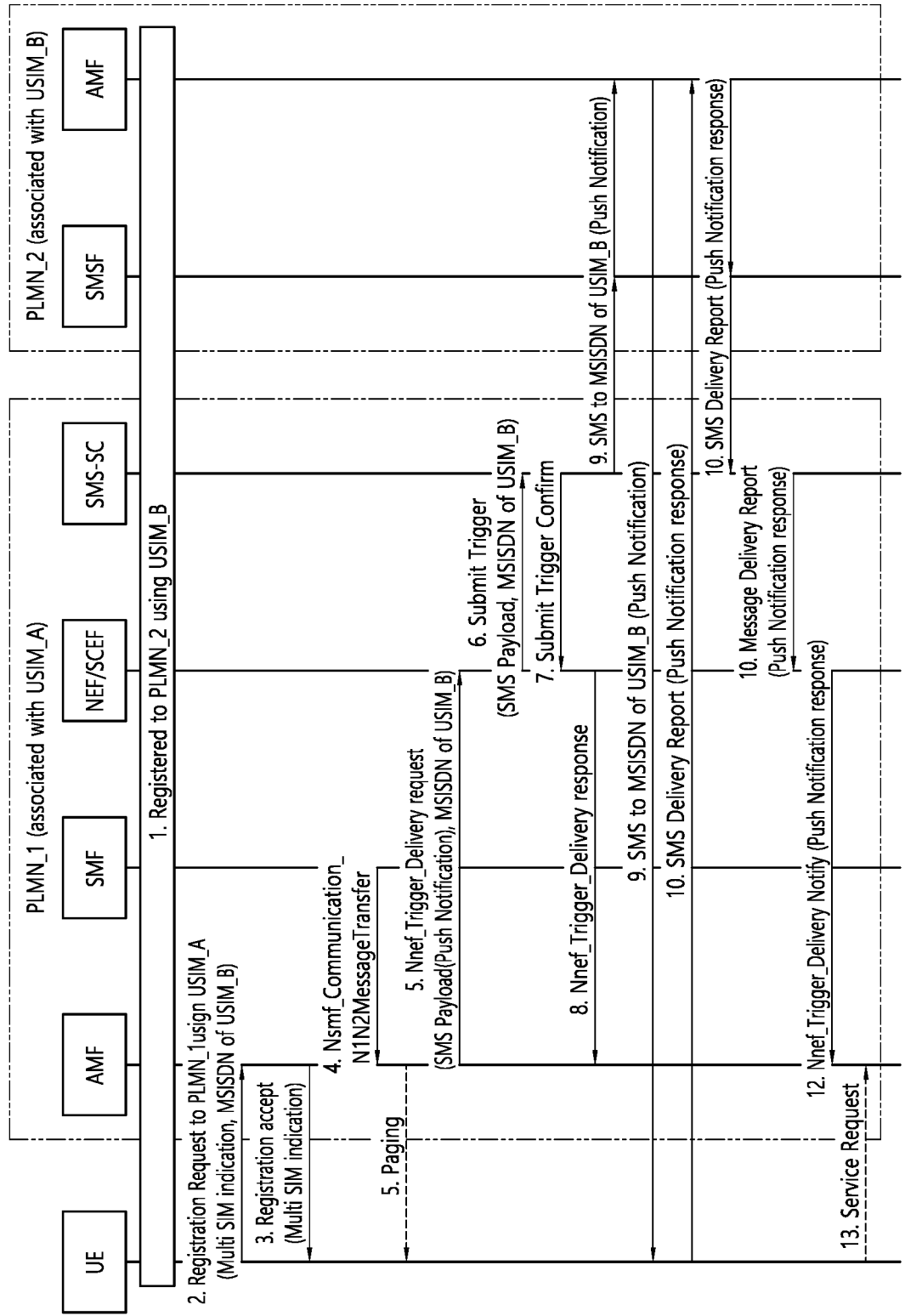
FIG. 16 shows an example of a procedure in which an example of a method using SMS is performed in 5GS.

FIG. 16 Shows an Example of a Procedure in which an Example of a Method Using SMS is Performed in 5GS.

FIG. 16 shows a specific example in which the procedure related to sending a Push Notification via SMS is performed in 5GS. The example of FIG. 16 shows an example in which the terminal (e.g., UE) uses PLMN_2 (PLMN associated with USIM B) as a main and PLMN_1 (PLMN associated with USIM A) as a sub, but this is only an example, and the same description may be applied for a case of vice versa.

1) The UE may use USIM B to perform a registration procedure for PLMN_2. The terminal may be in a state that the terminal is registered in PLMN_2.

2) The UE may transmit a registration request message to PLMN_1 using USIM_A. In order to indicate that the terminal wants to receive the Push Notification via SMS, the registration request message may include "multiple SIM registration indication (information) or Multi SIM indication (information)" and the MSISDN of USIM_B.

3) If the AMF allows the transmission of the Push Notification to the terminal through SMS, the AMF may transmit a registration accept message to the terminal. The registration acceptance message may include a Multi SIM indication (information) to inform that Push Notification via SMS will be performed.

4) In PLMN_1, if there is downlink data for the terminal, the SMF may trigger the Namf_Communication_N1N2MessageTransfer service to request the AMF to set up the user plane resource. That is, the SMF may transmit the Namf_Communication_N1N2MessageTransfer message to the AMF.

5) The AMF may transmit a paging message to the UE by transmitting a paging request message to the RAN. For reference, the operation of the AMF transmitting the paging request message may not be performed. The AMF may trigger an NEF-related request (e.g., Nnef_Trigger_Delivery request) in order to transmit a Push Notification to the terminal through SMS. That is, the AMF may transmit a request message (e.g., an Nnef_Trigger_Delivery request message) to the NEF or the SCEF. The request message transmitted by the AMF may include the MSISDN of USIM_B and the SMS payload (including Push Notification). Push Notification may include information on the service type that triggered the Push Notification and PLMN ID (e.g., ID of PLMN_B). Additionally, the AMF may also provide the NEF/SCEF with the validity time of the Push Notification message.

6) The NEF may transmit a Submit Trigger message to the SMS-SC. The submission trigger message may include the MSISDN of USIM_B received from the AMF, the SMS payload (including Push Notification), and/or the validity time of the Push Notification message.

7) SMS-SC may respond to NEF. For example, the SMS-SC may transmit a submission trigger confirm message to the NEF in response to the submission trigger message.

8) NEF may respond to AMF. For example, the NEF may transmit a response message (e.g., Nnef_Trigger_Delivery response message) to the AMF in response to the request message (e.g., Nnef_Trigger_Delivery request message) transmitted by the AMF.

9) The SMS-SC of PLMN_1 may generate an SMS message including a Push Notification. When the SMS-SC receives the validity time, the SMS-SC may set a Validity-Period of the SMS message to the received validity time. The SMS-SC of PLMN_1 may transmit the generated SMS message (including Push Notification) to the terminal by using the received MSISDN of USIM_B. For example, the SMS-SC of PLMN_1 may transmit an SMS message (including push notification) to the AMF of PLMN_2 via the SMSF of PLMN_2. Then, the AMF of PLMN_2 may transmit an SMS message (including Push Notification) to the terminal.

10) When the terminal receives the Push Notification through SMS, the terminal may transmit the SMS Delivery Report to the SMS-SC according to the settings of the SMS-SC that transmitted the SMS. In this case, the terminal may include the Push Notification response message in the SMS Delivery Report. The SMS Delivery Report is transmitted when the terminal successfully receives the SMS. For reference, when the terminal does not switch the SIM used through 3GPP access after receiving the Push Notification, the Push Notification response message may be included in the SMS Delivery Report. For example, when the terminal decides not to respond to the paging, the terminal may include a Push Notification response message in the SMS Delivery Report. In this case, the Push Notification response message may include information that the terminal will not respond to paging.

Alternatively, the terminal may transmit a Mobile Originated (MO) SMS to the SMS-SC of PLMN_1 to transmit a Push Notification response message. To this end, when the SMS-SC of PLMN_1 generates an SMS message and transmits it to the terminal, the SMS-SC of PLMN_1 should include MSISDN information of the SMS-SC of PLMN_1, which can receive SMS, in the SMS message. In addition, since the SMS-SC of PLMN_1 allocates different MSIDNs for each terminal, when the SMS-SC of PLMN_1 receives SMS-MO from each terminal, it is possible to identify which terminal the SMS-MO is for. Alternatively, when the SMS-SC of PLMN_1 receives the SMS-MO from the terminals, the SMS-SC of PLMN_1 may identify which terminal information the SMS-MO is for based on the sender MSISDN of the terminal. In addition, since the SMS-SC of PLMN_1 can continuously transmit Push Notifications based on AMF requests, the SMS-SC of PLMN_1 may transmit SMS message by adding information used in the NAS protocol (e.g. Procedure transaction identity (PTI)) is added to the SMS message sent to the terminal. In this case, the UE must include the same PTI in the SMS-MO while transmitting the SMS-MO.

11) In order to notify that the SMS has been delivered, the SMS-SC of PLMN_1 may transmit a Message Delivery Report to the NEF. When the terminal transmits the Push Notification response message, the SMS-SC of PLMN_1 may include the Push Notification response message in the Message Delivery Report.

12) In order to notify that the SMS has been delivered, the NEF may transmit a notification message (e.g., Nnef_Trigger_Delivery Notify message) to the AMF. For example, the NEF may trigger the Nnef_Trigger_Delivery Notify service to notify the AMF that the SMS has been delivered. When the NEF receives the Push Notification response message, the NEF may transmit the Push Notification response message by including it in the Nnef_Trigger_Delivery Notify message. Based on the received information, the AMF may know whether the terminal has received the Push Notification and whether the terminal will respond to the Push Notification.

13) The terminal may determine whether to receive the service in PLMN_1 based on at least one of the validity time of the SMS message, information on the service type, the triggered push notification, the services in progress in PLMN_2 and/or the time stamp of the SMS message, etc. can decide When the terminal decides to receive the service in PLMN_1, the terminal may transmit a service request message to PLMN_1 by using USIM_A. For example, the terminal may transmit a service request message to the AMF of PLMN_1.

In this case, the terminal may not show the received SMS message to the user. The terminal may determine whether to show the received SMS message to the user based on the received TP Protocol Identifier (TP PID). If interaction with the user is required in relation to Push Notification, the terminal displays the received information separately from showing the SMS message to the user to inform the user whether to receive the service using another USIM (e.g. USIM_A) can be confirmed. For example, when receiving paging information for a phone service, the terminal notifies the user that a call is coming, and can receive confirmation whether to connect through another USIM to receive the call.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 17:
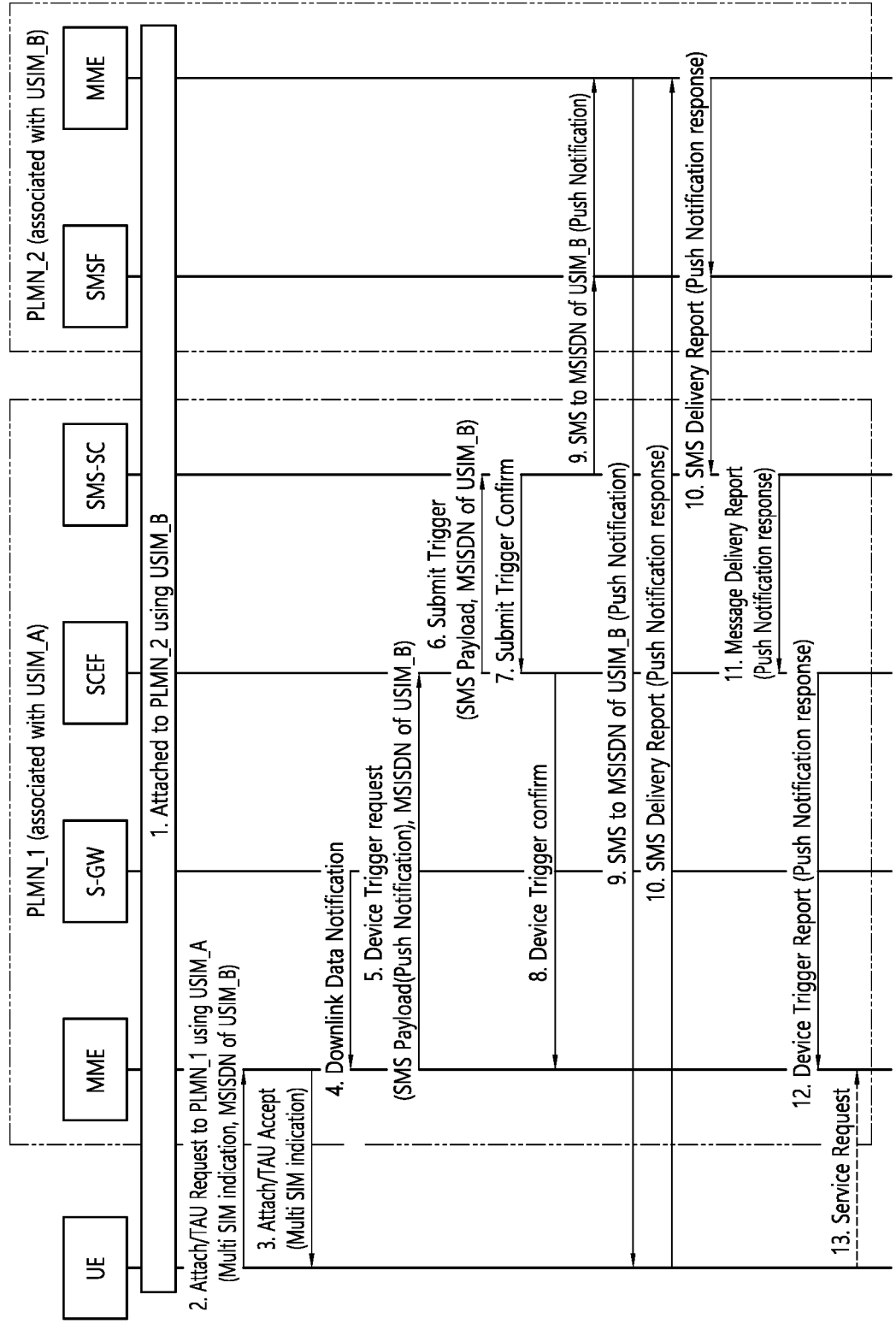
FIG. 17 shows an example of a procedure in which an example of a method using SMS is performed in EPS.

FIG. 17 Shows an Example of a Procedure in which an Example of a Method Using SMS is Performed in EPS.

FIG. 17 shows a specific example in which procedure related to sending a Push Notification via SMS is performed in the EPC. Although the example of FIG. 17 shows an example in which a terminal (e.g., UE) uses PLMN_2 as a main and PLMN_1 as a sub, this is only an example, and the same description may be applied in the opposite case.

1) The UE may perform an attach procedure for PLMN_2 by using USIM B. The terminal may be in a state attached to PLMN_2.

2) The UE may transmit an attach request message or a TAU request message to PLMN_1 by using USIM_A. In order to indicate that the terminal wants to receive the Push Notification via SMS, the attach request message or TAU request message may include "multiple SIM registration indication (information) or Multi SIM indication (information)" and the MSISDN of USIM_B.

3) When the MME allows transmitting a Push Notification to the terminal through SMS, the MME may transmit an attach accept message or a TAU accept message to the terminal. The attach accept message or TAU accept message may include a Multi SIM indication (information) to inform that Push Notification will be performed via SMS.

4) In PLMN_1, if there is downlink data for the terminal, the S-GW may transmit a downlink data notification message to the MME.

5) The MME may transmit a paging request message to the RAN to transmit a paging message to the UE. For reference, the operation of the MME transmitting the paging request message may not be performed. The MME may transmit a Device Trigger request message to the SCEF in order to transmit a Push Notification to the UE through SMS. A Device Trigger request message may include an MSISDN of USIM_B and an SMS payload (including Push Notification). Push Notification may include information on the service type that triggered the Push Notification and PLMN ID (e.g., ID of PLMN_B). Additionally, the MME may also provide the SCEF with the validity time of the Push Notification message.

6) The SCEF may transmit a Submit Trigger message to the SMS-SC. The submission trigger message may include the MSISDN of USIM_B received from the MME, the SMS payload (including Push Notification), and/or the validity time of the Push Notification message.

7) SMS-SC may respond to SCEF. For example, the SMS-SC may transmit a submission trigger confirm message to the SCEF in response to the submission trigger message.

8) SCEF may respond to MME. For example, the SCEF may transmit a response message (e.g., a Device Trigger confirm message) to the AMF in response to a request message (e.g., a Device Trigger request message) sent by the MME.

9) The SMS-SC of PLMN_1 may generate an SMS message including a Push Notification. When the SMS-SC receives the validity time, the SMS-SC may set a Validity-Period of the SMS message to the received validity time. The SMS-SC of PLMN_1 may transmit the generated SMS message (including Push Notification) to the terminal by using the received MSISDN of USIM_B. For example, the SMS-SC of PLMN_1 may transmit an SMS message (including Push Notification) to the MME of PLMN_2 via SMSF of PLMN_2. Then, the MME of PLMN_2 may transmit an SMS message (including Push Notification) to the terminal.

10) When the terminal receives the Push Notification through SMS, the terminal may transmit the SMS Delivery Report to the SMS-SC according to the settings of the SMS-SC that transmitted the SMS. In this case, the terminal may include the Push Notification response message in the SMS Delivery Report. The SMS Delivery Report is transmitted when the terminal successfully receives the SMS. For reference, when the terminal does not switch the SIM used through 3GPP access after receiving the Push Notification, the Push Notification response message may be included in the SMS Delivery Report. For example, when the terminal decides not to respond to the paging, the terminal may include a Push Notification response message in the SMS Delivery Report. In this case, the Push Notification response message may include information that the terminal will not respond to paging.

Alternatively, the terminal may transmit a Mobile Originated (MO) SMS to the SMS-SC of PLMN_1 to transmit a Push Notification response message. To this end, when the SMS-SC of PLMN_1 generates an SMS message and transmits it to the terminal, MSISDN information of the SMS-SC of PLMN_1, which can receive SMS, must be included in the SMS message. In addition, since the SMS-SC of PLMN_1 allocates different MSIDNs for each terminal, when the SMS-SC of PLMN_1 receives SMS-MO from each terminal, it is possible to identify which terminal the SMS-MO is for. Alternatively, when the SMS-SC of PLMN_1 receives the SMS-MO from the terminals, the SMS-SC of PLMN_1 may identify which terminal information the SMS-MO is for based on the sender MSISDN of the terminal. In addition, since the SMS-SC of PLMN_1 can continuously transmit Push Notifications based on AMF requests, the SMS message can be transmitted by adding information (e.g., PTI) used in the NAS protocol to the SMS message sent to the terminal. In this case, the UE must include the same PTI in the SMS-MO while transmitting the SMS-MO.

11) In order to notify that the SMS has been delivered, the SMS-SC of PLMN_1 may transmit a Message Delivery Report to the SCEF. When the terminal transmits the Push Notification response message, the SMS-SC of PLMN_1 may include the Push Notification response message in the Message Delivery Report.

12) In order to inform that the SMS has been delivered, the SCEF may transmit a Device Trigger Report message to the MME. When the SCEF receives the Push Notification response message, the SCEF may transmit the Push Notification response message by including it in the Device Trigger Report message. Based on the received information, the MME may know whether the terminal has received the Push Notification and whether the terminal will respond to the Push Notification.

13) The terminal determines whether to receive the service in PLMN_1 based on at least one of the validity time of the SMS message, information on the service type, the triggered push notification, the services in progress in PLMN_2 and/or the time stamp of the SMS message, etc. can decide When the terminal decides to receive the service in PLMN_1, the terminal may transmit a service request message to PLMN_1 by using USIM_A. For example, the UE may transmit a service request message to the MME of PLMN_1.

In this case, the terminal may not show the received SMS message to the user. The terminal may determine whether to show the received SMS message to the user based on the received TP Protocol Identifier (TP PID). If interaction with the user is required in relation to Push Notification, the terminal displays the received information separately from showing the SMS message to the user to inform the user whether to receive the service using another USIM (eg USIM_A). can be confirmed For example, when receiving paging information for a phone service, the terminal notifies the user that a call is coming, and can receive confirmation whether to connect through another USIM to receive the call.

According to the description with reference to the examples of FIGS. 16 and 17, the AMF (or MME), the UE (e.g., UE), and the NEF (or SCEF) may perform the following example operations.

The AMF (or MME) may handle the terminal's request for Push Notification via SMS. The AMF (or MME) may request the SMS-SC via the NEF (or SCEF) to transmit a Push Notification via SMS.

In order to be paged by Push Notification via SMS, the terminal may transmit a request message to the AMF (or MME) and receive information from the AMF (or MME). The terminal may handle Push Notification through SMS.

The NEF (or SCEF) may request the SMS-SC to transmit an SMS including a Push Notification.

7. Interworking Scenario with LTE System

The contents described in 1. to 4. described above are applicable even when the terminal uses the LTE system as the main and the 5G system as the sub. For example, while the terminal uses the LTE system (e.g., LTE-based PLMN) as a main, the terminal uses the N3IWF of the 5G system (e.g., 5G-based PLMN) through the LTE network to the 5G system (e.g., 5G based on PLMN). Then, the terminal may receive the NAS notification message of the 5G system (e.g., 5G-based PLMN).

However, on the contrary, when the terminal uses the 5G system as the main, the terminal cannot receive MT data from the LTE system used as the sub. This is because the operations described in 1. to 4. above may be performed on the premise that the N3IWF exists in the network, but the N3IWF does not exist in the LTE system.

That is, as in the example of Table 4 below, the contents described in 1. to 4. described above are applicable to cases 1 and 2, but cannot be applied to cases 3 and 4.

TABLE 4

| Case | Main | Sub | Applicability |
|---|---|---|---|
| 1 | LTE | 5G | O |
| 2 | 5G | 5G | O |
| 3 | 5G | LTE | X |
| 4 | LTE | LTE | X |

Table 4 shows the type of system that the terminal uses as main (LTE-based PLMN, or 5G-based PLMN) and the type of system used as a sub (LTE-based PLMN or 5G-based PLMN) according to the case (e.g.: Cases 1 to 4). Table 4 shows whether the contents described in 1. to 4. described above are applicable to each case.

As in Case 3 or 4, when the terminal uses the 5G system as the main and the LTE system as the sub, the operations described in 5. or 6. may be applied together with the operations described in 1. to 4. For example, the terminal transmits "multiple SIM registration indication (information) or Multi SIM indication (information)" while performing the attach procedure for the LTE system, and obtains information related to "Paging AF" from the AMF of the 5G system can receive. For example, in a situation in which the terminal uses the 5G system as the main and the LTE system as a sub, the terminal sends an attach request message (including "multiple SIM registration indication (information) or Multi SIM indication (information))" to the MME of the LTE system. Then, the MME may transmit information related to "Paging AF" to the UE.

Thereafter, the terminal may request reception of a notification for the LTE system while notifying the AMF of information (e.g., external identifier) of the terminal used in the LTE system while registering with the 5G system. Thereafter, the UE may provide information (e.g. IP address) to receive NAS notification by accessing "Paging AF" through the user plane. "Paging AF" may request through the NEF (or SCEF) interface or directly to MME that inform the "Paging AF" if paging to the terminal is required. When paging to the UE is required, the MME may inform "Paging AF" that notification transmission is required through NEF (or SCEF) or directly. In this case, the MME may transmit information on paging (e.g., information on service type, etc.) to the AF. "Paging AF" may transmit a notification message to the terminal using the IP information of the terminal.

7. Example of Multi SIM Support Using NAS Notification

An example of a method for supporting a Multi SIM-related operation based on an operation related to NAS notification among the contents described above in 1. to 6. will be further described.

The following drawings were created to explain a specific example of the present specification. The names of specific devices described in the drawings or the names of specific signals/messages/fields are presented by way of example, so that the technical features of the present specification are not limited to the specific names used in the following drawings.

FIG. 18 Shows an Example of a Network Structure for Supporting Multi SIM-Related Operations.

When the terminal is registered in a network (e.g., PLMN) through both 3GPP access and non-3GPP access, AMF sends a NAS notification message to the terminal through non-3GPP access instead of sending a paging message through 3GPP access to the terminal. In addition, as part of the NPN (Non-Public Network) and PLMN interworking, the UE may register with the PLMN through 3GPP access of a stand-alone non-public network. Using these two mechanisms, a UE including a plurality of USIMs (e.g., MUSIM UE) may receive a NAS notification message of one PLMN (PLMN associated with SIM_A) through 3GPP access of another PLMN (PLMN associated with SIM_B). SIM_A and SIM_B may be SIMs used by the MUSIM UE.

In FIG. 18, a primary PLMN (e.g., PLMN A) is a PLMN related to SIM_A, and may be a PLMN used as a main by the UE. The secondary PLMN (e.g., PLMN B) is a PLMN related to SIM_B, and may be a PLMN used as a sub by the UE.

Referring to FIG. 18, in order to receive downlink data or signaling in the secondary PLMN, the UE does not need to monitor the paging of the secondary PLMN. This is because, if downlink data or signaling exists in the Secondary PLMN, the N3IWF of the Secondary PLMN transmits a NAS notification message to the UE through the UPF and NG-RAN of the Primary PLMN.

When the UE receives a NAS notification message (a NAS notification message transmitted from the Secondary PLMN) through the PDU session of the primary PLMN, the UE transmits a service request message to the secondary PLMN and may receive a service from the Secondary PLMN.

Specifically, after the UE registers with PLMN_A using SIM_A and the UE registers with PLMN_B using SIM_B, the UE may select a primary PLMN. For example, the UE may select PLMN_A as the Primary PLMN. The Primary PLMN may mean a PLMN for which the UE monitors paging. The UE may select the primary PLMN according to UE implementation, such as based on user settings. Another PLMN not selected by the UE as the Primary PLMN may be a Secondary PLMN (e.g., PLMN_B).

The UE may select the N3IWF of the Secondary PLMN. In addition, the UE may perform a registration procedure for the secondary PLMN through the PDU session of the primary PLMN using the selected N3IWF. During the registration procedure, the UE may transmit a 5G NR Global Unique Temporary Identifier (5G-GUTI) allocated in 3GPP access by the Secondary PLMN to the Secondary PLMN. For example, the terminal may transmit a registration request message including "multiple SIM registration indication (information) or Multi SIM indication (information)" to the N3IWF of the secondary PLMN. "multiple SIM registration indication (information) or Multi SIM indication (information)" can inform AMF #2 (AMF of Secondary PLMN) that the terminal wants to receive a NAS notification message instead of being paged through 3GPP access. When AMF #2 (AMF of Secondary PLMN) allows to transmit NAS notification messages (e.g., when allowing Multi SIM-related operations), AMF #2 (AMF of Secondary PLMN) may transmit a registration accept message including Multi SIM indication (information) to the terminal.

When the terminal receives a Multi SIM indication (information) from AMF #2 (AMF of Secondary PLMN), the terminal does not monitor paging in the Secondary PLMN, and may monitor paging only in the Primary PLMN.

When there is downlink data or signaling for the terminal in the secondary PLMN, AMF #2 (AMF of the secondary PLMN) may transmit a NAS notification message to the terminal instead of performing paging. For example, AMF #2 (AMF of the Secondary PLMN) may transmit a NAS notification message to the N3IWF, and the N3IWF may transmit a NAS notification message to the UPF of the Primary PLMN via the Internet. Then, the UPF of the Primary PLMN may transmit a NAS notification message to the UE via the NG-RAN.

When the terminal receives the NAS notification message, the terminal may determine whether to transmit a service request message to the secondary PLMN. If the UE wants to remain in the Primary PLMN, the UE may transmit a NAS notification message to the N3IWF of the Secondary PLMN through the PDU session of the Primary PLMN. When the UE wants to receive a service from the Secondary PLMN, the UE may transmit a service request message to the Secondary PLMN through 3GPP access of the Secondary PLMN.

Hereinafter, an example of a specific procedure will be described with reference to FIGS. 19A and 19B.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 19A:
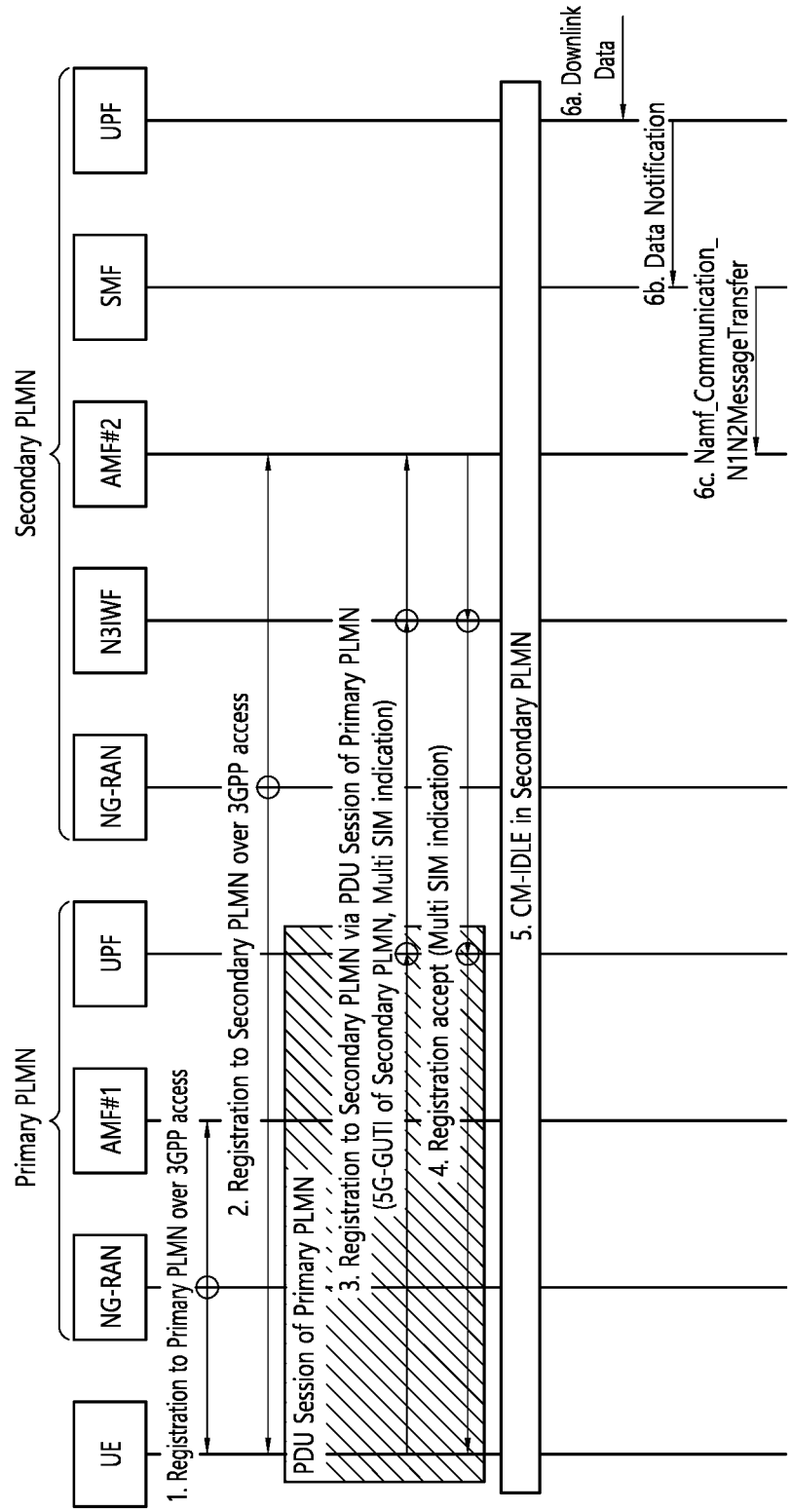
FIGS. 19A and 19B show an example of a procedure according to an example of Multi SIM support using NAS notification.
Figure 19B:
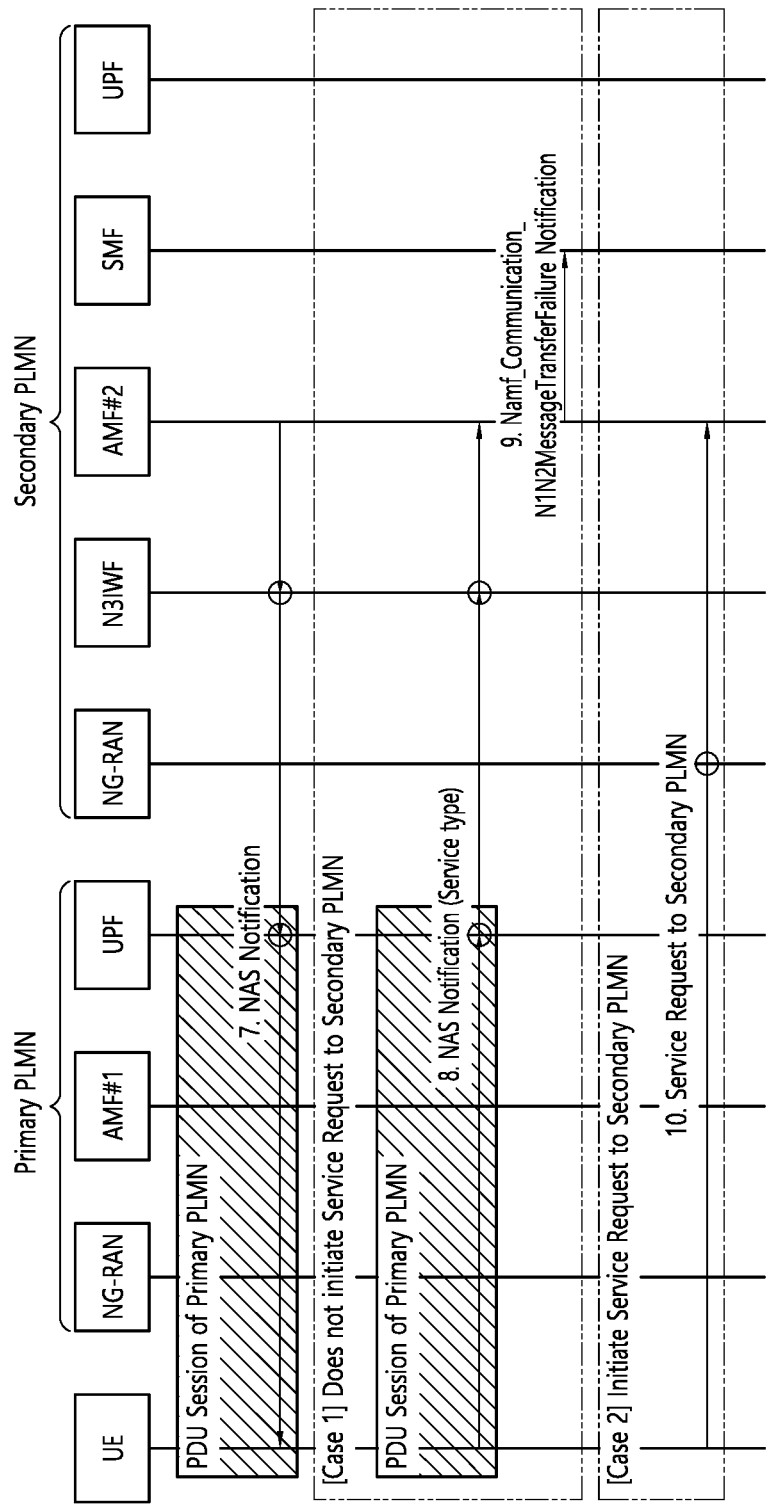

FIGS. 19A and 19B Show an Example of a Procedure According to an Example of Multi SIM Support Using NAS Notification.

FIGS. 19A and 19B, a Primary PLMN (e.g., PLMN A) is a PLMN related to SIM_A, and may be a PLMN used as a main by the UE. The secondary PLMN (e.g., PLMN B) is a PLMN related to SIM_B, and may be a PLMN used as a sub by the UE. SIM_A and SIM_B may be SIMs used by the terminal.

1) The UE may register with the Primary PLMN (e.g., PLMN A) through 3GPP access and establish a PDU session. For example, after performing a registration procedure for a primary PLMN (e.g., PLMN A) using SIM A, the UE may perform a PDU session establishment procedure in the primary PLMN (e.g., PLMN A).

2) The UE may register with a secondary PLMN (e.g., PLMN B) through 3GPP access and establish a PDU session. For example, after performing a registration procedure for the secondary PLMN (e.g., PLMN B) using SIM B, the UE may perform a PDU session establishment procedure in the secondary PLMN (e.g., PLMN B). The UE may receive the 5G-GUTI from the secondary PLMN (e.g., PLMN B).

3) The UE may decide to perform a Multi SIM related operation using the NAS notification message. For example, when the UE detects that the paging occasions of the Primary PLMN (e.g., PLMN A) and the secondary PLMN (e.g., PLMN B) overlap, the UE may decide to use a procedure related to a NAS notification message to avoid a paging collision. The UE may select the N3IWF of the secondary PLMN (e.g., PLMN B). In addition, the UE may register with the secondary PLMN (e.g., PLMN B) through the PDU session of the primary PLMN (e.g., PLMN A). For example, the UE may transmit a registration request message to AMF #2 of the secondary PLMN (e.g., PLMN B) through the PDU session of the primary PLMN (e.g., PLMN A). The terminal may include "multiple SIM registration indication (information) or Multi SIM indication (information)" and the 5G-GUTI received in step 2) in the registration request message. The registration procedure performed by the UE may be similar to the registration procedure for untrusted non-3GPP access.

4) When AMF #2 of the Secondary PLMN (e.g. PLMN B) accepts the UE's registration request (e.g., accepts sending a NAS notification message instead of paging to the UE), Secondary PLMN (e.g. PLMN B) may transmit a registration accept message (including "multiple SIM registration indication (information) or Multi SIM indication (information)") to the terminal.

5) It may be assumed that the UE is in the CM-IDLE state in the secondary PLMN (e.g., PLMN B).

6a to 6c) The UPF of the secondary PLMN (e.g., PLMN B) may receive downlink data for the UE. The UPF of the Secondary PLMN (e.g. PLMN B) transmits a data notification message to the SMF of the Secondary PLMN (e.g. PLMN B) of the Secondary PLMN (e.g. PLMN B), indicating to the SMF that the downlink data for the terminal exists. By triggering the Namf_Communication_N1N2MessageTransfer service, the SMF may request AMF #2 of the secondary PLMN (e.g., PLMN B) to set up the user plane resource. That is, the SMF may transmit the Namf_Communication_N1N2MessageTransfer message to AMF #2 of the secondary PLMN (e.g., PLMN B).

7) Based on the "multiple SIM registration indication (information) or Multi SIM indication (information)" received in step 3), AMF #2 of the Secondary PLMN (e.g., PLMN B) may transmit, a NAS notification message to the UE through a secondary PLMN (e.g., PLMN B), instead of performing paging for the terminal through 3GPP access.

When the terminal receives the NAS notification message, the terminal may determine whether to transmit a service request message to the secondary PLMN (e.g., PLMN B). That is, the UE may determine whether to receive a service by moving to a secondary PLMN (e.g., PLMN B). If the UE wants to remain in the Primary PLMN (e.g. PLMN A), the UE may transmit a NAS notification message to the N3IWF of the Secondary PLMN (e.g. PLMN B) through the PDU session of the Primary PLMN (e.g. PLMN A) (The operation related to Case 1 of FIGS. 19A and 19B is performed). If the UE wants to receive service from the Secondary PLMN (e.g., PLMN B), the UE may transmit a service request message to the Secondary PLMN (e.g., PLMN B) through 3GPP access of the Secondary PLMN (e.g., PLMN B) (FIG. The operations related to Case 2 of 19A and 19B are performed).

8) When the UE decides not to trigger a service request for the Secondary PLMN (e.g., PLMN B) (that is, when the UE decides not to transmit a service request message to the Secondary PLMN (e.g., PLMN B)), the UE may transmit NAS notification response message to AMF #2 of the secondary PLMN (e.g., PLMN B) through the PDU session of the PLMN (e.g., PLMN A).

9) AMF #2 of the Secondary PLMN (e.g., PLMN B) may inform the SMF that the UE cannot re-activate the PDU session. For example, AMF #2 of the secondary PLMN (e.g., PLMN B) may transmit a notification message (e.g., Namf_Communication_N1N2MessageTransferFailure notification message).

10) When the UE decides to trigger a service request for the Secondary PLMN (e.g., PLMN B) (i.e., when the UE decides to transmit a service request message to the Secondary PLMN (e.g., PLMN B)), the UE may initiate the service request procedure for a Secondary PLMN (e.g., PLMN B). For example, the UE may transmit a service request message to AMF #2 via the NG-RAN of the secondary PLMN (e.g., PLMN B) through 3GPP access. When the UE enters the CM-CONNECTED state in the secondary PLMN (e.g., PLMN B), the UE may change the Primary PLMN and the Secondary PLMN. That is, the UE may change the Primary PLMN to PLMN B and the Secondary PLMN to PLMN A. In addition, the UE may perform the registration procedure described in steps 3) and 4) for PLMN A, which has become a secondary PLMN.

In order to perform the procedure described in FIGS. 19A and 19B, the terminal and the AMF must be able to handle "multiple SIM registration indication (information) or Multi SIM indication (information)".

For reference, the operation of the terminal (e.g., UE) described in this specification may be implemented by the apparatus of FIGS. 20 to 25 to be described below. For example, the UE may be the first wireless device 100 or the second wireless device 200 of FIG. 21. For example, an operation of a terminal (e.g., UE) described herein may be processed by one or more processors 102 or 202. The operations of the UE described herein may be stored in one or more memories 104 or 204 in the form of instructions/programs (e.g., executable code) executable by one or more processors 102 or 202. The one or more processors 102 or 202 control one or more memories 104 or 204 and one or more transceivers 106 or 206, and execute instructions/programs stored in the one or more memories 104 or 204 to be used in the present specification. The operation of the UE (e.g., UE) described in the disclosure may be performed.

In addition, instructions for performing an operation of a terminal (e.g., UE) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (e.g., UE) described in the disclosure of the present specification.

For reference, the operation of the network node (e.g., AMF, SMF, N3IWF, UPF, MME, S-GW, SCEF, NEF, SMS-SC, SMSF, etc.) described in this specification can be implemented by the device of FIGS. 20 to 27 to be described below. For example, the network node (e.g., AMF, SMF, N3IWF, UPF, MME, S-GW, SCEF, NEF, SMS-SC, SMSF, etc.) is the first wireless device 100 or the second wireless device 200 of FIG. 21. For example, the operation of a network node (e.g., AMF, SMF, N3IWF, UPF, MME, S-GW, SCEF, NEF, SMS-SC, SMSF, etc.) described herein can be processed by one or more processors 102 or 202. The operation of a network node (e.g., AMF, SMF, N3IWF, UPF, MME, S-GW, SCEF, NEF, SMS-SC, SMSF, etc.) described herein stored in one or more memories 104 or 204 in the form of instruction/program (e.g. instruction, executable code) executable by one or more processors 102 or 202. It may be. The one or more processors 102 or 202 control one or more memories 104 or 204 and one or more transceivers 106 or 206, and execute instructions/programs stored in the one or more memories 104 or 204 to be used in the present specification, thereby the one or more processors 102 or 202 may perform operation of the network node (e.g., AMF, SMF, N3IWF, UPF, MME, S-GW, SCEF, NEF, SMS-SC, SMSF, etc.) described in the disclosure.

IV. Examples to which the Disclosure of this Specification is to be Applied

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 20:
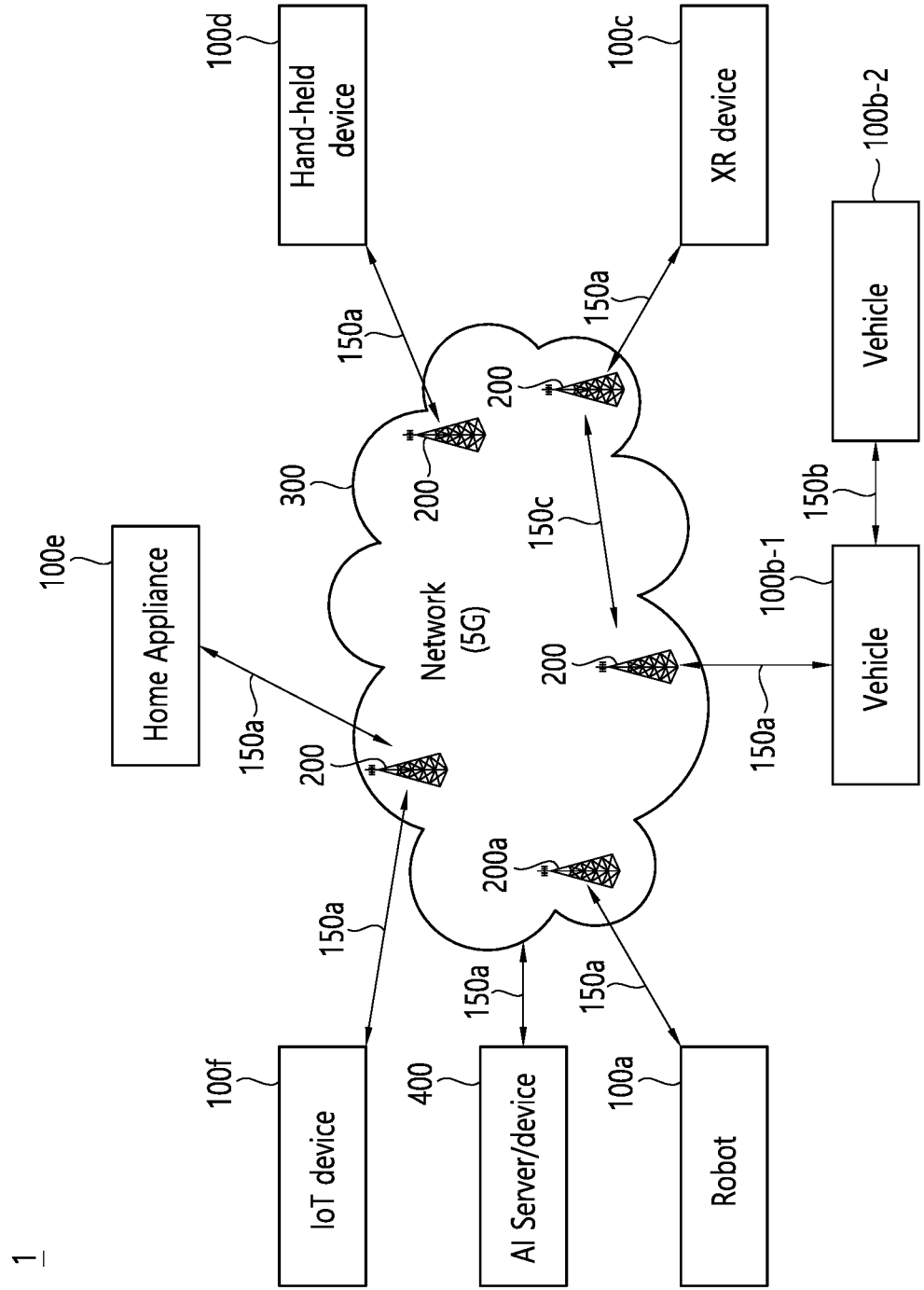
FIG. 20 illustrates a communication system 1 that can be applied to the present specification.

FIG. 20 Illustrates a Communication System 1 that can be Applied to the Present Specification.

Referring to FIG. 20, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like. Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like. The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100*b*-1 and 100*b*-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100*a* to 100*f*.

A wireless communication/connection 150*a*, 150*b*, 150*c* may be performed between the wireless devices 100*a*-100*f*/base station 200 and base station 200/base station 200. Here, the wireless communication/connection is implemented based on various wireless connections (e.g., 5G NR) such as uplink/downlink communication 150*a*, sidelink communication 150*b* (or D2D communication), inter-base station communication 150*c* (e.g. relay, integrated access backhaul), and the like. The wireless device and the base station/wireless device, the base station, and the base station may transmit/receive radio signals to each other through the wireless communication/connections 150*a*, 150*b*, and 150*c*. For example, wireless communications/connections 150*a*, 150*b*, 150*c* may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

Figure 21:
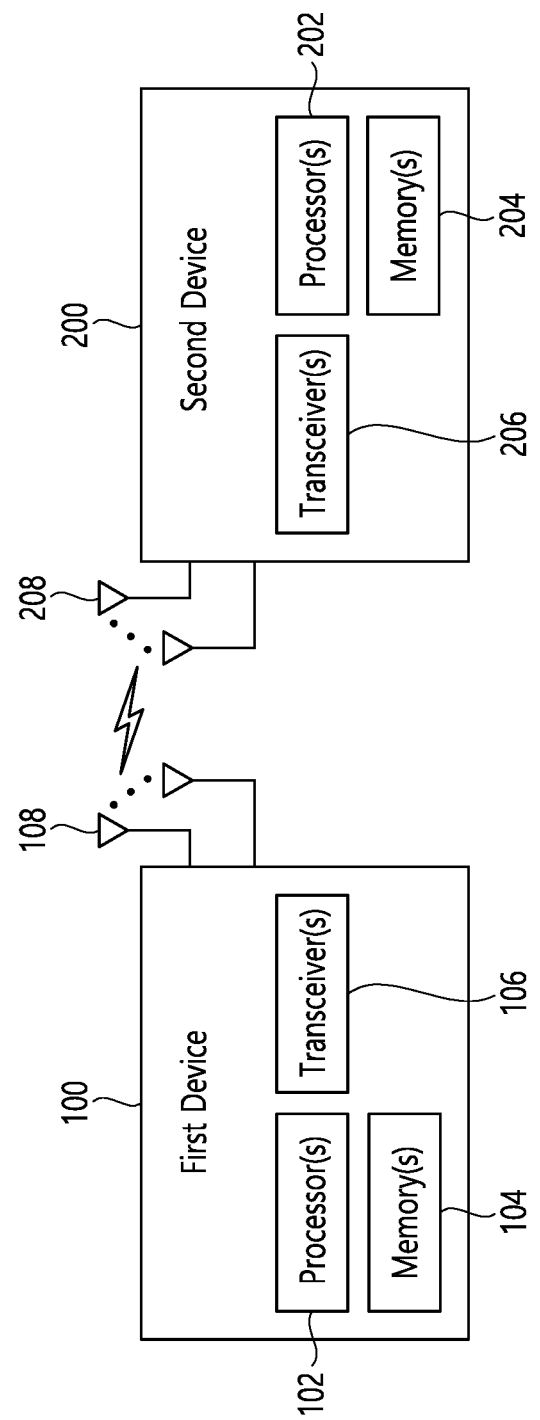
FIG. 21 illustrates an example of a wireless device that can be applied to the present specification.

FIG. 21 Illustrates an Example of a Wireless Device that can be Applied to the Present Specification.

Referring to FIG. 21, the first wireless device 100 and the second wireless device 200 may transmit and receive wireless signals through various wireless access technologies (e.g., LTE, NR). Here, {first wireless device 100, second wireless device 200} may refer to {wireless device 100*x*, base station 200} and/or {wireless device 100*x*, wireless device 100*x*} of FIG. 20. Alternatively, it may correspond to the first wireless device 100 and UE, AMF, SMF, or UPF, etc. described in the disclosure of the present specification. In addition, the second wireless device 200 may correspond to a UE, AMF, SMF, or UPF, etc. The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein. For example, the processor 102 may process the information in the memory 104 to generate a first information/signal, and then transmit the wireless signal including the first information/signal through the transceiver 106. In addition, the processor 102 may receive the radio signal including a second information/signal through the transceiver 106 and store the information obtained from the signal processing of the second information/signal in the memory 104. The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein. Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204. The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein. Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto. For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein. One or more processors 102, 202 may generate messages, control information, data or information in accordance with the descriptions, functions, procedures, suggestions, methods and/or operational flowcharts disclosed herein. One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206. One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals. For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208. In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 22:
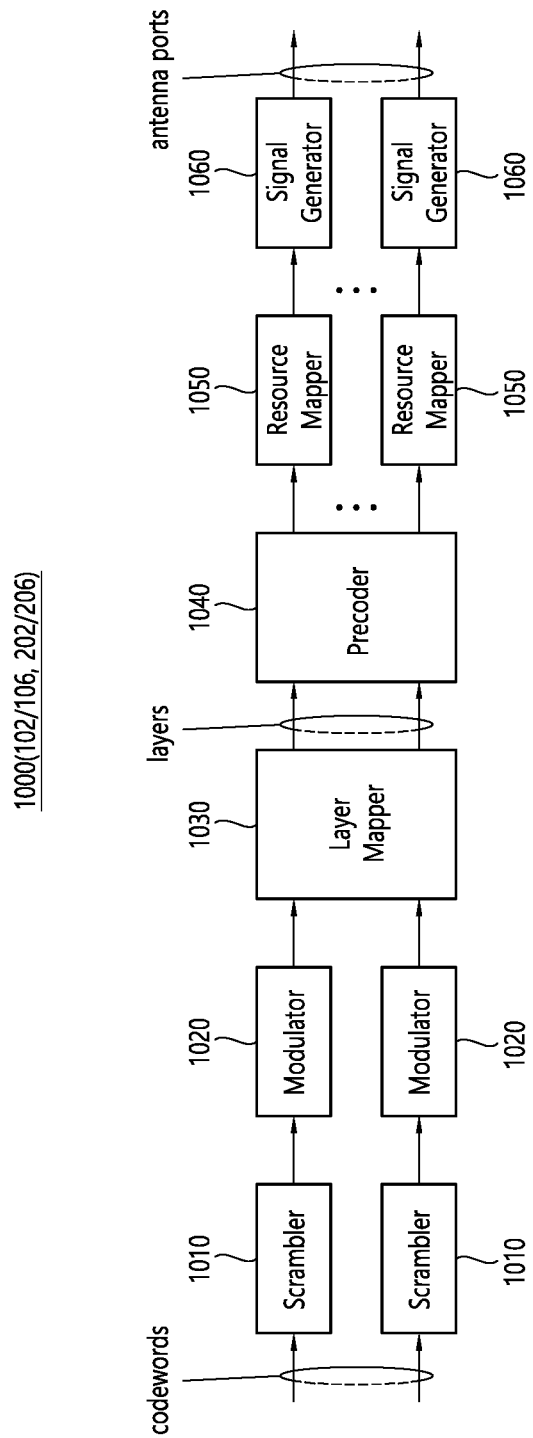
FIG. 22 illustrates an example of a signal processing circuit for a transmission signal.

FIG. 22 Illustrates an Example of a Signal Processing Circuit for a Transmission Signal.

Referring to FIG. 22, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 22 may be performed in the processor (102, 202), the memory (104, 204) and/or transceiver (106, 206) of FIG. 21. The hardware element of FIG. 22 may be implemented in the processors 102 and 202 and/or the transceivers 106 and 206 of FIG. 21. For example, blocks 1010-1060 may be implemented in the processors 102, 202 of FIG. 21. Also, blocks 1010-1050 may be implemented in the processors 102 and 202 of FIG. 21, and block 1060 may be implemented in the transceivers 106 and 206 of FIG. 21.

The codeword may be converted into a wireless signal through the signal processing circuit 1000 of FIG. 22. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like. The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010~1060 of FIG. 22. For example, a wireless device (e.g., 100 and 200 of FIG. 21) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a post-coder, a demodulator, a de-scrambler and a decoder.

Figure 23:
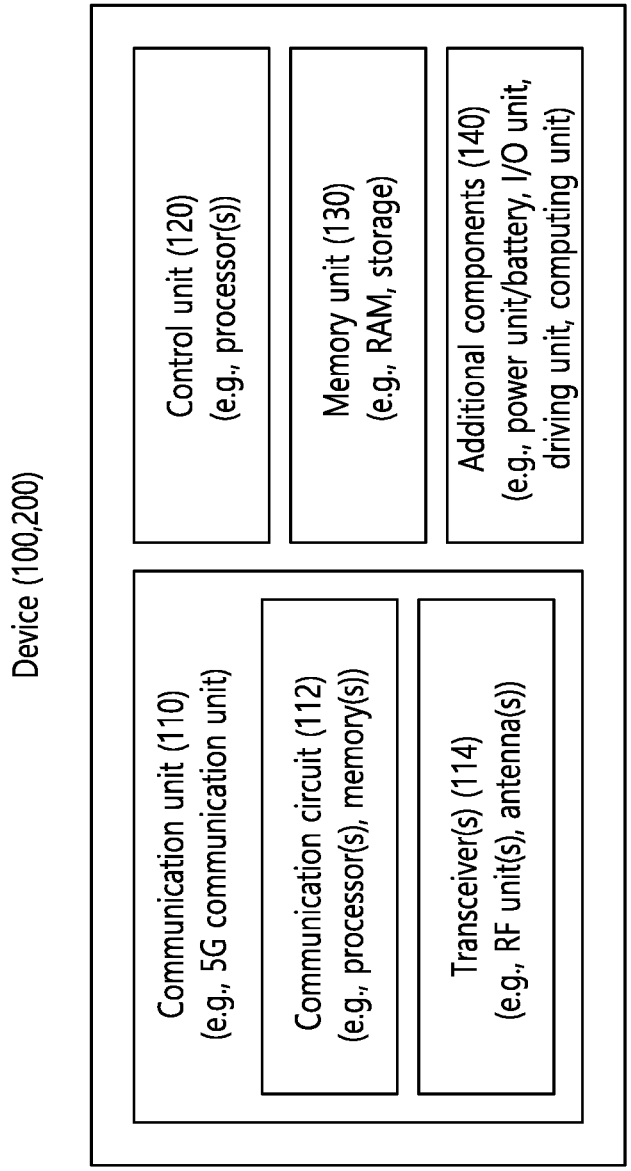
FIG. 23 illustrates another example of a wireless device that can be applied to the present specification.

FIG. 23 Illustrates Another Example of a Wireless Device that can be Applied to the Present Specification.

The wireless device may be implemented in various forms according to use-examples/services (refer to FIG. 20).

Referring to FIG. 23, the wireless devices 100 and 200 correspond to the wireless devices 100 and 200 of FIG. 21, and the wireless devices 100 and 200 may be configured with various elements, components, units, and/or modules. For example, the wireless device 100, 200 may include a communication unit 110, a control unit 120, a memory unit 130, and additional components 140. The communication unit may include communication circuit 112 and transceiver (s) 114. For example, the communication circuit 112 may include one or more processors 102, 202 and/or one or more memories 104, 204 of FIG. 21. For example, the transceiver (s) 114 may include one or more transceivers 106, 206 and/or one or more antennas 108, 208 of FIG. 21. The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130. In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 21. For example, the memory unit 130 may include one or more memories 104 and 204 of FIG. 21.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 20, 100a), a vehicle (FIG. 20, 100b-1, 100b-2), an XR device (FIG. 20, 100c), a portable device (FIG. 20, 100d), a home appliance. (FIG. 20, 100e), IoT devices (FIG. 20, 1000, terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 23, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Figure 24:
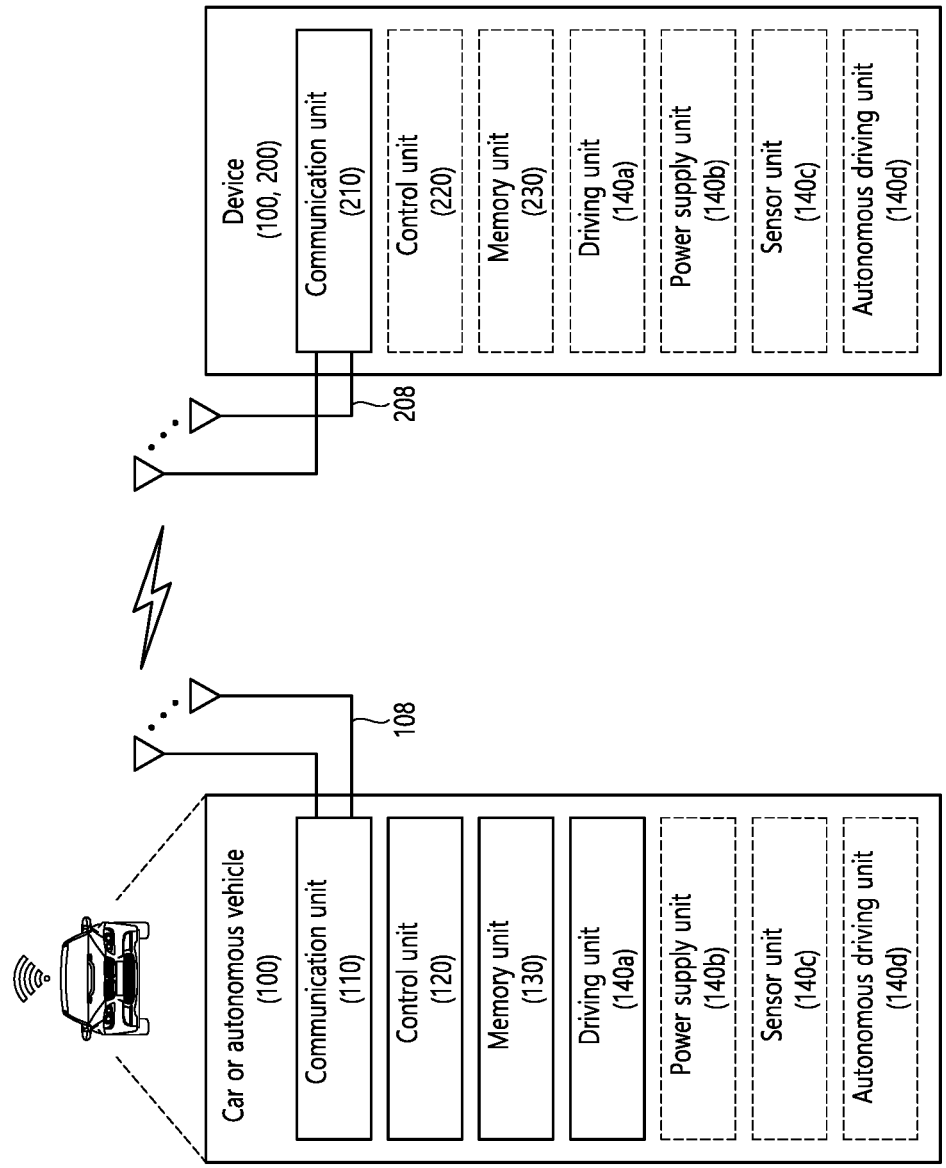
FIG. 24 illustrates an example of a vehicle or an autonomous vehicle that can be applied to the present specification.

FIG. 24 Illustrates an Example of a Vehicle or an Autonomous Vehicle that can be Applied to the Present Specification.

FIG. 24 illustrates a vehicle or autonomous vehicle applied to the disclosure of this specification. The vehicle or autonomous driving vehicle may be implemented as a mobile robot, a vehicle, a train, an aerial vehicle (AV), a ship, and the like.

Referring to FIG. 24, the vehicle or the autonomous vehicle 100 may include an antenna unit 108, a communication unit 110, a control unit 120, a driving unit 140a, a power supply unit 140b, a sensor unit 140c, and autonomous driving unit 140d. The antenna unit 108 may be configured as part of the communication unit 110. The blocks 110/130/140a to 140d may correspond to blocks 110/130/140 of FIG. 23, respectively.

The communication unit 110 may transmit or receive signals (e.g., data, control signals, etc.) with external devices, such as base stations (e.g. base stations, road side units, etc.), servers, and the like. The control unit 120 may control various elements of the vehicle or the autonomous vehicle 100 to perform various operations. The control unit 120 may include an ECU (Electronic Control Unit). The driving unit 140a may cause the vehicle or the autonomous vehicle 100 to drive on the ground. The driving unit 140a may include an engine, a motor, a power train, wheels, a brake, a steering device, and the like. The power supply unit 140b supplies power to the vehicle or the autonomous vehicle 100, and may include a wired/wireless charging circuit, a battery, and the like. The sensor unit 140c may obtain vehicle status, surrounding environment information, user information, and the like. The sensor unit 140c includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140d may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140d may generate an autonomous driving route and a driving plan based on the obtained data. The control unit 120 may control the driving unit 140a to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles. In addition, during autonomous driving, the sensor unit 140c may acquire vehicle state and surrounding environment information. The autonomous driving unit 140*d* may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 25:
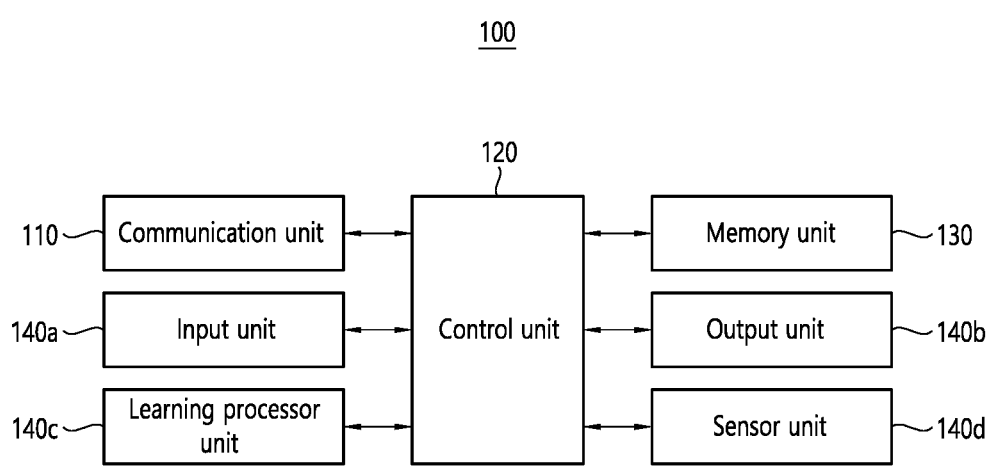
FIG. 25 illustrates an example of an AI device that can be applied to the disclosure of the present specification.

FIG. 25 Illustrates an Example of an AI Device that can be Applied to the Disclosure of the Present Specification.

FIG. 25 illustrates an example of an AI device applied to the disclosure of the present specification. An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 25, the AI device 100 includes a communication unit 110, a control unit 120, a memory unit 130, an input/output unit 140*a*/140*b*, a learning processor unit 140*c*, and a sensor unit 140*d*. Blocks 110 to 130/140*a* to 140*d* respectively correspond to blocks 110 to 130/140 of FIG. 23.

The communication unit 110 communicates may transmit or receive wired signals and wireless signals (e.g., sensor information, user input, learning model, control signal, etc.) with external devices such as another AI device (e.g., FIG. 1, 100*x*, 200, 400) or an AI server (e.g., 400 of FIG. 20) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm. In addition, the control unit 120 may control the components of the AI device 100 to perform the determined operation. For example, the control unit 120 may request, search, receive, or utilize data of the running processor 140*c* or the memory 130. The control unit 120 may control the components of the AI device 100 to execute a predicted or desirable operation among at least one executable operation. In addition, the control unit 120 collects history information including the operation contents of the AI device 100 or the user's feedback on the operation, and stores the information in the memory unit 130 or the running processor unit 140*c* or transmits the information to an external device such as an AI server (FIG. 20, 400). The collected historical information can be used to update the learning model.

The memory unit 130 may store data supporting various functions of the AI device 100. For example, the memory unit 130 may store data obtained from the input unit 140*a*, data obtained from the communication unit 110, output data of the learning processor unit 140*c*, and data obtained from the sensing unit 140. In addition, the memory unit 130 may store control information and/or software code necessary for operation/execution of the control unit 120.

The input unit 140*a* may obtain various types of data from the outside of the AI device 100. For example, the input unit 140*a* may acquire training data for model learning, input data to which the training model is applied, and the like. The input unit 140*a* may include a camera, a microphone, and/or a user input unit. The output unit 140*b* may generate an output related to sight, hearing, or touch. The output unit 140*b* may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140*c* may train a model composed of artificial neural networks using the training data. The learning processor unit 140*c* may perform AI processing together with the learning processor unit of the AI server (FIGS. 12 and 400). The learning processor unit 140*c* may process information received from an external device through the communication unit 110 and/or information stored in the memory unit 130. In addition, the output value of the learning processor unit 140*c* may be transmitted to the external device through the communication unit 110 and/or stored in the memory unit 130.

As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for a wireless communication device to perform communication based on a plurality of Subscriber Identification Modules (SIMs),
    transmitting a request message to a first network node of a second network,
    wherein the request message includes first information related to a plurality of SIMs, and
    wherein the wireless communication device is performing communication in a first network or monitoring paging in the first network; and
    receiving an accept message for the request message from the first network node of the second network,
    wherein the first information related to the plurality of SIMs is used for the first network node of the second network to transmit a notification message to the wireless communication device via the first network, through a second network node of a second network.

2. The method of claim 1, further comprising:
receiving the notification message transmitted by a first network node of the second network from a second network node of the second network through the first network,
wherein the notification message includes information on a service type related to downlink data for the wireless communication device in the second network.

3. The method of claim 2, further comprising:
determining whether to transmit a service request message to the first network node of the second network through 3rd Generation Partnership Project (3GPP) access based on the information on the service type.

4. The method of claim 3, further comprising:
transmitting, via 3GPP access of the second network, a service request message to the first network node of the second network based on that the decision to transmit the service request message.

5. The method of claim 3, further comprising:
based on the decision not to transmit the service request message, transmitting a response message to the notification message to the second network node of the second network via the first network.

6. The method of claim 2,
wherein the request message is one of a registration request message, a Tracking Area Update (TAU) request message, or an attach request message.

7. The method of claim 1,
wherein the acceptance message includes second information associated with a plurality of SIMs indicating that the first network node of the second network will transmit a notification message via the first network.

8. The method of claim 1,
wherein the first network node of the second network is an Access and Mobility Management Function (AMF) node of the second network,
wherein the second network node of the second network is a Non-3GPP Inter Working Function (N3IWF) node of the second network,
wherein the request message is transmitted to the first network node of the second network via the UPF node of the first network and the second network node of the second network, based on using the PDU session of the first network.

9. The method of claim 1,
wherein the wireless communication device includes the plurality of SIMs,
wherein the plurality of SIMs includes a first SIM related to the first network and a second SIM related to the second network.

10. A method for a wireless communication device to perform communication based on a plurality of Subscriber Identification Modules (SIMs),
transmitting a request message to a first network node of a second network,
wherein the request message includes first information and second information related to a plurality of SIMs,
wherein the wireless communication device is performing communication in a first network or monitoring paging in the first network, and
wherein the second information related to the plurality of SIMs is number information of a SIM related to the first network among the plurality of SIMs; and
receiving an accept message for the request message from the first network node of the second network;

wherein the first information and the second information related to the plurality of SIMs are used for the first network node of the second network to transmit a Short Message Service (SMS) message including a notification message to the wireless communication device, when downlink data for the wireless communication device exists in the second network.

11. The method of claim 10, further comprising:
receiving the notification message, transmitted by a first network node of the second network, from a second network node of the second network,
wherein the notification message includes information on a service type related to downlink data for the wireless communication device in the second network and second information related to the plurality of SIMs.

12. The method of claim 10, further comprising:
wherein the first network node of the second network is an Access and Mobility Management Function (AMF) node or Mobility Management Entity (MME) node of the second network,
wherein the second network node of the second network is an Application Function (AF) node, a Network Exposure Function (NEF) node, or a service capability exposure function (SCEF) node of the second network,
wherein the notification message is transmitted by a first network node of the second network via a second network node of the second network and a Short Message Service-Service Center (SMS-SC) node of the second network.

13. The method of claim 11, further comprising:
determining whether to transmit a service request message to the first network node of the second network through 3rd Generation Partnership Project (3GPP) access based on the information on the service type.

14. The method of claim 13,
transmitting, via 3GPP access of the second network, a service request message to the first network node of the second network based on determining to transmit the service request message.

15. The method of claim 13,
based on the decision not to transmit the service request message, transmitting an SMS message including a response message to the notification message to the second network node of the second network.

16. A method in which a first network node of a second network performs communication based on a plurality of Subscriber Identification Modules (SIMs), the method comprising:
receiving a request message from a wireless communication device;
wherein the request message includes first information related to a plurality of SIMs; and
transmitting an accept message for the request message to the wireless communication device,
when downlink data for the wireless communication device exists in the second network, the first information related to the plurality of SIMs is information requesting to transmit a notification message to the wireless communication device through the first network via a second network node of a second network.

17. The method of claim 16,
receiving a message indicating that downlink data for the wireless communication device exists from a Session Management Function (SMF) node or a Serving Gateway (S-GW) node of the second network; and
transmitting the notification message to the wireless communication device through the first network via a second network node of the second network based on the existence of downlink data for the wireless communication device, and, wherein the notification message includes information on a service type related to the downlink data.

18. The method of claim 17, further comprising:

receiving a response message for the notification message from a second network node of the second network through the first network.

19. The method of claim 17, further comprising:

receiving a service request message from the wireless communication device via 3GPP access of the second network.

20. The method of claim 16, wherein the acceptance message includes second information related to a plurality of SIMs indicating that the first network node of the second network will transmit a notification message via the second network node of the second network.

* * * * *